United States Patent
Sawada

(10) Patent No.: US 8,649,979 B2
(45) Date of Patent: Feb. 11, 2014

(54) BRANCH POINT DIAGRAM DISPLAY SYSTEM

(75) Inventor: Kiyohiko Sawada, Nagoya (JP)

(73) Assignee: Denso Corporation, Kariya (JP)

(*) Notice: Subject to any disclaimer, the term of this patent is extended or adjusted under 35 U.S.C. 154(b) by 133 days.

(21) Appl. No.: 13/440,353

(22) Filed: Apr. 5, 2012

(65) Prior Publication Data

US 2012/0259548 A1    Oct. 11, 2012

(30) Foreign Application Priority Data

Apr. 7, 2011 (JP) ................................. 2011-085358

(51) Int. Cl.
*G01C 21/00* (2006.01)
*G06F 7/00* (2006.01)

(52) U.S. Cl.
USPC .............................................. 701/533; 701/1

(58) Field of Classification Search
USPC ........................................................ 701/1, 533
See application file for complete search history.

(56) References Cited

U.S. PATENT DOCUMENTS 6,879,962 B1 * 4/2005 Smith et al. .................... 705/22
2011/0246060 A1   10/2011 Shimizu

FOREIGN PATENT DOCUMENTS

| JP | 2006-329932 | 12/2006 |
| JP | 2008-045925 | 2/2008 |
| JP | 2009-139129 | 6/2009 |

* cited by examiner

*Primary Examiner* — Ian Jen
(74) *Attorney, Agent, or Firm* — Harness, Dickey Pierce, PLC

(57) ABSTRACT

A branch point diagram system includes a terminal disposed on a movable body for displaying a branch point diagram of a branch point and a delivery server for delivering branch road part to the terminal according to a delivery schedule when the terminal approaches a branch point. The delivery server calculates the delivery load of delivering the branch road part according to the schedule. In view of the calculation results of the delivery load, the delivery schedule is revised, and the branch road part is delivered to the terminal according to the revised schedule. The terminal then displays the branch point diagram for the branch point after generating the branch point diagram based on the branch road parts and positional data received from the delivery.

32 Claims, 37 Drawing Sheets

| BRANCH POINT ID | REQUIRED PARTS |
|---|---|
| 1 | A, B |
| 2 | C, D |
| 3 | A, B |
| 4 | E |
| 5 | F, G, H, I |
| 6 | J |

| PART | DATA AMOUNT (kB) |
|---|---|
| A | 50 |
| B | 60 |
| C | 40 |
| D | 70 |
| E | 20 |
| F | 80 |
| G | 10 |
| H | 30 |
| I | 20 |
| J | 50 |

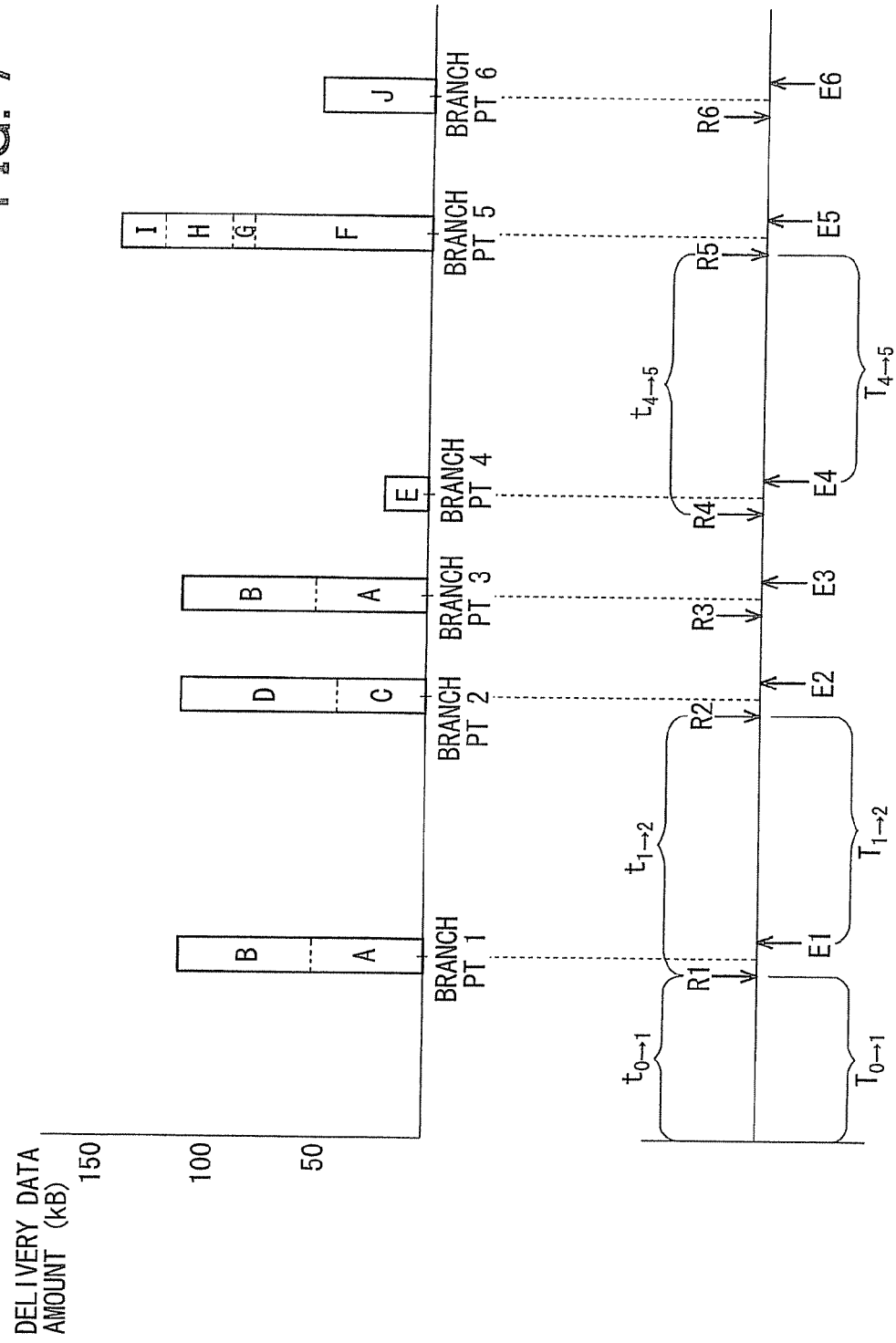

FIG. 8

| $t_{k-1 \to k}$ | |
|---|---|
| $t_{0 \to 1}$ | 108 |
| $t_{1 \to 2}$ | 210 |
| $t_{2 \to 3}$ | 76 |
| $t_{3 \to 4}$ | 85 |
| $t_{4 \to 5}$ | 160 |
| $t_{5 \to 6}$ | 270 |

| $T_{k-1 \to k}$ | |
|---|---|
| $T_{0 \to 1}$ | 108 |
| $T_{1 \to 2}$ | 150 |
| $T_{2 \to 3}$ | 16 |
| $T_{3 \to 4}$ | 25 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 0 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 110 |
| $D_2$ | 110 |
| $D_3$ | 110 |
| $D_4$ | 20 |
| $D_5$ | 140 |
| $D_6$ | 50 |

| $N_k$ | |
|---|---|
| $N_1$ | 3 |
| $N_2$ | 10 |
| $N_3$ | 15 |
| $N_4$ | 8 |
| $N_5$ | 20 |
| $N_6$ | 6 |

| BRANCH POINT ID | DELIVERY LOAD L | THRESHOLD S | L/S |
|---|---|---|---|
| 1 | 1.018519 | 2 | 0.5092593 |
| 2 | 0.52381 | 0.6 | 0.8730159 |
| 3 | 1.447368 | 0.4 | 3.6184211 |
| 4 | 0.235294 | 0.75 | 0.3137255 |
| 5 | 0.875 | 0.3 | 2.9166667 |
| 6 | 0.185185 | 1 | 0.1851852 |

| BRANCH POINT ID | ACQUIRED PARTS |
|---|---|
| 1 | A B |
| 2 | C D |
| 3 | A B |
| 4 | E |
| 5 | F G H I |
| 6 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | | A B | 9:02"48 | | A B | N.A. |
| BRANCH POINT 2 | 9:05"18 | | C D | 9:06"18 | | C D | N.A. |
| BRANCH POINT 3 | 9:06"34 | | A B | 9:07"34 | | A B | N.A. |
| BRANCH POINT 4 | 9:07"59 | | E | 9:08"59 | | E | N.A. |
| BRANCH POINT 5 | 9:10"39 | | F G H I | 9:11"39 | | F G H I | N.A. |
| BRANCH POINT 6 | 9:15"09 | | J | 9:16"09 | | J | N.A. |

FIG. 10

| $t_{k-1 \to k}$ | |
|---|---|
| $t_{0 \to 1}$ | 108 |
| $t_{1 \to 2}$ | 210 |
| $t_{2 \to 3}$ | 76 |
| $t_{3 \to 4}$ | 85 |
| $t_{4 \to 5}$ | 160 |
| $t_{5 \to 6}$ | 270 |

| $T_{k-1 \to k}$ | |
|---|---|
| $T_{0 \to 1}$ | 108 |
| $T_{1 \to 2}$ | 150 |
| $T_{2 \to 3}$ | 16 |
| $T_{3 \to 4}$ | 25 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 0 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 110 |
| $D_2$ | 110 |
| $D_3$ | 110 |
| $D_4$ | 120 |
| $D_5$ | 40 |
| $D_6$ | 50 |

| $N_k$ | |
|---|---|
| $N_1$ | 3 |
| $N_2$ | 10 |
| $N_3$ | 15 |
| $N_4$ | 8 |
| $N_5$ | 20 |
| $N_6$ | 6 |

| BRANCH POINT ID | DELIVERY LOAD L | THRESHOLD S | L/S |
|---|---|---|---|
| 1 | 1.018519 | 2 | 0.5092593 |
| 2 | 0.52381 | 0.6 | 0.8730159 |
| 3 | 1.447368 | 0.4 | 3.6184211 |
| 4 | 1.411765 | 0.75 | 1.882353 |
| 5 | 0.25 | 0.3 | 0.833333 |
| 6 | 0.185185 | 1 | 0.1851852 |

| BRANCH POINT ID | ACQUIRED PARTS |
|---|---|
| 1 | A B |
| 2 | C D |
| 3 | A B |
| 4 | E F I |
| 5 | G H |
| 6 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01" 48 | | A B | 9:02" 48 | | A B | N.A. |
| BRANCH POINT 2 | 9:05" 18 | | C D | 9:06" 18 | | C D | N.A. |
| BRANCH POINT 3 | 9:06" 34 | | A B | 9:07" 34 | | A B | N.A. |
| BRANCH POINT 4 | 9:07" 59 | | E F I | 9:08" 59 | | E | F I |
| BRANCH POINT 5 | 9:10" 39 | | G H | 9:11" 39 | | F G H I | N.A. |
| BRANCH POINT 6 | 9:15" 09 | | J | 9:16" 09 | | J | N.A. |

FIG. 11

| $t_{k-1 \to k}$ | |
|---|---|
| $t_{0 \to 1}$ | 108 |
| $t_{1 \to 2}$ | 210 |
| $t_{2 \to 3}$ | 76 |
| $t_{3 \to 4}$ | 85 |
| $t_{4 \to 5}$ | 160 |
| $t_{5 \to 6}$ | 270 |

| $T_{k-1 \to k}$ | |
|---|---|
| $T_{0 \to 1}$ | 108 |
| $T_{1 \to 2}$ | 150 |
| $T_{2 \to 3}$ | 16 |
| $T_{3 \to 4}$ | 25 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 0 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 110 |
| $D_2$ | 110 |
| $D_3$ | 190 |
| $D_4$ | 40 |
| $D_5$ | 40 |
| $D_6$ | 50 |

| $N_k$ | |
|---|---|
| $N_1$ | 3 |
| $N_2$ | 10 |
| $N_3$ | 15 |
| $N_4$ | 8 |
| $N_5$ | 20 |
| $N_6$ | 6 |

| BRANCH POINT ID | DELIVERY LOAD L | THRESHOLD S | L/S |
|---|---|---|---|
| 1 | 1.018519 | 2 | 0.5092593 |
| 2 | 0.52381 | 0.6 | 0.8730159 |
| 3 | 2.5 | 0.4 | 6.25 |
| 4 | 0.470588 | 0.75 | 0.627451 |
| 5 | 0.25 | 0.3 | 0.833333 |
| 6 | 0.185185 | 1 | 0.1851852 |

| BRANCH POINT ID | ACQUIRED PARTS |
|---|---|
| 1 | A B |
| 2 | C D |
| 3 | A B F |
| 4 | E I |
| 5 | G H |
| 6 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | | A B | 9:02"48 | | A B | N.A. |
| BRANCH POINT 2 | 9:05"18 | | C D | 9:06"18 | | C D | N.A. |
| BRANCH POINT 3 | 9:06"34 | | A B F | 9:07"34 | | A B | F |
| BRANCH POINT 4 | 9:07"59 | | E I | 9:08"59 | | E | F I |
| BRANCH POINT 5 | 9:10"39 | | G H | 9:11"39 | | F G H I | N.A. |
| BRANCH POINT 6 | 9:15"09 | | J | 9:16"09 | | J | N.A. |

FIG. 12

| $t_{k-1 \to k}$ | |
|---|---|
| $t_{0 \to 1}$ | 108 |
| $t_{1 \to 2}$ | 210 |
| $t_{2 \to 3}$ | 76 |
| $t_{3 \to 4}$ | 85 |
| $t_{4 \to 5}$ | 160 |
| $t_{5 \to 6}$ | 270 |

| $T_{k-1 \to k}$ | |
|---|---|
| $T_{0 \to 1}$ | 108 |
| $T_{1 \to 2}$ | 150 |
| $T_{2 \to 3}$ | 16 |
| $T_{3 \to 4}$ | 25 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 2 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 110 |
| $D_2$ | 300 |
| $D_3$ | 0 |
| $D_4$ | 40 |
| $D_5$ | 40 |
| $D_6$ | 50 |

| $N_k$ | |
|---|---|
| $N_1$ | 3 |
| $N_2$ | 10 |
| $N_3$ | 15 |
| $N_4$ | 8 |
| $N_5$ | 20 |
| $N_6$ | 6 |

| BRANCH POINT ID | DELIVERY LOAD L | THRESHOLD S | L/S |
|---|---|---|---|
| 1 | 1.018519 | 2 | 0.5092593 |
| 2 | 5.428571 | 0.6 | 9.047619 |
| 3 | 0 | 0.4 | 0 |
| 4 | 0.470588 | 0.75 | 0.627451 |
| 5 | 0.25 | 0.3 | 0.833333 |
| 6 | 0.185185 | 1 | 0.1851852 |

| BRANCH POINT ID | ACQUIRED PARTS |
|---|---|
| 1 | A B |
| 2 | C D A B F |
| 3 |  |
| 4 | E I |
| 5 | G H |
| 6 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | | A B | 9:02"48 | | A B | N.A. |
| BRANCH POINT 2 | 9:05"18 | | A B C D F | 9:06"18 | | C D | A B F |
| BRANCH POINT 3 | 9:06"34 | | | 9:07"34 | | A B | F |
| BRANCH POINT 4 | 9:07"59 | | E I | 9:08"59 | | E | F I |
| BRANCH POINT 5 | 9:10"39 | | G H | 9:11"39 | | F G H I | N.A. |
| BRANCH POINT 6 | 9:15"09 | | J | 9:16"09 | | J | N.A. |

FIG. 13

| $t_{k-1 \to k}$ | |
|---|---|
| $t_{0 \to 1}$ | 108 |
| $t_{1 \to 2}$ | 210 |
| $t_{2 \to 3}$ | 76 |
| $t_{3 \to 4}$ | 85 |
| $t_{4 \to 5}$ | 160 |
| $t_{5 \to 6}$ | 270 |

| $T_{k-1 \to k}$ | |
|---|---|
| $T_{0 \to 1}$ | 108 |
| $T_{1 \to 2}$ | 150 |
| $T_{2 \to 3}$ | 16 |
| $T_{3 \to 4}$ | 25 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 0 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 110 |
| $D_2$ | 190 |
| $D_3$ | 0 |
| $D_4$ | 40 |
| $D_5$ | 40 |
| $D_6$ | 50 |

| $N_k$ | |
|---|---|
| $N_1$ | 3 |
| $N_2$ | 10 |
| $N_3$ | 15 |
| $N_4$ | 8 |
| $N_5$ | 20 |
| $N_6$ | 6 |

| BRANCH POINT ID | DELIVERY LOAD L | THRESHOLD S | L/S |
|---|---|---|---|
| 1 | 1.018519 | 2 | 0.5092593 |
| 2 | 0.904762 | 0.6 | 1.507937 |
| 3 | 0 | 0.4 | 0 |
| 4 | 0.470588 | 0.75 | 0.627451 |
| 5 | 0.25 | 0.3 | 0.833333 |
| 6 | 0.185185 | 1 | 0.1851852 |

| BRANCH POINT ID | ACQUIRED PARTS |
|---|---|
| 1 | A B |
| 2 | C D F |
| 3 | |
| 4 | E I |
| 5 | G H |
| 6 | J |

| | ACQUISITION TIMING | ACTUAL TIMING | ACQUIRED PARTS | ERASE TIMING | ACTUAL TIMING | ACQUIRED PARTS | ERASE PARTS | STOCK PARTS |
|---|---|---|---|---|---|---|---|---|
| BRANCH POINT 1 | 9:01"48 | | A B | 9:02"48 | | | | A B |
| BRANCH POINT 2 | 9:05"18 | | C D F | 9:06"18 | | | C D | A B F |
| BRANCH POINT 3 | 9:06"34 | | | 9:07"34 | | | A B | F |
| BRANCH POINT 4 | 9:07"59 | | E I | 9:08"59 | | | E | F I |
| BRANCH POINT 5 | 9:10"39 | | G H | 9:11"39 | | | F G H I | N.A. |
| BRANCH POINT 6 | 9:15"09 | | J | 9:16"09 | | | J | N.A. |

FIG. 14

| $t_{k-1 \to k}$ | |
|---|---|
| $t_{0 \to 1}$ | 108 |
| $t_{1 \to 2}$ | 210 |
| $t_{2 \to 3}$ | 76 |
| $t_{3 \to 4}$ | 85 |
| $t_{4 \to 5}$ | 160 |
| $t_{5 \to 6}$ | 270 |

| $T_{k-1 \to k}$ | |
|---|---|
| $T_{0 \to 1}$ | 108 |
| $T_{1 \to 2}$ | 150 |
| $T_{2 \to 3}$ | 16 |
| $T_{3 \to 4}$ | 25 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 0 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 190 |
| $D_2$ | 110 |
| $D_3$ | 0 |
| $D_4$ | 40 |
| $D_5$ | 40 |
| $D_6$ | 50 |

| $N_k$ | |
|---|---|
| $N_1$ | 3 |
| $N_2$ | 10 |
| $N_3$ | 15 |
| $N_4$ | 8 |
| $N_5$ | 20 |
| $N_6$ | 6 |

| BRANCH POINT ID | DELIVERY LOAD L | THRESHOLD S | L/S |
|---|---|---|---|
| 1 | 1.759259 | 2 | 0.87963 |
| 2 | 0.52381 | 0.6 | 0.873016 |
| 3 | 0 | 0.4 | 0 |
| 4 | 0.470588 | 0.75 | 0.627451 |
| 5 | 0.25 | 0.3 | 0.833333 |
| 6 | 0.185185 | 1 | 0.1851852 |

| BRANCH POINT ID | ACQUIRED PARTS |
|---|---|
| 1 | A B F |
| 2 | C D |
| 3 | |
| 4 | E I |
| 5 | G H |
| 6 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | | A B F | 9:02"48 | | | A B F |
| BRANCH POINT 2 | 9:05"18 | | C D | 9:06"18 | | C D | A B F |
| BRANCH POINT 3 | 9:06"34 | | | 9:07"34 | | A B | F |
| BRANCH POINT 4 | 9:07"59 | | E I | 9:08"59 | | E | F I |
| BRANCH POINT 5 | 9:10"39 | | G H | 9:11"39 | | F G H I | N.A. |
| BRANCH POINT 6 | 9:15"09 | | J | 9:16"09 | | J | N.A. |

FIG. 23

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | 9:01"48 | A B F | 9:02"48 | | | A B F |
| BRANCH POINT 2 | 9:05"18 | | C D | 9:06"18 | | C D | A B F |
| BRANCH POINT 3 | 9:06"34 | | | 9:07"34 | | A B | F |
| BRANCH POINT 4 | 9:07"59 | | E I | 9:08"59 | | E | F I |
| BRANCH POINT 5 | 9:10"39 | | G H | 9:11"39 | | F G H I | N.A. |
| BRANCH POINT 6 | 9:15"09 | | J | 9:16"09 | | J | N.A. |

FIG. 24

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | 9:01"48 | A B F | 9:02"48 | 9:03"00 | | A B F |
| BRANCH POINT 2 | 9:05"30 | | C D | 9:06"30 | | C D | A B F |
| BRANCH POINT 3 | 9:06"46 | | | 9:07"46 | | A B | F |
| BRANCH POINT 4 | 9:08"11 | | E I | 9:09"11 | | E | F I |
| BRANCH POINT 5 | 9:10"51 | | G H | 9:11"51 | | F G H I | N.A. |
| BRANCH POINT 6 | 9:15"21 | | J | 9:16"21 | | J | N.A. |

FIG. 25

| $t_{k-1 \to k}$ | |
|---|---|
| $t_{0 \to 1}$ | 108 |
| $t_{1 \to 2}$ | 400 |
| $t_{2 \to 3}$ | 500 |
| $t_{3 \to 4}$ | 300 |
| $t_{4 \to 5}$ | 130 |
| $t_{5 \to 6}$ | 270 |

| $T_{k-1 \to k}$ | |
|---|---|
| $T_{0 \to 1}$ | 108 |
| $T_{1 \to 2}$ | 328 |
| $T_{2 \to 3}$ | 300 |
| $T_{3 \to 4}$ | 120 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 0 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 190 |
| $D_2$ | 110 |
| $D_3$ | 0 |
| $D_4$ | 40 |
| $D_5$ | 40 |
| $D_6$ | 50 |

| $N_k$ | |
|---|---|
| $N_1$ | 3 |
| $N_2$ | 17 |
| $N_3$ | 51 |
| $N_4$ | 4 |
| $N_5$ | 20 |
| $N_6$ | 6 |

| BRANCH POINT ID | DELIVERY LOAD L | THRESHOLD S | L/S |
|---|---|---|---|
| 1 | 1.759259 | 2 | 0.87963 |
| 2 | 0.275 | 0.352941 | 0.779167 |
| 3 | 0 | 0.117647 | 0 |
| 4 | 0.133333 | 1.5 | 0.088889 |
| 5 | 0.307692 | 0.3 | 1.025641 |
| 6 | 0.185185 | 1 | 0.185185 |

| BRANCH POINT ID | ACQUIRED PARTS |
|---|---|
| 1 | A B F |
| 2 | C D |
| 3 | |
| 4 | E I |
| 5 | G H |
| 6 | J |

RESET →

| BRANCH POINT ID | ACQUIRED PARTS |
|---|---|
| 1 | A B F |
| 2 | C D |
| 3 | A B |
| 4 | E |
| 5 | F G H I |
| 6 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01" 48 | 9:01" 48 | A B F | 9:02" 48 | 9:03" 00 | | A B F |
| BRANCH POINT 2 | 9:08" 28 | | C D | 9:11" 48 | | C D A B F | A B F |
| BRANCH POINT 3 | 9:16" 48 | | | 9:19" 48 | | A B | F |
| BRANCH POINT 4 | 9:21" 48 | | E I | 9:22" 18 | | E | F I |
| BRANCH POINT 5 | 9:23" 58 | | G H | 9:24" 58 | | F G H I | N.A. |
| BRANCH POINT 6 | 9:28" 28 | | J | 9:29" 28 | | J | N.A. |

FIG. 26

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01″48 | 9:01″48 | A B F | 9:02″48 | 9:03″00 | | A B F |
| BRANCH POINT 2 | 9:08″28 | | C D | 9:11″48 | | A B C D F | N.A. |
| BRANCH POINT 3 | 9:16″48 | | A B | 9:19″48 | | A B | N.A. |
| BRANCH POINT 4 | 9:21″48 | | E | 9:22″18 | | E | N.A. |
| BRANCH POINT 5 | 9:23″58 | | F G H I | 9:24″58 | | F G H I | N.A. |
| BRANCH POINT 6 | 9:28″28 | | J | 9:29″28 | | J | N.A. |

FIG. 28

| $t_{k-1 \to k}$ | |
|---|---|
| $t_{0 \to 1}$ | 108 |
| $t_{1 \to 2}$ | 400 |
| $t_{2 \to 3}$ | 500 |
| $t_{3 \to 4}$ | 300 |
| $t_{4 \to 5}$ | 130 |
| $t_{5 \to 6}$ | 270 |

| $T_{k-1 \to k}$ | |
|---|---|
| $T_{0 \to 1}$ | 108 |
| $T_{1 \to 2}$ | 328 |
| $T_{2 \to 3}$ | 300 |
| $T_{3 \to 4}$ | 120 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 0 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 190 |
| $D_2$ | 110 |
| $D_3$ | 110 |
| $D_4$ | 20 |
| $D_5$ | 140 |
| $D_6$ | 50 |

| $N_k$ | |
|---|---|
| $N_1$ | 3 |
| $N_2$ | 17 |
| $N_3$ | 51 |
| $N_4$ | 4 |
| $N_5$ | 20 |
| $N_6$ | 6 |

| BRANCH POINT ID | DELIVERY LOAD L | THRESHOLD S | L/S | ACQUIRED PARTS |
|---|---|---|---|---|
| 1 | 1.759259 | 2 | 0.87963 | A B F |
| 2 | 0.275 | 0.352941 | 0.779167 | C D |
| 3 | 0.22 | 0.117647 | 1.87 | A B |
| 4 | 0.066667 | 1.5 | 0.044444 | E |
| 5 | 1.076923 | 0.3 | 3.589744 | F G H I |
| 6 | 0.185185 | 1 | 0.185185 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | 9:01"48 | A B F | 9:02"48 | 9:03"00 | C D A B F | A B F |
| BRANCH POINT 2 | 9:08"28 | | C D | 9:11"48 | | | N.A. |
| BRANCH POINT 3 | 9:16"48 | | A B | 9:19"48 | | A B | N.A. |
| BRANCH POINT 4 | 9:21"48 | | E | 9:22"18 | | E | N.A. |
| BRANCH POINT 5 | 9:23"58 | | F G H I | 9:24"58 | | F G H I | N.A. |
| BRANCH POINT 6 | 9:28"28 | | J | 9:29"28 | | J | N.A. |

| CURRENT STOCK DATA |
|---|
| A B F |

FIG. 29

| $t_{k-1 \to k}$ | |
|---|---|
| $t_{0 \to 1}$ | 108 |
| $t_{1 \to 2}$ | 400 |
| $t_{2 \to 3}$ | 500 |
| $t_{3 \to 4}$ | 300 |
| $t_{4 \to 5}$ | 130 |
| $t_{5 \to 6}$ | 270 |

| $T_{k-1 \to k}$ | |
|---|---|
| $T_{0 \to 1}$ | 108 |
| $T_{1 \to 2}$ | 328 |
| $T_{2 \to 3}$ | 300 |
| $T_{3 \to 4}$ | 120 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 0 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 190 |
| $D_2$ | 110 |
| $D_3$ | 110 |
| $D_4$ | 130 |
| $D_5$ | 30 |
| $D_6$ | 50 |

| $N_k$ | |
|---|---|
| $N_1$ | 3 |
| $N_2$ | 17 |
| $N_3$ | 51 |
| $N_4$ | 4 |
| $N_5$ | 20 |
| $N_6$ | 6 |

| BRANCH POINT ID | DELIVERY LOAD L | THRESHOLD S | L/S | ACQUIRED PARTS |
|---|---|---|---|---|
| 1 | 1.759259 | 2 | 0.87963 | A B F |
| 2 | 0.275 | 0.352941 | 0.779167 | C D |
| 3 | 0.22 | 0.117647 | 1.87 | A B |
| 4 | 0.433333 | 1.5 | 0.288889 | E F G I |
| 5 | 0.230769 | 0.3 | 0.769231 | H |
| 6 | 0.185185 | 1 | 0.185185 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01″48 | 9:01″48 | A B F | 9:02″48 | 9:03″00 | C D A B F | A B F |
| BRANCH POINT 2 | 9:08″28 | | C D | 9:11″48 | | A B | N.A. |
| BRANCH POINT 3 | 9:16″48 | | A B | 9:19″48 | | E | N.A. |
| BRANCH POINT 4 | 9:21″48 | | E F G I | 9:22″18 | | F G H I | F G I |
| BRANCH POINT 5 | 9:23″58 | | H | 9:24″58 | | J | N.A. |
| BRANCH POINT 6 | 9:28″28 | | J | 9:29″28 | | | N.A. |

| CURRENT STOCK DATA |
|---|
| A B F |

FIG. 30

| $t_{k-1 \to k}$ | |
|---|---|
| $t_{0 \to 1}$ | 108 |
| $t_{1 \to 2}$ | 400 |
| $t_{2 \to 3}$ | 500 |
| $t_{3 \to 4}$ | 300 |
| $t_{4 \to 5}$ | 130 |
| $t_{5 \to 6}$ | 270 |

| $T_{k-1 \to k}$ | |
|---|---|
| $T_{0 \to 1}$ | 108 |
| $T_{1 \to 2}$ | 328 |
| $T_{2 \to 3}$ | 300 |
| $T_{3 \to 4}$ | 120 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 2 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 190 |
| $D_2$ | 220 |
| $D_3$ | 0 |
| $D_4$ | 130 |
| $D_5$ | 30 |
| $D_6$ | 50 |

| $N_k$ | |
|---|---|
| $N_1$ | 3 |
| $N_2$ | 17 |
| $N_3$ | 51 |
| $N_4$ | 4 |
| $N_5$ | 20 |
| $N_6$ | 6 |

| BRANCH POINT ID | DELIVERY LOAD L | THRESHOLD S | L/S |
|---|---|---|---|
| 1 | 1.759259 | 2 | 0.87963 |
| 2 | 1.891463 | 0.352941 | 5.359146 |
| 3 | 0 | 0.117647 | 0 |
| 4 | 0.433333 | 1.5 | 0.288889 |
| 5 | 0.230769 | 0.3 | 0.769231 |
| 6 | 0.185185 | 1 | 0.185185 |

| BRANCH POINT ID | ACQUIRED PARTS |
|---|---|
| 1 | A B F |
| 2 | A B C D |
| 3 | |
| 4 | E F G I |
| 5 | H |
| 6 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01" 48 | 9:01" 48 | A B F | 9:02" 48 | 9:03" 00 | | A B F |
| BRANCH POINT 2 | 9:08" 28 | | A B C D | 9:11" 48 | | C D F | A B |
| BRANCH POINT 3 | 9:16" 48 | | A B | 9:19" 48 | | A B | N.A. |
| BRANCH POINT 4 | 9:21" 48 | | E F G I | 9:22" 18 | | E | F G I |
| BRANCH POINT 5 | 9:23" 58 | | H | 9:24" 58 | | F G H I | N.A. |
| BRANCH POINT 6 | 9:28" 28 | | J | 9:29" 28 | | J | N.A. |

| CURRENT STOCK DATA |
|---|
| A B F |

FIG. 31

| $t_{k-1 \to k}$ | |
|---|---|
| $t_{0 \to 1}$ | 108 |
| $t_{1 \to 2}$ | 400 |
| $t_{2 \to 3}$ | 500 |
| $t_{3 \to 4}$ | 300 |
| $t_{4 \to 5}$ | 130 |
| $t_{5 \to 6}$ | 270 |

| $T_{k-1 \to k}$ | |
|---|---|
| $T_{0 \to 1}$ | 108 |
| $T_{1 \to 2}$ | 328 |
| $T_{2 \to 3}$ | 300 |
| $T_{3 \to 4}$ | 120 |
| $T_{4 \to 5}$ | 100 |
| $T_{5 \to 6}$ | 210 |

| $C_{k-1 \to k}$ | |
|---|---|
| $C_{0 \to 1}$ | 0 |
| $C_{1 \to 2}$ | 0 |
| $C_{2 \to 3}$ | 0 |
| $C_{3 \to 4}$ | 0 |
| $C_{4 \to 5}$ | 0 |
| $C_{5 \to 6}$ | 0 |

| $D_k$ | |
|---|---|
| $D_1$ | 190 |
| $D_2$ | 110 |
| $D_3$ | 0 |
| $D_4$ | 130 |
| $D_5$ | 30 |
| $D_6$ | 50 |

| $N_k$ | |
|---|---|
| $N_1$ | 3 |
| $N_2$ | 17 |
| $N_3$ | 51 |
| $N_4$ | 4 |
| $N_5$ | 20 |
| $N_6$ | 6 |

| BRANCH POINT ID | DELIVERY LOAD L | THRESHOLD S | L/S | ACQUIRED PARTS |
|---|---|---|---|---|
| 1 | 1.759259 | 2 | 0.87963 | A B F |
| 2 | 0.275 | 0.352941 | 0.779167 | C D |
| 3 | 0 | 0.117647 | 0 | |
| 4 | 0.433333 | 1.5 | 0.288889 | E F G I |
| 5 | 0.230769 | 0.3 | 0.769231 | H |
| 6 | 0.185185 | 1 | 0.185185 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01″48 | 9:01″48 | A B F | 9:02″48 | 9:03″00 | | A B F |
| BRANCH POINT 2 | 9:08″28 | | C D | 9:11″48 | | C D F | A B |
| BRANCH POINT 3 | 9:16″48 | | A B | 9:19″48 | | A B | N.A. |
| BRANCH POINT 4 | 9:21″48 | | E F G I | 9:22″18 | | E | F G I |
| BRANCH POINT 5 | 9:23″58 | | H | 9:24″58 | | F G H I | N.A. |
| BRANCH POINT 6 | 9:28″28 | | J | 9:29″28 | | J | N.A. |

| CURRENT STOCK DATA |
|---|
| A B F |

| BRANCH POINT ID | REQUIRED PARTS |
|---|---|
| 1 | A, B |
| 2 | C, D |
| 7 | H, J |
| 8 | A, C, D |
| 9 | H, I |
| 6 | J |

FIG. 34

| $t_{k-1 \to k}$ | |
|---|---|
| $t_{0 \to 1}$ | 108 |
| $t_{1 \to 2}$ | 210 |
| $t_{2 \to 7}$ | 240 |
| $t_{7 \to 8}$ | 85 |
| $t_{8 \to 9}$ | 160 |
| $t_{9 \to 6}$ | 150 |

| $T_{k-1 \to k}$ | |
|---|---|
| $T_{0 \to 1}$ | 108 |
| $T_{1 \to 2}$ | 150 |
| $T_{2 \to 7}$ | 180 |
| $T_{7 \to 8}$ | 55 |
| $T_{8 \to 9}$ | 100 |
| $T_{9 \to 6}$ | 90 |

| $C_{k-1 \to k}$ | |
|---|---|
| $C_{0 \to 1}$ | 0 |
| $C_{1 \to 2}$ | 0 |
| $C_{2 \to 7}$ | 0 |
| $C_{7 \to 8}$ | 0 |
| $C_{8 \to 9}$ | 0 |
| $C_{9 \to 6}$ | 0 |

| $D_k$ | |
|---|---|
| $D_1$ | 190 |
| $D_2$ | 110 |
| $D_7$ | 80 |
| $D_8$ | 160 |
| $D_9$ | 50 |
| $D_6$ | 50 |

| $N_k$ | |
|---|---|
| $N_1$ | 3 |
| $N_2$ | 10 |
| $N_7$ | 7 |
| $N_8$ | 5 |
| $N_9$ | 10 |
| $N_6$ | 20 |

| BRANCH POINT ID | DELIVERY LOAD L | THRESHOLD S | L/S |
|---|---|---|---|
| 1 | 1.759259 | 2 | 0.87963 |
| 2 | 0.52381 | 0.6 | 0.873016 |
| 7 | 0.333333 | 0.857143 | 0.388889 |
| 8 | 1.882353 | 1.2 | 1.568627 |
| 9 | 0.3125 | 0.6 | 0.520833 |
| 6 | 0.333333 | 0.3 | 1.111111 |

| BRANCH POINT ID | ACQUIRED PARTS |
|---|---|
| 1 | A B F |
| 2 | C D |
| 7 | H J |
| 8 | A C D |
| 9 | H I |
| 6 | J |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01″48 | 9:01″48 | A B F | 9:02″48 | 9:03″00 | A B C D F | A B F |
| BRANCH POINT 2 | 9:05″18 | | C D | 9:06″18 | | H J | N.A. |
| BRANCH POINT 7 | 9:09″18 | | H J | 9:09″48 | | | N.A. |
| BRANCH POINT 8 | 9:10″43 | | A C D | 9:11″43 | | A C D | N.A. |
| BRANCH POINT 9 | 9:13″23 | | H I | 9:14″23 | | H I | N.A. |
| BRANCH POINT 6 | 9:15″53 | | J | 9:17″23 | | J | N.A. |

| CURRENT STOCK DATA |
|---|
| A B C D F |

FIG. 35

| $t_{k-1 \to k}$ | |
|---|---|
| $t_{0 \to 1}$ | 108 |
| $t_{1 \to 2}$ | 210 |
| $t_{2 \to 7}$ | 240 |
| $t_{7 \to 8}$ | 85 |
| $t_{8 \to 9}$ | 160 |
| $t_{9 \to 6}$ | 150 |

| $T_{k-1 \to k}$ | |
|---|---|
| $T_{0 \to 1}$ | 108 |
| $T_{1 \to 2}$ | 150 |
| $T_{2 \to 7}$ | 180 |
| $T_{7 \to 8}$ | 55 |
| $T_{8 \to 9}$ | 100 |
| $T_{9 \to 6}$ | 90 |

| $C_{k-1 \to k}$ | |
|---|---|
| $C_{0 \to 1}$ | 0 |
| $C_{1 \to 2}$ | 0 |
| $C_{2 \to 7}$ | 0 |
| $C_{7 \to 8}$ | 0 |
| $C_{8 \to 9}$ | 0 |
| $C_{9 \to 6}$ | 0 |

| $D_k$ | |
|---|---|
| $D_1$ | 190 |
| $D_2$ | 110 |
| $D_7$ | 80 |
| $D_8$ | 160 |
| $D_9$ | 100 |
| $D_6$ | 0 |

| $N_k$ | |
|---|---|
| $N_1$ | 3 |
| $N_2$ | 10 |
| $N_7$ | 7 |
| $N_8$ | 5 |
| $N_9$ | 10 |
| $N_6$ | 20 |

| BRANCH POINT ID | DELIVERY LOAD L | THRESHOLD S | L/S |
|---|---|---|---|
| 1 | 1.759259 | 2 | 0.87963 |
| 2 | 0.52381 | 0.6 | 0.873016 |
| 7 | 0.333333 | 0.857143 | 0.388889 |
| 8 | 1.882353 | 1.2 | 1.568627 |
| 9 | 0.625 | 0.6 | 1.041667 |
| 6 | 0 | 0.3 | 0 |

| BRANCH POINT ID | ACQUIRED PARTS |
|---|---|
| 1 | A B F |
| 2 | C D |
| 7 | H J |
| 8 | A C D |
| 9 | H I J |
| 6 | |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | 9:01"48 | A B F | 9:02"48 | 9:03"00 | | A B F |
| BRANCH POINT 2 | 9:05"18 | | C D | 9:06"18 | | A B C D F | N.A. |
| BRANCH POINT 7 | 9:09"18 | | H J | 9:09"48 | | H J | N.A. |
| BRANCH POINT 8 | 9:10"43 | | A C D | 9:11"43 | | A C D | N.A. |
| BRANCH POINT 9 | 9:13"23 | | H I J | 9:14"23 | | H I | J |
| BRANCH POINT 6 | 9:15"53 | | | 9:17"23 | | J | N.A. |

| CURRENT STOCK DATA |
|---|
| A B C D F |

FIG. 36

| $t_{k-1 \to k}$ | |
|---|---|
| $t_{0 \to 1}$ | 108 |
| $t_{1 \to 2}$ | 210 |
| $t_{2 \to 7}$ | 240 |
| $t_{7 \to 8}$ | 85 |
| $t_{8 \to 9}$ | 160 |
| $t_{9 \to 6}$ | 150 |

| $T_{k-1 \to k}$ | |
|---|---|
| $T_{0 \to 1}$ | 108 |
| $T_{1 \to 2}$ | 150 |
| $T_{2 \to 7}$ | 180 |
| $T_{7 \to 8}$ | 55 |
| $T_{8 \to 9}$ | 100 |
| $T_{9 \to 6}$ | 90 |

| $C_{k-1 \to k}$ | |
|---|---|
| $C_{0 \to 1}$ | 0 |
| $C_{1 \to 2}$ | 0 |
| $C_{2 \to 7}$ | 0 |
| $C_{7 \to 8}$ | 1 |
| $C_{8 \to 9}$ | 0 |
| $C_{9 \to 6}$ | 0 |

| $D_k$ | |
|---|---|
| $D_1$ | 190 |
| $D_2$ | 110 |
| $D_7$ | 80 |
| $D_8$ | 190 |
| $D_9$ | 70 |
| $D_6$ | 0 |

| $N_k$ | |
|---|---|
| $N_1$ | 3 |
| $N_2$ | 10 |
| $N_7$ | 7 |
| $N_8$ | 5 |
| $N_9$ | 10 |
| $N_6$ | 20 |

| BRANCH POINT ID | ACQUIRED PARTS |
|---|---|
| 1 | A B F |
| 2 | C D |
| 7 | H J |
| 8 | A C D H |
| 9 | I J |
| 6 | |

| BRANCH POINT ID | DELIVERY LOAD L | THRESHOLD S | L/S |
|---|---|---|---|
| 1 | 1.759259 | 2 | 0.87963 |
| 2 | 0.52381 | 0.6 | 0.873016 |
| 7 | 0.333333 | 0.857143 | 0.388889 |
| 8 | 5.68984 | 1.2 | 4.741533 |
| 9 | 0.4375 | 0.6 | 0.729167 |
| 6 | 0 | 0.3 | 0 |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01" 48 | 9:01" 48 | A B F | 9:02" 48 | 9:03" 00 | A B C D F | A B F |
| BRANCH POINT 2 | 9:05" 18 | | C D | 9:06" 18 | | | N.A. |
| BRANCH POINT 7 | 9:09" 18 | | H J | 9:09" 48 | | H J | N.A. |
| BRANCH POINT 8 | 9:10" 43 | | A C D H | 9:11" 43 | | A C D | H |
| BRANCH POINT 9 | 9:13" 23 | | I J | 9:14" 23 | | H I | J |
| BRANCH POINT 6 | 9:15" 53 | | | 9:17" 23 | | J | N.A. |

| CURRENT STOCK DATA |
|---|
| A B C D F |

FIG. 37

| $t_{k-1 \to k}$ | |
|---|---|
| $t_{0 \to 1}$ | 108 |
| $t_{1 \to 2}$ | 210 |
| $t_{2 \to 7}$ | 240 |
| $t_{7 \to 8}$ | 85 |
| $t_{8 \to 9}$ | 160 |
| $t_{9 \to 6}$ | 150 |

| $T_{k-1 \to k}$ | |
|---|---|
| $T_{0 \to 1}$ | 108 |
| $T_{1 \to 2}$ | 150 |
| $T_{2 \to 7}$ | 180 |
| $T_{7 \to 8}$ | 55 |
| $T_{8 \to 9}$ | 100 |
| $T_{9 \to 6}$ | 90 |

| $C_{k-1 \to k}$ | |
|---|---|
| $C_{0 \to 1}$ | 0 |
| $C_{1 \to 2}$ | 0 |
| $C_{2 \to 7}$ | 0 |
| $C_{7 \to 8}$ | 0 |
| $C_{8 \to 9}$ | 0 |
| $C_{9 \to 6}$ | 0 |

| $D_k$ | |
|---|---|
| $D_1$ | 190 |
| $D_2$ | 110 |
| $D_7$ | 80 |
| $D_8$ | 160 |
| $D_9$ | 70 |
| $D_6$ | 0 |

| $N_k$ | |
|---|---|
| $N_1$ | 3 |
| $N_2$ | 10 |
| $N_7$ | 7 |
| $N_8$ | 5 |
| $N_9$ | 10 |
| $N_6$ | 20 |

| BRANCH POINT ID | DELIVERY LOAD L | THRESHOLD S | L/S |
|---|---|---|---|
| 1 | 1.759259 | 2 | 0.87963 |
| 2 | 0.52381 | 0.6 | 0.873016 |
| 7 | 0.333333 | 0.857143 | 0.388889 |
| 8 | 1.882353 | 1.2 | 1.568627 |
| 9 | 0.4375 | 0.6 | 0.729167 |
| 6 | 0 | 0.3 | 0 |

| BRANCH POINT ID | ACQUIRED PARTS |
|---|---|
| 1 | A B F |
| 2 | C D |
| 7 | H J |
| 8 | A C D |
| 9 | I J |
| 6 | |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01" 48 | 9:01" 48 | A B F | 9:02" 48 | 9:03" 00 | A B C D F | A B F |
| BRANCH POINT 2 | 9:05" 18 | | C D | 9:06" 18 | | J | N.A. |
| BRANCH POINT 7 | 9:09" 18 | | H J | 9:09" 48 | | | H |
| BRANCH POINT 8 | 9:10" 43 | | A C D | 9:11" 43 | | A C D | H |
| BRANCH POINT 9 | 9:13" 23 | | I J | 9:14" 23 | | H I | J |
| BRANCH POINT 6 | 9:15" 53 | | | 9:17" 23 | | J | N.A. |

| CURRENT STOCK DATA |
|---|
| A B C D F |

FIG. 38

| $t_{k-1 \to k}$ | |
|---|---|
| $t_{0 \to 1}$ | 108 |
| $t_{1 \to 2}$ | 210 |
| $t_{2 \to 7}$ | 240 |
| $t_{7 \to 8}$ | 85 |
| $t_{8 \to 9}$ | 160 |
| $t_{9 \to 6}$ | 150 |

| $T_{k-1 \to k}$ | |
|---|---|
| $T_{0 \to 1}$ | 108 |
| $T_{1 \to 2}$ | 150 |
| $T_{2 \to 7}$ | 180 |
| $T_{7 \to 8}$ | 55 |
| $T_{8 \to 9}$ | 100 |
| $T_{9 \to 6}$ | 90 |

| $C_{k-1 \to k}$ | |
|---|---|
| $C_{0 \to 1}$ | 0 |
| $C_{1 \to 2}$ | 0 |
| $C_{2 \to 7}$ | 1 |
| $C_{7 \to 8}$ | 0 |
| $C_{8 \to 9}$ | 0 |
| $C_{9 \to 6}$ | 0 |

| $D_k$ | |
|---|---|
| $D_1$ | 190 |
| $D_2$ | 110 |
| $D_7$ | 120 |
| $D_8$ | 120 |
| $D_9$ | 70 |
| $D_6$ | 0 |

| $N_k$ | |
|---|---|
| $N_1$ | 3 |
| $N_2$ | 10 |
| $N_7$ | 7 |
| $N_8$ | 5 |
| $N_9$ | 10 |
| $N_6$ | 20 |

| BRANCH POINT ID | DELIVERY LOAD L | THRESHOLD S | L/S |
|---|---|---|---|
| 1 | 1.759259 | 2 | 0.87963 |
| 2 | 0.52381 | 0.6 | 0.873016 |
| 7 | 1.166667 | 0.857143 | 1.361111 |
| 8 | 1.411765 | 1.2 | 1.176471 |
| 9 | 0.4375 | 0.6 | 0.729167 |
| 6 | 0 | 0.3 | 0 |

| BRANCH POINT ID | ACQUIRED PARTS |
|---|---|
| 1 | A B F |
| 2 | C D |
| 7 | C H J |
| 8 | A D |
| 9 | I J |
| 6 | |

| | ACQUISITION TIMING | ACTUAL TIMING | ACQUIRED PARTS | ERASE TIMING | ACTUAL TIMING | ACQUIRED PARTS | ERASE PARTS | STOCK PARTS |
|---|---|---|---|---|---|---|---|---|
| BRANCH POINT 1 | 9:01"48 | 9:01"48 | A B F | 9:02"48 | 9:03"00 | | A B C D F | A B F |
| BRANCH POINT 2 | 9:05"18 | | C D | 9:06"18 | | | J | N.A. |
| BRANCH POINT 7 | 9:09"18 | | C H J | 9:09"48 | | | J | C H |
| BRANCH POINT 8 | 9:10"43 | | A D | 9:11"43 | | | A C D | H |
| BRANCH POINT 9 | 9:13"23 | | I J | 9:14"23 | | | H I | J |
| BRANCH POINT 6 | 9:15"53 | | | 9:17"23 | | | J | N.A. |

| CURRENT STOCK DATA |
|---|
| A B C D F |

FIG. 39

| $t_{k-1 \to k}$ | |
|---|---|
| $t_{0 \to 1}$ | 108 |
| $t_{1 \to 2}$ | 210 |
| $t_{2 \to 7}$ | 240 |
| $t_{7 \to 8}$ | 85 |
| $t_{8 \to 9}$ | 160 |
| $t_{9 \to 6}$ | 150 |

| $T_{k-1 \to k}$ | |
|---|---|
| $T_{0 \to 1}$ | 108 |
| $T_{1 \to 2}$ | 150 |
| $T_{2 \to 7}$ | 180 |
| $T_{7 \to 8}$ | 55 |
| $T_{8 \to 9}$ | 100 |
| $T_{9 \to 6}$ | 90 |

| $C_{k-1 \to k}$ | |
|---|---|
| $C_{0 \to 1}$ | 0 |
| $C_{1 \to 2}$ | 0 |
| $C_{2 \to 7}$ | 2 |
| $C_{7 \to 8}$ | 0 |
| $C_{8 \to 9}$ | 0 |
| $C_{9 \to 6}$ | 0 |

| $D_k$ | |
|---|---|
| $D_1$ | 190 |
| $D_2$ | 110 |
| $D_7$ | 170 |
| $D_8$ | 70 |
| $D_9$ | 70 |
| $D_6$ | 0 |

| $N_k$ | |
|---|---|
| $N_1$ | 3 |
| $N_2$ | 10 |
| $N_7$ | 7 |
| $N_8$ | 5 |
| $N_9$ | 10 |
| $N_6$ | 20 |

| BRANCH POINT ID | ACQUIRED PARTS |
|---|---|
| 1 | A B F |
| 2 | C D |
| 7 | A C H J |
| 8 | D |
| 9 | I J |
| 6 | |

| BRANCH POINT ID | DELIVERY LOAD L | THRESHOLD S | L/S |
|---|---|---|---|
| 1 | 1.759259 | 2 | 0.87963 |
| 2 | 0.52381 | 0.6 | 0.873016 |
| 7 | 2.597222 | 0.857143 | 3.030093 |
| 8 | 0.823529 | 1.2 | 0.686275 |
| 9 | 0.4375 | 0.6 | 0.729167 |
| 6 | 0 | 0.3 | 0 |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | 9:01"48 | A B F | 9:02"48 | 9:03"00 | A B C D F | A B F |
| BRANCH POINT 2 | 9:05"18 | | C D | 9:06"18 | | | N.A. |
| BRANCH POINT 7 | 9:09"18 | | A C H J | 9:09"48 | | J | A C H |
| BRANCH POINT 8 | 9:10"43 | | D | 9:11"43 | | A C D | H |
| BRANCH POINT 9 | 9:13"23 | | I J | 9:14"23 | | H I | J |
| BRANCH POINT 6 | 9:15"53 | | | 9:17"23 | | J | N.A. |

| CURRENT STOCK DATA |
|---|
| A B C D F |

FIG. 40

| $t_{k-1 \to k}$ | |
|---|---|
| $t_{0 \to 1}$ | 108 |
| $t_{1 \to 2}$ | 210 |
| $t_{2 \to 7}$ | 240 |
| $t_{7 \to 8}$ | 85 |
| $t_{8 \to 9}$ | 160 |
| $t_{9 \to 6}$ | 150 |

| $T_{k-1 \to k}$ | |
|---|---|
| $T_{0 \to 1}$ | 108 |
| $T_{1 \to 2}$ | 150 |
| $T_{2 \to 7}$ | 180 |
| $T_{7 \to 8}$ | 55 |
| $T_{8 \to 9}$ | 100 |
| $T_{9 \to 6}$ | 90 |

| $C_{k-1 \to k}$ | |
|---|---|
| $C_{0 \to 1}$ | 0 |
| $C_{1 \to 2}$ | 0 |
| $C_{2 \to 7}$ | 1 |
| $C_{7 \to 8}$ | 0 |
| $C_{8 \to 9}$ | 0 |
| $C_{9 \to 6}$ | 0 |

| $D_k$ | |
|---|---|
| $D_1$ | 190 |
| $D_2$ | 110 |
| $D_7$ | 130 |
| $D_8$ | 70 |
| $D_9$ | 70 |
| $D_6$ | 0 |

| $N_k$ | |
|---|---|
| $N_1$ | 3 |
| $N_2$ | 10 |
| $N_7$ | 7 |
| $N_8$ | 5 |
| $N_9$ | 10 |
| $N_6$ | 20 |

| BRANCH POINT ID | DELIVERY LOAD L | THRESHOLD S | L/S | ACQUIRED PARTS |
|---|---|---|---|---|
| 1 | 1.759259 | 2 | 0.87963 | A B F |
| 2 | 0.52381 | 0.6 | 0.873016 | C D |
| 7 | 1.263889 | 0.857143 | 1.474537 | A H J |
| 8 | 0.823529 | 1.2 | 0.686275 | D |
| 9 | 0.4375 | 0.6 | 0.729167 | I J |
| 6 | 0 | 0.3 | 0 | |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01″48 | 9:01″48 | A B F | 9:02″48 | 9:03″00 | | A B F |
| BRANCH POINT 2 | 9:05″18 | | C D | 9:06″18 | | A B D F | C |
| BRANCH POINT 7 | 9:09″18 | | A H J | 9:09″48 | | J | A C H |
| BRANCH POINT 8 | 9:10″43 | | D | 9:11″43 | | A C D | H |
| BRANCH POINT 9 | 9:13″23 | | I J | 9:14″23 | | H I | J |
| BRANCH POINT 6 | 9:15″53 | | | 9:17″23 | | J | N.A. |

| CURRENT STOCK DATA |
|---|
| A B C D F |

FIG. 41

| $t_{k-1 \to k}$ | |
|---|---|
| $t_{0 \to 1}$ | 108 |
| $t_{1 \to 2}$ | 210 |
| $t_{2 \to 7}$ | 240 |
| $t_{7 \to 8}$ | 85 |
| $t_{8 \to 9}$ | 160 |
| $t_{9 \to 6}$ | 150 |

| $T_{k-1 \to k}$ | |
|---|---|
| $T_{0 \to 1}$ | 108 |
| $T_{1 \to 2}$ | 150 |
| $T_{2 \to 7}$ | 180 |
| $T_{7 \to 8}$ | 55 |
| $T_{8 \to 9}$ | 100 |
| $T_{9 \to 6}$ | 90 |

| $G_{k-1 \to k}$ | |
|---|---|
| $G_{0 \to 1}$ | 0 |
| $G_{1 \to 2}$ | 0 |
| $G_{2 \to 7}$ | 0 |
| $G_{7 \to 8}$ | 0 |
| $G_{8 \to 9}$ | 0 |
| $G_{9 \to 6}$ | 0 |

| $D_k$ | |
|---|---|
| $D_1$ | 190 |
| $D_2$ | 110 |
| $D_7$ | 80 |
| $D_8$ | 70 |
| $D_9$ | 70 |
| $D_6$ | 0 |

| $N_k$ | |
|---|---|
| $N_1$ | 3 |
| $N_2$ | 10 |
| $N_7$ | 7 |
| $N_8$ | 5 |
| $N_9$ | 10 |
| $N_6$ | 20 |

| BRANCH POINT ID | DELIVERY LOAD L | THRESHOLD S | L/S | ACQUIRED PARTS |
|---|---|---|---|---|
| 1 | 1.759259 | 2 | 0.87963 | A B F |
| 2 | 0.52381 | 0.6 | 0.873016 | C D |
| 7 | 0.333333 | 0.857143 | 0.388889 | H J |
| 8 | 0.823529 | 1.2 | 0.686275 | D |
| 9 | 0.4375 | 0.6 | 0.729167 | I J |
| 6 | 0 | 0.3 | 0 | |

| | ACQUISITION TIMING | ACTUAL TIMING | ACQUIRED PARTS | ERASE TIMING | ACTUAL TIMING | ERASE PARTS | STOCK PARTS |
|---|---|---|---|---|---|---|---|
| BRANCH POINT 1 | 9:01"48 | 9:01"48 | A B F | 9:02"48 | 9:03"00 | | A B F |
| BRANCH POINT 2 | 9:05"18 | | C D | 9:06"18 | | B D F | A C |
| BRANCH POINT 7 | 9:09"18 | | H J | 9:09"48 | | J | A C H |
| BRANCH POINT 8 | 9:10"43 | | D | 9:11"43 | | A C D | H |
| BRANCH POINT 9 | 9:13"23 | | I J | 9:14"23 | | H I | J |
| BRANCH POINT 6 | 9:15"53 | | | 9:17"23 | | J | N.A. |

| CURRENT STOCK DATA |
|---|
| A B C D F |

FIG. 42

| BRANCH POINT ID | REQUIRED PARTS |
|---|---|
| α | A, B, C |
| β | A, B, D, E |
| γ | A, C, E, F |

BRANCH POINT DIAGRAM DISPLAY SYSTEM

CROSS REFERENCE TO RELATED APPLICATION

The present application is based on and claims the benefit of priority of Japanese Patent Application No. 2011-85358, filed on Apr. 7, 2011, the disclosure of which is incorporated herein by reference.

TECHNICAL FIELD

The present disclosure generally relates to a branch point diagram display system for use by a terminal disposed on a movable body.

BACKGROUND

Conventionally, a system that displays a branch point diagram, which shows a simplified shape of a branch point when the vehicle approaches the branch point, is disclosed in Japanese patent application Laid-Open No. 2008-45925 ('925). Such a branch point diagram displayed in the above application includes a shape of the branch point (i.e., a crossroad, a Y shape road, and the like) as well as road names and/or district names to which a certain branch leads to (i.e., municipality names of towns and cities to which a certain branch leads vehicles to).

However, data for displaying such diagram including various figures, district names along with a branch shape, and other information may increase the data size. Therefore, data delivery of such diagram data from a delivery server may result in an increase of communication cost and time. Further, such a large data size may consume a data memory of a navigation apparatus or a terminal in the vehicle if it is pre-stored in the terminal. As a result, the display of the branch point diagram may take time and may not be shown in a timely manner.

SUMMARY

This section provides a general summary of the disclosure, and is not a comprehensive disclosure of its full scope or all of its features. A branch point diagram display system for displaying a branch point diagram for a branch point may include a terminal, which displays the branch point diagram of the branch point of a road, and a deliver server, which provides the branch road parts used to generate the branch point diagram. The terminal may be disposed on, coupled to, carried by, installed in, or the like on a movable body. The delivery server delivers data to the terminal at a position before the branch point.

The branch point diagram display system may further include a branch point identification unit, a branch road part store unit, a delivery schedule making unit, a delivery load calculation unit, a change unit, a delivery unit, a branch point diagram making unit, and a branch point diagram display unit.

The branch point identification unit identifies a plurality of branch points for which a corresponding branch point diagram is displayed. The branch road part store unit stores a plurality of branch road parts for generating the branch point diagram. The delivery schedule making unit generates a delivery schedule that defines a delivery part as the branch road part delivered to the terminal at a position before the branch point and for generating an erase schedule that defines the delivery part to be erased at an erase time. The delivery load calculation unit calculates a delivery load of the delivery part to the terminal according to the delivery schedule. The change unit modifies the delivery schedule according to the delivery load calculated by the delivery load calculation unit. The delivery unit acquires and delivers the delivery part from the branch road part store unit to the terminal according to the delivery schedule. The branch point diagram making unit generates the branch point diagram for each of the branch points identified by the branch point identification unit based on the branch road part delivered by the delivery unit for the branch point. The branch point diagram display unit displays the branch point diagram generated by the branch point diagram making unit.

In summary, the branch point diagram display system stores and generates a plurality of branch road parts, which constitute a branch point diagram, as one of the pieces of data to be delivered to the terminal from the delivery server, so that the branch point diagram is displayed prior to the movable body reaching the branch point. The branch point diagram display system, also, deliver the branch road part, as a delivery part, which are delivered at each of the branch points. In such manner, the branch point diagram display system reduces the size of the data to be delivered from the delivery server to the terminal in order for the terminal to display the branch point diagram, and also reduces time and cost of communication.

Further, the delivery of the branch road parts from the delivery server to the terminal is performed according to the delivery schedule, and the delivery schedule may be modified based on the delivery load. In such manner, the branch point diagram display system performs the delivery of the branch road parts from the delivery server to the terminal efficiently.

Further, the branch point that is identified by the branch point identification unit may be a branch point in a travel direction of the movable body, or may be a branch point that exists on a guidance route that is acquired by a guidance route acquisition unit.

Further, the delivery load calculation unit calculates the delivery load for each of the branch points identified by the branch point identification unit, and the change unit compares the delivery load with a threshold specifically determined for each of the branch points. The change unit further generates a special delivery schedule when there is a branch point having a delivery load greater than its threshold (i.e., a high load branch point), and the delivery unit delivers the delivery part to the terminal according to the special delivery schedule.

In other words, when the delivery load of the delivery part for a branch point increases to an abnormal level, the delivery schedule is modified to a special schedule, and the delivery is performed according to the special schedule. In such manner, the system performs the delivery of the branch road part from the delivery server to the terminal efficiently, and prevents drawbacks due to the increase of the communication time, such as a delay in the display of the branch point diagram.

Further, the branch point diagram display system further includes a delivery part stock unit and a delivery part erase unit, both of which may be provided in the terminal or in the movable body. The delivery part stock unit stores the delivery part that was delivered. The delivery part erase unit erases the delivery part stored in the delivery part stock unit at the erase time after the display of the branch point diagram at the branch point. The change unit modifies the erase schedule according to the delivery load, the delivery unit delivers the erase schedule to the terminal, and the delivery part erase unit erases the delivery part that are stocked in the delivery part stock unit according to the erase schedule.

By erasing the unnecessary delivery parts stored in the terminal or the movable body, the system prevents excessive use of the memory capacity to prevent the shortage of memory or the like.

Further, the delivery load increases according to a total amount of data to be delivered to a branch point. Therefore, if the branch point has a delivery load greater than its threshold (i.e. is a high load branch point), the change unit changes the delivery schedule to reduce the delivery load of the branch point to a value below the threshold. More practically, the change unit changes the contents (e.g., combination) of the delivery part for reducing the delivery load.

In other words, the change unit changes the delivery schedule to distribute (i.e., brake up) the delivery load of the high load branch point. For example, the change unit changes the delivery schedule by changing the contents of the delivery part, so that at least one of the delivery part of the high load branch point is included in the delivery part of a prior branch point that is positioned before the high load branch point.

Further, after the change of the delivery schedule, the change unit changes the erase schedule so that the branch road part that is used for the display of the branch point diagram at the high load branch point is not erased at the erase time of the prior branch point. In other words, pre-acquired branch road part that will be required for the display of the branch point diagram later at the high load branch point will not be erased when the delivery part is erased for the prior branch point. Therefore, even if a high load branch point exists, the delivery load of the high load branch point is distributed and re-allocated at least partially to the prior branch point.

Further, the branch point diagram display system uses the change unit to change the delivery schedule, so that the delivery of a branch road part that is commonly found in both of the delivery part of the prior branch point and the delivery part of the high load branch point (i.e., a common part) will be prioritized at the prior branch point.

In other words, from among the delivery parts of the high load branch point, a common part or common parts are pre-delivered at the prior branch point. In such manner, even if the delivery schedule is changed, the delivery parts of the prior branch point will not substantially be changed (i.e., will not be increased).

The delivery schedule making unit may first generate a general delivery schedule that defines, as the delivery part for each of the branch points, only the branch road part required to generate the branch point diagram for each of the branch points identified by the branch point identification unit. The delivery schedule making unit generates a general erase schedule that defines, as an erase part for each of the branch points, the branch road part required to generate the branch point diagram for the branch point. The delivery load calculation unit calculates the delivery load of each of the branch points according to the general delivery schedule, and the change unit compares the delivery load with a threshold specifically determined for each of the branch points. When a branch point is a high load branch point having a delivery load greater than the threshold exists, the change unit changes the general delivery schedule and the general erase schedule to a special delivery schedule and a special erase schedule, respectively. The delivery unit delivers to the terminal the delivery part according to the special delivery schedule, and the delivery part erase unit erases the delivery part stored in the delivery part stock unit based on the special erase schedule.

When no high load branch point exists, the delivery and the erase of the branch road part is based on the general delivery and the general erase schedules, respectively. The general schedule and the general erase schedule may be generated when the guidance route is obtained from the terminal and before the movable body begins traveling.

Now, when the high load branch point exists and the high load branch point is a branch point other than an immediately-next branch point relative to the movable body, the change unit may modify the general delivery schedule and the general erase schedule, to reduce the delivery load of the high load branch point to have a delivery load lower than the threshold by delivering at least one of the delivery part of the high load branch point located farthest from the movable body to the branch point positioned before the high load branch point instead of delivering to the high load branch point. The delivery load calculation unit re-calculates the delivery load of each of the branch points according to the revised distribution of the delivery part, and the change unit updates the special delivery schedule and the special erase schedule based on the delivery load re-calculated by the delivery load calculation unit.

In other words, by identifying the high load branch point located farthest from the movable body (i.e., the terminal) and by considering the delivery load, the delivery load of the high load branch point is distributed and re-allocated to the previous branch point. Then, the delivery load calculation unit re-calculates the delivery load after the delivery schedule changes according to the special delivery schedule for each of the specific (i.e., identified) branch points. Then, according to the re-calculated delivery load, the change unit changes the special delivery schedule and the special erase schedule.

Further, when the branch point positioned before the high load branch point that becomes a new high load branch point and is a branch point other than the immediately-next branch point, the change unit updates the special delivery schedule and the special erase schedule to reduce the delivery load of the new high load branch point to have a delivery load lower than the threshold, by delivering at least one of the delivery part of the new high load branch point to a branch point positioned before the new high load branch point instead of delivering to the new high load branch point. The delivery load calculation unit re-calculates the delivery load of each of the branch points according to the revised distribution of the delivery part. The change unit changes the special delivery schedule and the special erase schedule based on the delivery load re-calculated by the delivery load calculation unit.

As described above, even when there are multiple high load branch points, by re-allocating the delivery load from the high load branch point farthest along the guidance route to the prior branch points, one by one, the delivery loads of the branch points are optimized.

Further, when the branch point positioned before the new high load branch point becomes a high load branch point and the high load branch point is the immediately-next branch point, the change unit does not change the special delivery schedule and the special erase schedule. In other words, the delivery schedule and the erase schedule are fixed at such point.

Further, when the re-allocation of the delivery load described above is performed to distribute the delivery load to the prior branch points, the delivery load of the immediately-next branch point relative to the movable body (i.e., the terminal) is tend to be increased. Therefore, in a situation that there are multiple terminals that simultaneously receive the delivery from the delivery server before the branch point, the threshold of a terminal that is identified as approaching the immediately-next branch point is raised to have a larger value than other terminals.

That is, when there are multiple terminals receiving a delivery at the same time in the above-described manner at a certain branch point, the terminal approaching the immediately-next branch point has its threshold value favored (i.e., the threshold value of a specific terminal is raised so that the threshold value of the specific terminal makes it difficult for such terminal to consider the immediately-next branch point as the high load branch point).

As already described above, the delivery load and the threshold for determining a high load branch point for each of the specific (i.e., identified) branch points are changed frequently according to the change of the traffic condition. Therefore, there may be a case that a delivery schedule and an erase schedule that are already made become unsuitable in view of the actual condition.

Therefore, the branch point diagram display system uses a schedule update request unit to send a schedule update request to the delivery server at a regular interval or whenever the terminal passes each of the branch points identified. The delivery server, upon receiving such request, uses the change unit to update the delivery schedule. In such manner, the delivery schedule and the erase schedule are flexibly updated time after time according to the changes of the traffic condition.

Further, in a situation that the user changes the original guidance route, or selects another route, or in case that the movable body departs from the guidance route, the schedule already made for the original guidance route becomes unusable. Therefore, when the movable body departs from the guidance route that is previously acquired, the branch point diagram display system uses the guidance route acquisition unit to acquire a new guidance route, and the schedule update request unit sends a schedule update request to the delivery server, and the change unit in the delivery server updates the delivery schedule upon receiving the schedule update request. In the above-described manner, even when the original guidance route is discarded, the update of the schedule is flexibly performed based on the new guidance route.

Further, when sending the schedule update request to the delivery server, the schedule update request unit notifies the delivery server of leftover part information that identifies stocked branch road parts, which have not been erased from the delivery part stock unit, and the change unit updates the delivery schedule based on the leftover part information. In other words, it is effective and efficient to perform the schedule updates by taking account of the branch road parts that are not erased and are thus stocked on the terminal side. More practically, for example, if a new delivery part in the delivery schedule is same as one of the stocked parts in the terminal, such new delivery part may be excluded from the updated delivery schedule.

Further, when the schedule update request is issued, the delivery part erase unit does not perform the delivery part erasure planned at subsequent timings in a before-update erase schedule, but performs the parts erasure at the timings according to the updated erase schedule. Further, in such case, the change unit updates the erase schedule along with the update of the delivery schedule, and the delivery unit delivers the delivery parts according to the updated delivery schedule, and also delivers the updated erase schedule itself.

Further, the branch point diagram display system uses the delivery schedule making unit to make the delivery schedule, so that the system performs the delivery of the delivery part of the immediately-next branch point relative to the movable body among the branch points identified in the travel direction of the movable body. The delivery load calculation unit calculates the delivery load for the delivery at the immediately-next branch point and the branch point next to the immediately-next branch point, among the branch points. Further, when a common branch road part is found in the delivery part of the immediately-next branch point and in the delivery part of two or more branch points next to the immediately-next branch point, the change unit changes the delivery schedule so that the common branch road part is included in the delivery part of the immediately-next branch point.

In such configuration, the system performs the delivery of the branch road parts from the delivery server to the terminal more efficiently. Further, such configuration is particularly advantageous because it is usable even when no guidance route is calculated and acquired by the terminal.

Further, the above idea of the system may also be provided as an advantageous arrangement of the terminal in the system. In such case, such terminal may be a portable terminal such as a cellular phone, or an in-vehicle navigation apparatus. Further, the above idea may also be provided as an advantageous arrangement of the delivery server in the system. Further, the above idea may also be described as a method of displaying the branch point diagram by using the system, or may also be described as a program of displaying the branch point diagram by the execution of such program in the system.

BRIEF DESCRIPTION OF THE DRAWINGS

Objects, features, and advantages of the present disclosure will become more apparent from the following detailed description made with reference to the accompanying drawings, in which:

FIG. 7 is an illustration of acquisition and erasure of branch road parts of the present disclosure;

FIG. 8 is an illustration of the operation processes of the present disclosure;

FIG. 10 is an illustration of the operation processes of the present disclosure;

FIG. 11 is an illustration of the operation processes of the present disclosure;

FIG. 12 is an illustration of the operation processes of the present disclosure;

FIG. 13 is an illustration of the operation processes of the present disclosure;

FIG. 14 is an illustration of the operation processes of the present disclosure;

FIG. 23 is an illustration of the delivery schedule after acquisition of the branch road part of the present disclosure;

FIG. 24 is an illustration of the delivery schedule after erasure of the branch road part of the present disclosure;

FIG. 25 is an illustration of the operation processes of the present disclosure;

FIG. 26 is an illustration of the delivery schedule after reset of contents of the present disclosure;

FIG. 28 is an illustration of the operation processes of the present disclosure;

FIG. 29 is an illustration of the operation processes of the present disclosure;

FIG. 30 is an illustration of the operation processes of the present disclosure;

FIG. 31 is an illustration of the operation processes of the present disclosure;

FIG. 34 is an illustration of the operation processes of the present disclosure;

FIG. 35 is an illustration of the operation processes of the present disclosure;

FIG. 36 is an illustration of the operation processes of the present disclosure;

FIG. 37 is an illustration of the operation processes of the present disclosure;

FIG. 38 is an illustration of the operation processes of the present disclosure;

FIG. 39 is an illustration of the operation processes of the present disclosure;

FIG. 40 is an illustration of the operation processes of the present disclosure;

FIG. 41 is an illustration of the operation processes of the present disclosure; and FIG. 42 is a table of the branch points on the guidance route and branch road parts corresponding to such branch points in a fourth embodiment of the present disclosure.

DETAILED DESCRIPTION

First Embodiment

The following describes the first embodiment of the present disclosure. In the present embodiment, a branch point diagram display system of the present disclosure is applied to a navigation system for a movable body, which is provided as a vehicle in the following.

Figure 1:
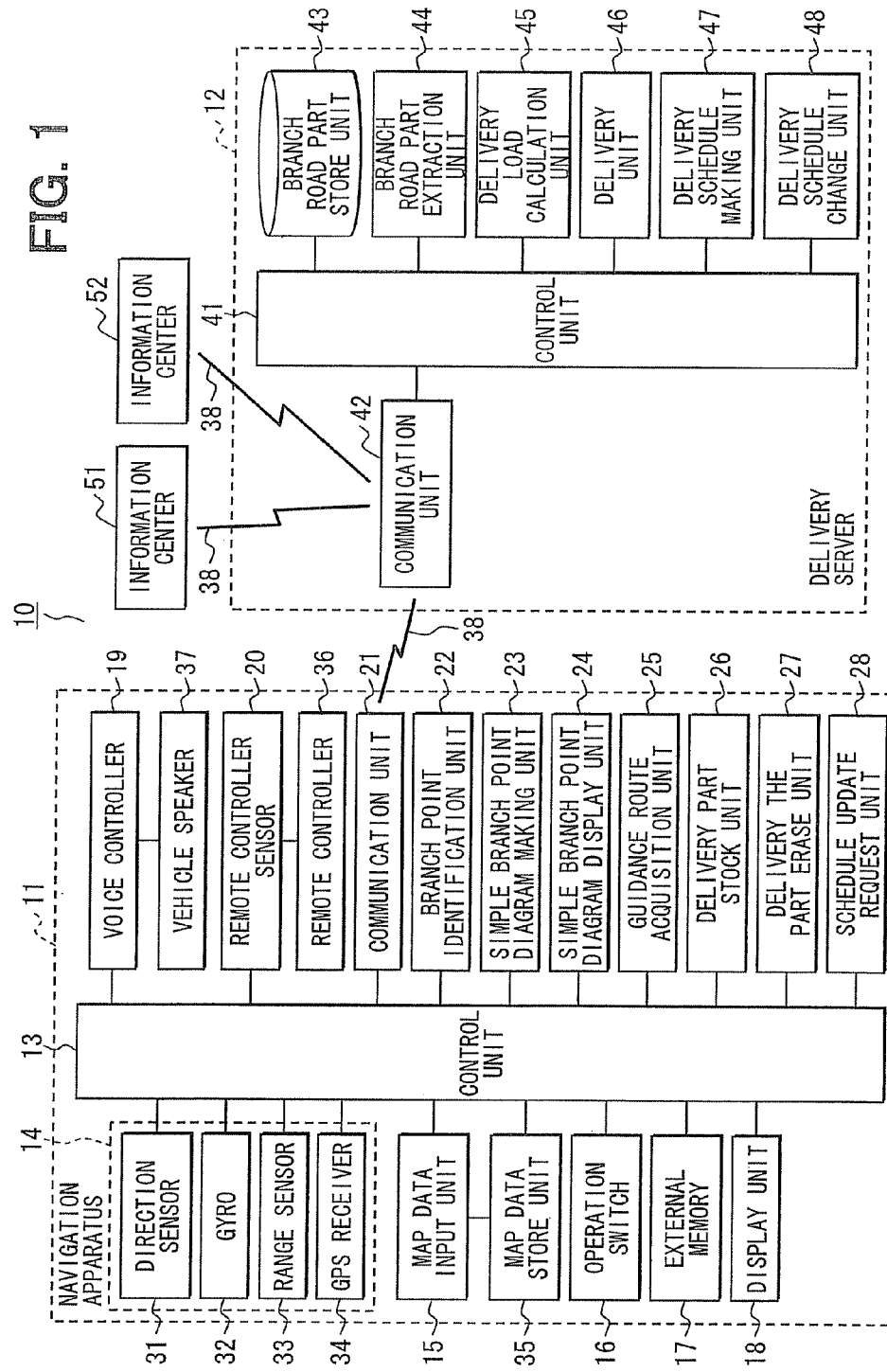
FIG. 1 is a block diagram of a navigation system in a first embodiment of the present disclosure.

With reference to FIG. 1, navigation system 10 includes a terminal, which is provided as a navigation apparatus 11, and a delivery server 12.

The configuration of the navigation apparatus 11 is described in the following paragraphs. The navigation apparatus 11 may be installed in the vehicle, and includes various components, such as a control unit 13, a position detecting unit 14, a map data input unit 15, an operation switch 16, an external memory 17, a display unit 18, a sound controller 19, a wireless remote controller sensor 20, and a communication unit 21, together with other components. The control unit 13 is implemented as a microcomputer having a CPU, a ROM, and a RAM as its main components (not illustrated). The navigation apparatus 11 may include a branch point identification unit 22, a simple branch point diagram making unit 23, a simple branch point diagram display unit 24, a guidance route acquisition unit 25, a delivery part stock unit 26, a delivery part erase unit 27, and a schedule update request unit 28, which may be realized as a series of computer programs (i.e. software) executed in the CPU of the control unit 13

The position detecting unit 14 has a direction sensor 31, a gyro sensor 32 (e.g., a gyroscope), a range sensor 33, and a Global Positioning System (GPS) receiver 34. The direction sensor 31 detects a direction of the vehicle. The gyro sensor 32 detects a rotation angle of the vehicle. The range sensor 33 detects a travel distance of the vehicle. The GPS receiver 34 receives an electric wave transmitted from the GPS satellite (not illustrated) to pinpoint a position of the vehicle by using GPS. The position detecting unit 14 detects a position of the vehicle, which carries the navigation apparatus 11.

The map data input unit 15 acquires map data from a map data store unit 35. The map data memorized in the map data store unit 35 are read and retrieved to the map data input unit 15 by a drive device (not illustrated). The map data store unit 35 may be provided as a large-capacity storage medium such as DVD or CD, or a storage medium, such as memory cards, hard disk drives.

The map data of the map data store unit 35 may be data in a DVD, a hard disk drive, or is data delivered from the delivery server 12. The map data includes various data, such as road data formed as multiple nodes and links, which connects the nodes, as well as landmark data, map matching data, destination data, and table data for converting traffic information to the road data. The map data, also, includes various information that is displayed on the map, such as coordinate information of existing branch points (i.e., the branch points included in the map data), and spot information (i.e., the name of a city, a county, a town, a village as well as an institution name, a place name and the like).

Further, the map data includes branch point numbers and guidance domain numbers. The branch point number is assigned to a branch point as an identifier of a position of the branch point on the map, and has a unique number for each of branch point to be serving as a branch point ID. The branch point is where a road branches off into multiple directions. The branch point number may also be referred to as the branch point identification information in the following.

The guidance area number is a number that is assigned to each guidance area as an identifier of a position and/or a range of the guidance area. The guidance area is an area of a predetermined range that includes each of branch point, and it is set as an area that displays a simple branch point diagram on the display unit 18 when the vehicle enters such area. Further, the guidance area number is associated with the branch point number, and if the branch point number is uniquely identified, a corresponding guidance area number is identified, thereby enabling an identification of the position and the range of the guidance area.

The operation switch 16 includes a mechanical switch disposed in the vicinity of a screen of the display unit 18 and a touch panel switch provided on the screen of the display unit 18, together with other parts. The user inputs various commands to perform an input of a destination of the vehicle, and for switching screens and display states of the display unit 18 through each of the switch parts of the operation switch 16 (e.g., change of the map scale, selection of a menu screen, search of the route, start of the route guidance, correction of the present position, adjustment of the volume, and the like). In such manner, the navigation apparatus 11 operates according to the instructions of the user.

The wireless remote controller sensor 20 transmits and receives commands to and from the wireless remote controller 36. The wireless remote controller 36 has multiple operation switches arranged thereon. Various instruction signals are transmitted to the control unit 13 via wireless remote controller sensor 20 from the wireless remote controller 36 according to the operation of switches of the wireless remote controller 36 by the user. The same function of the control unit 13 can be performed either by the operation of the operation switch 16 or by the operation of the wireless remote controller 36.

The external memory 17 may be a flash memory card that is detachable from the navigation apparatus 11, and/or the hard disk drive. Further, for example, the external memory 17 may be used in combination with other storages, such as the RAM and the EEPROM of the control unit 13 of the navigation apparatus 11 or the map data store unit 35. The display unit 18 has a color display such as a liquid crystal display unit or an organic electroluminescence (i.e., Electro-Luminescence) display unit. The screen of the display unit 18 displays a map around the vehicle position by various scales, and a present location mark is put on the map, for showing a position and a travel direction of the vehicle. Further, a screen for route guidance is displayed on the screen of the display unit 18 when it performs the route guidance to the destination.

The sound controller 19 is connected to an in-vehicle speaker 37. The sound controller 19 outputs an audio output signal to the in-vehicle speaker 37 based on the audio output signal from the control unit 13. A sound output from the in-vehicle speaker 37 may be sound of guidance, a sound of operation explanation, a sound for notifying an operation of anti-theft function, a talkback sound of voice recognition, and the like.

The control unit 13 displays on the screen of the display unit 18 a road map around the present location of the vehicle and a present location mark on top of the road map in order to show a position and a travel direction of the vehicle on a road, and/or for showing the travel of the vehicle along the guidance route. In such case, the display of the present location moves on the map shown by the display unit 18 with the travel of the vehicle. The map on the display unit 18 for showing the vehicle position is scrolled according to the travel of the vehicle. The control unit 13 performs map matching to match the position of the vehicle to a road on the map. The control unit 13 of the navigation apparatus 11 may be referred to as the navigation control unit 13.

The communication unit 21 performs data communication between the delivery server 12 via a communication line 38 of wireless transmission. The communication unit 21 has, in other words, the transmission and reception function of various data.

The branch point identification unit 22 identifies multiple branch points that serve as an object on which a simple branch point diagram is displayed. The branch point identification unit 22 may identify a branch point or a plurality of branch points that exist on along the guidance route or along the travel direction of the vehicle. Further, such branch point identification unit 22 may be disposed on the delivery server 12.

The simple branch point diagram making unit 23 generates and displays a simple branch point diagram corresponding to each of the branch points identified based on branch road parts delivered from the delivery server 12. The simple branch point diagram making unit 23 may be realized by a control unit of another device in the vehicle (i.e., the movable body).

The simple branch point diagram display unit 24 displays, on the display unit 18, the simple branch point diagram which is made by the simple branch point diagram making unit 23. Further, the simple branch point diagram display unit 24 may be realized by a control unit of another device in the vehicle (i.e., the movable body).

The guidance route acquisition unit 25 acquires, through the communication unit 21, data identifying a guidance route for the vehicle. Further, the guidance route acquisition unit 25 may be realized by the delivery server 12. In such case, the delivery server 12 acquires data of the guidance route of the vehicle from external information centers 51, 52 through the communication unit 42, and the delivery server 12 then transmits the acquired data to the navigation apparatus 11.

The delivery part stock unit 26 acquires a delivery part delivered from the delivery server 12, and stocks the data in the storage medium of the navigation apparatus 11. Further, the delivery part stock unit 26 may be realized by a control unit of another device in the vehicle (i.e., the movable body).

The delivery part erase unit 27 erases the delivery part that is stocked by the delivery part stock unit 26 at each of the branch points identified by the branch point identification unit 22, at a predetermined erase timing, which is after a display of the branch point diagram. The delivery part erase unit 27 may be realized by a control unit of another device in the vehicle (i.e., the movable body).

The schedule update request unit 28 requests a schedule update to the delivery server 12 at a predetermined interval, or when the vehicle passes each of the branch points identified by the branch point identification unit 22.

Further, though not illustrated, the navigation apparatus 11 realizes a branch point identification information transmission unit by executing a control program in a CPU of the control unit 13. The branch point identification information transmission unit transmits the branch point number specified by the branch point identification unit 22 to the delivery server 12 through the communication unit 21.

The delivery server 12 includes a control unit 41, a communication unit 42, and a branch road part store unit 43. The control unit 41 is implemented mainly as a microcomputer having a CPU, a ROM, a RAM, which are not illustrated. The delivery server 12 realizes a branch road part extraction unit 44, a delivery load calculation unit 45, a delivery unit 46, a delivery schedule making unit 47, a delivery schedule change unit 48, by executing a control program in a CPU of the control unit 41.

The communication unit 42 of the delivery server 12 performs data communication between the delivery server 12 and various devices. For example, the communication unit 42 performs data communication between the delivery server 12 and the navigation apparatus 11 disposed in a vehicle via wireless communication line 38. The communication unit 42 has the transmission and reception function of various data. In addition, the communication unit 42 performs data communication via wireless communication line 38 with multiple information centers 51, 52 to acquire various data from the information centers 51, 52.

Figure 2:
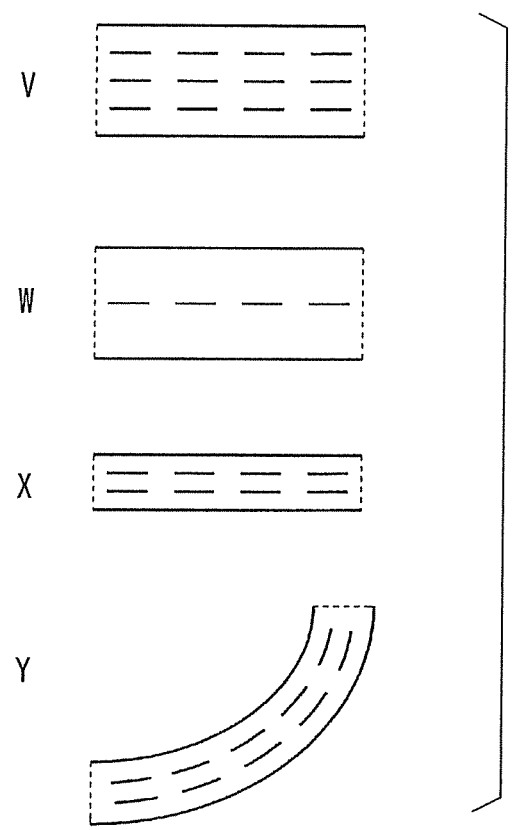
FIG. 2 is an illustration of branch road parts of the present disclosure.

Each information center 51, 52 corresponds to a particular area, and stores information specific to the area. The information stored in the information centers 51, 52 includes traffic information of the area, such as traffic congestion information, traffic regulation information, as well as, branch road parts corresponding to the shape of the branch road in the area. With reference to FIG. 2, an example of branch road parts V, W, X, and Y with corresponding shape is provided.

The branch road part is required to construct a simple branch point diagram, and a simple branch point diagram is made for each road that constitutes a certain branch point. In other words, a simple branch point diagram for a branch point of the present embodiment is configured to be made of a combination of multiple branch road parts, where the branch road part fully represents an intersection including the branch point. The branch road parts may include position specification data, text data, and the like in addition to the image data.

The branch road part store unit 43 is a database that stores several kinds of branch road parts. In the present embodiment, the branch road part store unit 43 stores a branch road part that is made by a branch road part making unit, which is described later, and also stores a branch road part acquired from the information centers 51, 52. In the branch road part store unit 43, the data of a branch point and the data of the branch road parts that are required for making the simple branch point diagram are associated with the branch point number. Further, the branch point shape information about the shape (e.g., a cross shape, a Y shape, a three-pointed shape) of each of the branch points is also associated with the branch point number. That is, by only identifying the branch point number, it is possible to acquire the data required for making the simple branch point diagram.

The branch road part extraction unit 44 extracts required branch road parts from the branch road part store unit 43, for making the simple branch point diagram for each of the multiple branch points identified by the branch point identification unit 22 of the navigation apparatus 11. Specifically, based on the branch point number of the branch point identification information that is received from the navigation apparatus 11, the branch road part extraction unit 44 identifies a position of the branch point for which a simple branch point diagram is displayed, and extracts the branch road parts from the branch road part store unit 43, which are required to make the simple branch point diagram corresponding to the branch point. In case the branch point identification information received does not include the guidance area number, the branch road part extraction unit 44 may determine the guidance area of the branch point in the map data of the delivery server 12 based on the position information that is associated with the branch point number.

The delivery load calculation unit 45 calculates, for each of the branch points (e.g., every group of multiple branch points), a delivery load for the delivery or transmission of the branch road parts extracted by the branch road part extraction unit 44 to the navigation apparatus 11. The transmission of the branch road parts are based on a delivery schedule, which is described in detail later.

The delivery load may increase in proportion to the total data amount or the total data size of the branch road parts that are to be transmitted for the branch point. Further, the delivery load is in a reverse proportion to the time between two deliveries/transmissions. For instance, a guidance route may include a first branch point and a second branch point, where the second branch point is after the first branch point. The first branch point has a first branch road parts and the second branch point has a second branch road parts. The delivery load of the second branch road parts for the second branch point may be influenced by the amount of time after the delivery of the first branch road parts for the first branch point to the delivery time of the second branch road parts for the second branch point. Further, the delivery load is in a reverse proportion to the amount of time from the erasure or deletion of a prior branch road parts (e.g. the deletion of the first branch road parts) to the delivery of a next road parts (e.g. the delivery of the second branch road parts). Additionally, the delivery load of the branch point is in proportion to the number of common branch road parts between two consecutive branch points (i.e. the number of common branch road parts that the second branch point has with the first branch point). The determination of the delivery branch load will be described in detail further below.

The delivery unit 46 delivers the branch road part extracted by the branch road part extraction unit 44 to the navigation apparatus 11. Specifically, according to the delivery load calculated by the delivery load calculation unit 45 the delivery unit 46 transmits the branch road parts for the branch point to the navigation apparatus 11, before the vehicle, which is equipped with the navigation apparatus 11, arrives at the branch point. Further, the delivery unit 46 may be able to deliver the branch road parts after the vehicle having the navigation apparatus 11 arrived at the immediately-next branch point.

The delivery schedule making unit 47 determines a delivery schedule that defines the branch road parts required for each branch point that are to be delivered to the navigation apparatus 11 at a position prior to the branch point identified by the branch point identification unit 22 of the navigation apparatus 11.

The delivery schedule change unit 48 changes the delivery schedule according to the delivery load calculated by the delivery load calculation unit 45. In other words, it revises the delivery schedule that is made by the delivery schedule making unit 47.

Further, the delivery server 12 may be configured as a branch road part making unit, a branch point identification information reception unit, and a positioning data making unit by way of a computer program/software, which is executed by a control program in a CPU of the control unit 41.

The branch road part making unit constructs a branch road part for each and every branch road that forms or is associated with a branch point existing on the map (i.e., the branch point in the map data). In such case, the branch road part making unit is, for example, realized as branch road part making software under control of a system administrator, which results in the branch road part such as parts V, W, X, Y shown in FIG. 2.

The branch point identification information reception unit receives the branch point identification information transmitted from the branch point identification information transmission unit of the navigation apparatus 11 through the communication unit 42.

The positioning data making unit makes positioning data specifying the positioning state of the branch road part (i.e., the branch road parts extracted from the branch road part store unit 43) in the simple branch point diagram, which is required for making the simple branch point diagram. Further, the positioning data is made based on the branch point shape information stored in the branch road part store unit 43. Further, the positioning data is made as text data. The information includes positioning format (i.e., position and direction) of the branch road parts together with other information such as place names that exist in the direction of the branch roads (e.g., name of a city, a county, a village, a facility and the like) as well as required travel time to such place.

Figure 15:
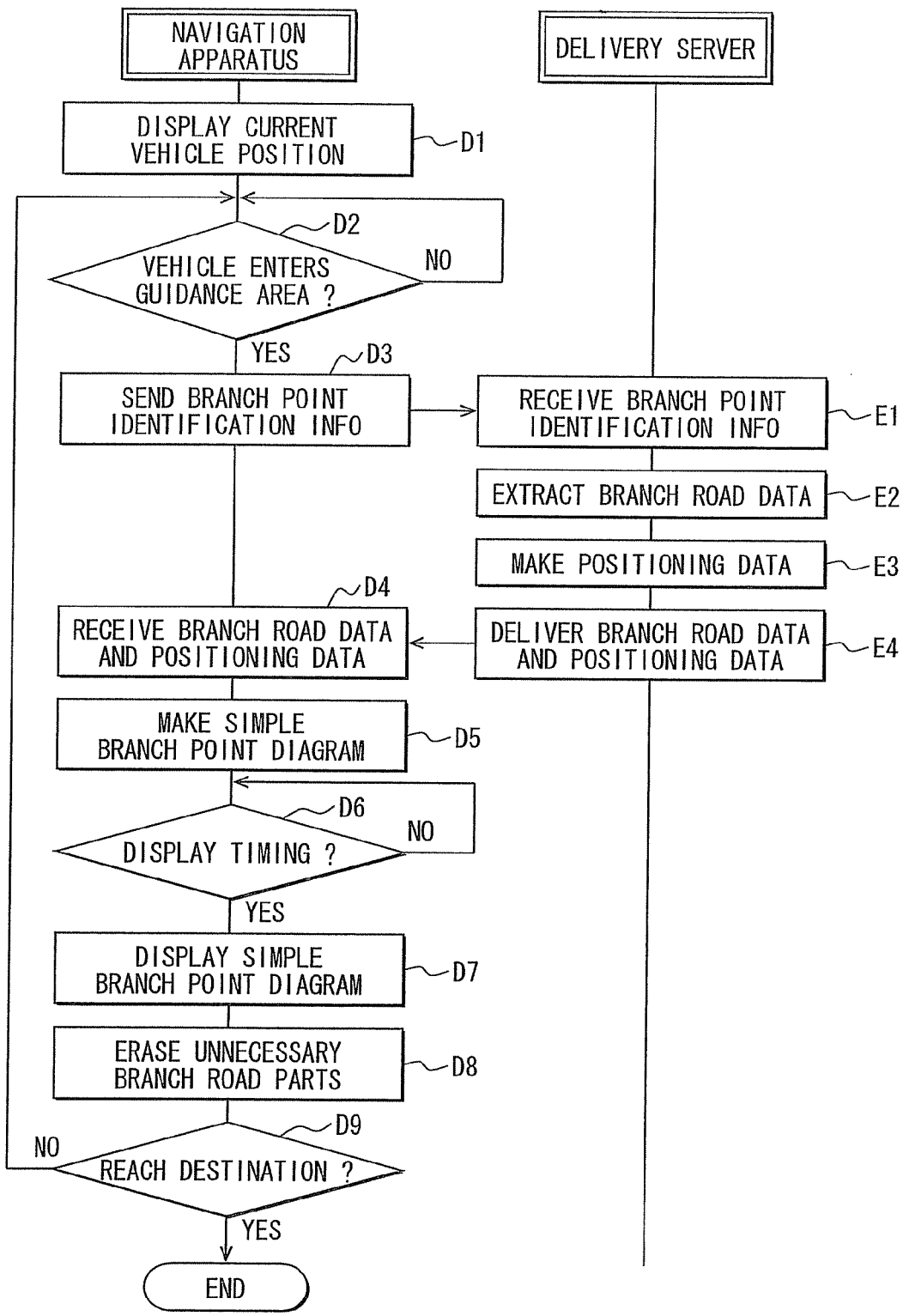
FIG. 15 is a flowchart of a process for generating and displaying a simple branch point diagram of the present disclosure.

The operation performed by the control unit 13 of the navigation apparatus 11 (i.e. the navigation control unit 13) and by the control unit 41 of the delivery server 12 (i.e. the delivery control unit 41) of the navigation system 10 will be described with reference to FIG. 3 and FIG. 15. The schedule transmission and reception process performed primarily at the travel start time of the vehicle by the navigation control unit 13 and the delivery control unit 41 is described first with reference to FIG. 3. The making and displaying of simple branch point performed mainly during a travel time of the vehicle by the navigation control unit 13 and the delivery control unit 41 is described second with reference to FIG. 15.

(1) Schedule Transmission and Reception Process

In the schedule transmission and reception process a delivery schedule is generated and transmitted to the navigation apparatus 11. According to the delivery schedule, the branch road parts are delivered at any time from the delivery server 12 to the navigation apparatus 11. The delivery schedule provides information regarding the branch road parts identified to be delivered and the acquisition timing of the branch road parts to be delivered. In addition, the delivery schedule also identifies the branch road parts, which were acquired and delivered, that are to be erased, and the deletion time of the branch road parts identified. The portion delivery schedule that identifies the branch road parts to be erased and the deletion/erasure time of the branch road parts identified may be referred to as an erase schedule in the claims. The delivery schedule is made in the delivery server 12 before the start of the travel of the vehicle, and is transmitted to the navigation apparatus 11 in advance.

The delivery schedule generated before the start of the travel of the vehicle is for the delivery of the branch road parts that corresponds to a branch point, for which the simple brand road diagram is generated. The delivery of the branch road parts is performed before the vehicle arrives at the branch point (i.e., the acquisition of the parts by the apparatus 11 or the delivery from the server 12) and the deletion of the branch roads parts identified in the delivery schedule is performed after the vehicles passes the branch point.

A general schedule is a delivery schedule that defines the delivery of only the branch road parts required for the generation of the simple branch point diagram for the branch point. Accordingly, the navigation apparatus 11 performs the operation that acquires and erases the branch road parts corresponding to the branch point based on the general schedule. The delivery server 12 performs the operation to deliver the branch road parts required for the branch point to the navigation apparatus 11 based on the general delivery schedule for each of the branch points. Such basic operation may be changed according to a special schedule to be mentioned later.

Further, the schedule transmission and reception process is performed when the guidance route of the vehicle is set by the navigation apparatus 11 before the vehicle begins traveling (i.e. prior to the start of travel of the vehicle). Therefore, in the schedule transmission and reception process, it is assumed that a guidance route of the vehicle is already set.

Figure 3:
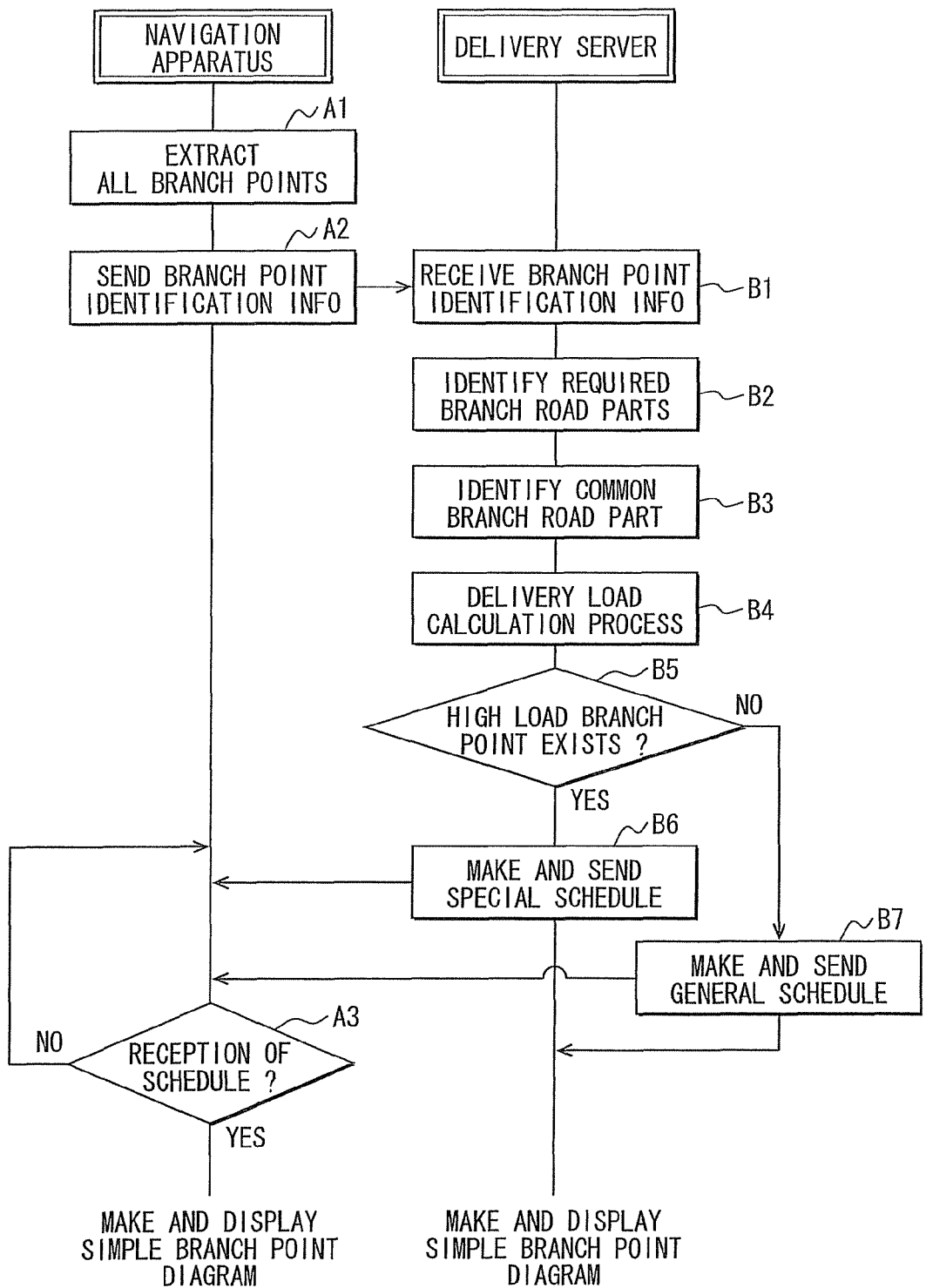
FIG. 3 is a flowchart of a schedule transmission and reception process of the present disclosure.

With reference to FIG. 3, when the navigation control unit 13 sets a guidance route of the vehicle, the navigation control unit 13 identifies all the branch points on the guidance route and extracts information to identify the branch points, such as the branch point number (i.e. the branch point identification information) (step A1). The navigation control unit 13 transmits information to the delivery server 12 (step A2). Specifically, the navigation control unit 13 provides the delivery server 12 with the branch point identification information, information to identify the guidance route, and a request for a delivery schedule.

The delivery control unit 41 receives the branch point identification, the information to identify the guidance route, and the request for the delivery schedule (step B1). For each of the branch points extracted and identified by the navigation control unit 13, the delivery control unit 41 identifies the branch road parts required to construct a simple branch point diagram for each of the branch points (step B2). Further, the delivery control unit 41 identifies, as a common branch road part, a branch road part that is commonly used for at least two of the branch points identified by the navigation control unit 13, which are on the guidance route (step B3). In the following description, the branch road parts required to construct the simple branch point diagram for the branch point may simple be referred to as the branch road parts for the branch point.

The delivery control unit 41 performs a delivery load calculation process (step B4). The delivery load, as known in the art, is related to the data size to be transmitted over time, and is considered the amount of data transmission required for a data communication. Accordingly, in the following, the deliver load is the load of data communication required for the delivery of the branch road parts to the navigation apparatus 11 for the branch point. In other words, the amount of data of the branch road parts required for constructing the simple branch point diagram for the branch point that needs to be delivered to the navigation apparatus before the vehicle arrives at the branch point. Based on such the delivery load, the delivery server 12 changes the delivery schedule from the general schedule to the special schedule.

In the following, FIGS. 4-7 are described, as an example, to illustrate the process for calculating the delivery load and determining the delivery schedule according to the delivery load (i.e., making of a general schedule and/or a special schedule).

Figures 4, 5, 6:
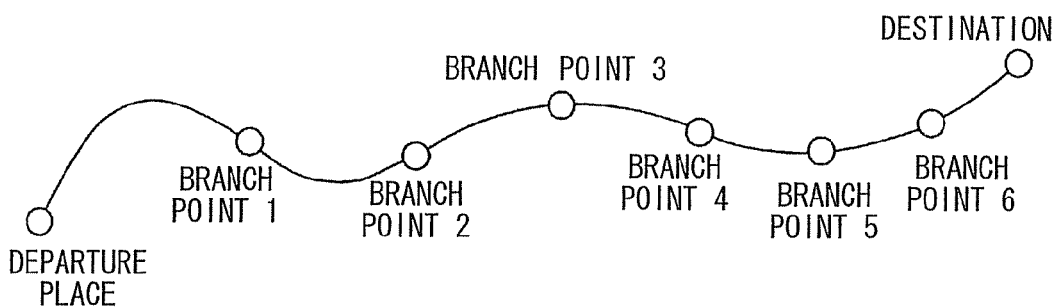
FIG. 4 is an illustration of a guidance route with a plurality of branch points of the present disclosure.
FIG. 5 is a table of the branch points of the guidance route of FIG. 4 and a branch road part corresponding to the branch points.
FIG. 6 is a table of data size of each of the branch road parts of the guidance route of FIG. 4.

In FIG. 4, the guidance route set by the navigation apparatus 11 has the branch points 1 to 6, where the number corresponds to the branch point number (i.e. the branch point identification information). Furthermore, in FIG. 5, the branch road parts required for constructing the simple branch point diagram for the branch points of FIG. 4 is provided. For example, for the branch point 1, the branch road parts A, B are required; for the branch point 2, the branch road parts C, D are required; for the branch point 3, the branch road parts A, B are required; for the branch point 4 the branch road part E is required; for the branch point 5, the branch road parts F, G, H, I are required; and for the branch point 6, the branch road part J is required. For brevity, the branch road parts A-J, may be reference to as the part(s) A-J in the following.

Information related to the branch road parts, as described above, is extracted from the branch road part store unit 43 of the delivery server 12. According to the delivery schedule, the navigation apparatus 11 acquires the parts A, B for the branch point 1 before the vehicle arrives at the branch point 1, and erases the parts A, B after the vehicle passes the branch point 1. Further, the navigation apparatus 11 acquires the parts C, D for the branch point 2 before the vehicle arrives at the branch point 2, and erases the parts C, D after the vehicle passes the branch point 2. Further, the navigation apparatus 11 reacquires the parts A, B for the branch point 3 before the vehicle arrives at the branch point 3, and erases the parts A, B after the vehicle passes the branch point 3. Hereafter, the same operation is performed for each of the branch points 4 to 6. Further, as provided in FIG. 6, the amount of data (i.e., data size) of each of the parts A to J may differ from each other. For example, the part A has a data size of 50 kilobyte (KB) whereas the part D has a data size of 70 KB and the part E has a data size of 20 KB.

FIG. 7 shows a concept diagram of the above-described acquisition and erasure of the branch road parts. The navigation apparatus 11 acquires, at an acquisition timing R1, which is a time before the vehicle arrives at the branch point 1, the parts A, B for the branch point 1, and the navigation apparatus 11 erases the parts A, B for the branch point 1 at an erase timing E1, which is a time after the vehicle passes the branch point 1. The data delivery amount of the branch road parts at the branch point 1 is 110 KB, which is a sum of 50 KB for the part A and 60 KB for the part B.

Further, the navigation apparatus 11 acquires, at an acquisition timing R2, which is a time before the vehicle arrives at the branch point 2, the parts C, D for the branch point 2, and the navigation apparatus 11 erases the parts C, D for the branch point 2 at an erase timing E2, which is a time after the vehicle passes the branch point 2. The data delivery amount of the parts at the branch point 2 is 110 KB, which is a sum of 40 KB for the part C and 70 KB for the part D. In such manner, the navigation apparatus 11 acquires and erases a branch road part corresponding to each of the branch points 1 to 6.

The delivery load (L) for a branch point k may be defined by the following equation (1), where k is the branch point the vehicle is approaching and k−1 is the branch point before the branch point k and is the branch point that the vehicle has passed.

$$L=[(1/t_{k-1 \to k})+(C_{k-1 \to k}/T_{k-1 \to k})] \times D_k \quad \text{Equation (1)}$$

In the above, $t_{k-1 \to k}$ is a period of time pending before the branch road parts for the branch point k are acquired, and is measured from the time the branch road parts for the branch point k−1 are acquired. In other words, $t_{k-1 \to k}$ may be provided as an estimated period of time from the time the branch road parts for branch point k−1 are acquired to the time the branch road parts for branch point k are to be acquired. For example, based on the above configuration of branch points 1-6 of FIGS. 4-6, for k=1, the time $t_{0 \to 1}$ is a time period from the branch point 0 (i.e. k−1), which is the point of departure of the guidance route, to the time the branch road parts for branch 1 are to be acquired (i.e. approximately around R1).

Further, $T_{k-1 \to k}$ is a period of time pending before the branch road parts for the branch point k are acquired, and is measured from a time after the branch road parts for the branch point k−1 are erased. In other words, $T_{k-1 \to k}$ may be provided as an estimated period of time from the time the branch road parts for branch point k−1 are erased to the time the branch road parts for branch point k are to be acquired. For example, based on the above configuration, for k=1, the time $T_{0 \to 1}$ is a time period from the branch point 0 (i.e. k−1), which is the point of departure of the guidance route, to the time the branch road parts for branch 1 are to be acquired (i.e. approximately around R1). In another example, for k=2, the time $T_{1 \to 2}$ is an estimated time period from the time the branch road parts for branch point 1 are erased (i.e. approximately around time E1) to the time the branch road parts for branch point 2 are to be acquired (i.e. approximately around time R2).

In addition, $C_{k-1 \to k}$ of equation (1) is the number of common branch road parts of two successive or consecutive branch points. In other words, the branch road parts for the branch point k−1 that are also provided for the branch point k are designated as the common branch road parts, and the number $C_{k-1 \to k}$ represents the number of the common branch road parts. The $D_k$ is the total data delivery amount (i.e. the total data size) of the branch road parts provided for the branch point k.

According to the above equation (1), and as described earlier, the delivery load L is proportional to the variables $t_{k-1 \to k}$, $T_{k-1 \to k}$, $C_{k-1 \to k}$, and $D_k$. For instance, if $t_{k-1 \to k}$ is provided as a long duration, the delivery load decreases due to the decrease of the communication frequency. Further, if $D_k$ is large, the delivery load L increases due to the increase of the data delivery amount. Further, when a common branch road parts exist and if $T_{k-1 \to k}$ is a small duration, the erasure of the common branch road parts leads to the acquisition of the same common branch road parts immediately after such erasure. Therefore, the delivery load L increases due to the unnecessary delivery of the common branch road parts. Furthermore, if $C_{k-1 \to k}$ is large, the delivery load L increases due to the increase of the unnecessary delivery of the common branch road parts. Based on the definitions described above, the delivery load L for a branch point k can be accurately calculated.

Based on equation (1), the delivery control unit 41 calculates the delivery load L for each of the branch points 1 to 6 in the delivery load calculation process (step: B4). After the delivery load calculation process, the delivery control unit 41 determines whether a high load branch point exists (step B5) by comparing the delivery load L of each of the branch points 1 to 6 with a threshold S, which is a predetermined value for each of the branch points. Accordingly, a branch point that has a delivery load L greater than the threshold S, is determined as a "high load branch point". More practically, the delivery control unit 41 may determine a branch point as having a high load state when a ratio of the delivery load L against the threshold S is greater than '1' at one of the branch points 1 to 6.

The threshold S is defined by equation (2), shown below. The threshold S is a value in proportion to the data amount deliverable from the delivery server 12, and is a value in reverse proportion to the number of the navigation apparatuses 11 receiving delivery from the delivery server 12 at the same time before a branch point k.

$$S=P/N_k \quad \text{Equation (2)}$$

In equation (2), P is a limit value of the communication band (i.e., band widths), and shows the size of the band widths of a communication channel between the navigation apparatus 11 and the delivery server 12. If the communication channel is illustrated as a "pipe", the band width corresponds to the diameter of such pipe. In such case, the band assigned to the channel between the navigation apparatus 11 and the delivery server 12 is limited, and, for example, the value P is set to have a value '5' by multiplying a safety factor (e.g., 0.005) to a value of 100% band width (e.g., 1000). In such manner, by restricting the band width assigned to the communication channel between the navigation apparatus 11 and the delivery server 12, other communication such as an emergency report communication, a priority communication, and the like can have access to the communication band width. Further, $N_k$ is the estimation number of vehicles around the subject vehicle (a number of the navigation apparatuses 11 carried by other vehicles) that are expected to communicate with the delivery server 12 substantially at the same time when the subject vehicle (the navigation apparatus 11 carried by the subject vehicle) acquires the branch road parts from the delivery server 12 at the branch point k. By defining the threshold S in the above-described manner, the high load branch point is identified according to the change of the traffic condition at each of the branch points.

Further, the number of other vehicles may be estimated based on the delivery schedule (i.e., data delivery timing, or data acquisition timing) to transmit data to each of the other vehicles. That is, the data delivery schedule may be utilized for the calculation/estimation of the number of the other vehicles. Additionally, the number of the other vehicles may also be determined based on the past data or memory data (i.e., statistics). Specifically, by using stored data representative of the number of vehicles (i.e., the number of the navigation apparatuses 11) that previously communicated with the delivery server 12 at approximately the same time, and at or around the vicinity of the branch point k.

The delivery control unit 41 calculates the delivery load L by using the equation (1) mentioned above for the existing branch points 1 to 6 on the guidance route, and compares the delivery load L with the threshold S by using the equation (2) mentioned above. As a result, when the delivery load L of a branch point exceeds the threshold S set for the branch point, such branch point is temporarily identified as the high load branch point.

In the following, a method to identify a high load branch point is described.

The delivery control unit 41 sets a data acquisition timing R and a data erase timing E for acquisition and erasure of branch road parts corresponding to each of the branch points 1 to 6, respectively. The data acquisition timing R1 for the branch point 1 may be estimated by a departure time (i.e., a time when the vehicle left the departure place of the guidance route), a distance from the departure place to the branch point 1 (i.e., a distance along the guidance route), a traffic condition between the departure place and the branch point 1, and an average travel speed of the vehicle between the departure place and the branch point 1 (i.e., may be determined as a predetermined speed when the vehicle is not traveling, and may be updated to an actual speed when the vehicle starts to travel).

Based on the above, if the vehicle departure time is 9:00:00, the traffic condition is good, the average vehicle speed is 40 km/h, the distance between the departure place to the branch point 1 is 1,500 m, and the data acquisition timing R1 is set to a time of passing a point 300 m before the branch point 1, the data acquisition timing R1 may be set as 9:01:48, which is approximately 108 seconds after the departure of the vehicle from the departure place.

Further, the data erase timing E1 for the erasure of the branch parts for the branch point 1 may be temporarily set. For example, based on an estimation that it takes the vehicle 60 seconds to pass the branch point 1, the data erase timing E1 may be set as 9:02:48, which is 60 seconds after the acquisition of the branch road parts for the branch point 1. However, even when the data erasure timing E1 is provided as 9:02:48, the vehicle is required to pass through the branch point 1 for the branch road parts to be erased by the navigation apparatus 11. In other words, a condition for the deletion or erasure of a branch road parts is that the vehicle must pass the branch point corresponding to the branch road parts.

Further, the time required for the vehicle to pass the branch point may not be limited to 60 seconds, as described above, but may be any length of time. For example, the time of passing through the branch point may be calculated as an average of two times, one for passing the branch point without stopping when the traffic signal is a green light, and the other for passing the branch point with stopping at the traffic signal when the traffic signal is a red light. In addition, the averaged time may further be weighted by a traffic congestion factor. In such case, the delivery control unit 41 may calculate the time required to pass the branch point after acquiring information of the signaling state of the traffic signal (i.e. whether the signal is turning to a green light or to a red light).

The data acquisition timings R1 to R6 and the data erase timings E1 to E6 for the branch points 1 to 6 on the guidance route are set in the above-described manner. The delivery control unit 41 determines the parameters $t_{k-1 \to k}$; $T_{k-1 \to k}$; $C_{k-1 \to k}$; $D_k$; $N_k$; and P of equations (1) and (2).

Based on the data acquisition timing R and the data erase timing E, the delivery control unit 41 calculates $t_{k-1 \to k}$ and $T_{k-1 \to k}$. Further, based on the identified branch road parts, the delivery control unit 41 calculates $C_{k-1 \to k}$ and $D_k$. Based on traffic information or information provided by other vehicles, which was acquired from external resources, the delivery control unit 41 estimates $N_k$. The delivery control unit 41 may then set the limit value P of the communication band, which is set as 6 for the present disclosure. Accordingly, with an actual band width value of 1000, the safety factor is provided as 0.006. It should be understood to one skilled in the art that the value of P may be set to a number other than 6.

With reference to FIG. 8, the parameters of equations (1) and (2) calculated by the delivery control unit 41 are shown. For instance, the branch point 1 (k=1), $t_{0 \to 1}$ is provided as 108 seconds and $T_{0 \to 1}$ is also 108 seconds. Similarly, for the branch 2 (k=2), $t_{1 \to 2}$ is provided as 210 seconds and $T_{1 \to 2}$ is provided as 150 seconds. Accordingly, the data erase timing E2 for the branch point 2 is 60 seconds after the data acquisition timing R2 (=210 minus 150). Further, the data erase timing E of the other branch points 2 to 6 for erasing the branch road parts is also set 60 seconds after the data acquisition timing R of those branch road parts.

Further, based on FIG. 5, there are no common branch road parts, such that two successive branch points have common branch road parts. Therefore, in FIG. 8, $C_{k-1 \to k}$ is equal to 0 for all of the branch points 1 to 6.

Based on FIGS. 5 and 6, the value of $D_k$ for each of the branch points is provided in FIG. 8. For instance, for the branch point 1, $D_1$ is 110 KB, which is the total of the part A at 50 KB and the part B at 60 KB. Also, for the branch point 2, $D_2$ is provided as 110 KB, which is the total of the part C at 40 KB and the part D at 70 KB.

Further, FIG. 8 shows a relationship among the delivery load L of equation (1), the threshold S of equation (2), and the high load branch points (i.e., a branch point having a L/S ratio greater than 1 or a high load state). In particular, the L/S ratio for the branch points 1, 2, 4, 6 are less than 1, therefore the branch points 1, 2, 4, 6 are not high load branch points. On the other hand, the L/S ratio for the branch points 3 and 5 is greater than 1, therefore the branch points 3 and 5 are provided as a high load branch point. When a branch point has a L/S ratio equal to 1 the branch point may or may not be determined as a high load branch point.

Further, FIG. 8 provides the delivery schedule. Specifically, the delivery schedule is the general schedule and is the schedule of delivery of only the branch road parts that are required from the delivery server 12 to the navigation apparatus 11, before the vehicle reaches the branch point, for constructing the simple branch point diagram for the branch point. In addition the general schedule shows the deletion of all of the branch road parts that were acquired after the vehicle passes the branch point With continuing reference to FIG. 3, after the delivery control unit 41 performs the delivery load calculation process (step B4), the delivery control unit 41 determines whether there is a high load branch point on the guidance route (i.e., a branch point having a L/S ratio greater than 1) (step B5). When the delivery load of the branch road parts is high at a branch point, the amount of time needed to deliver the branch road parts (i.e., communication time for parts delivery) at the branch point may increase, and the display of the simple branch point diagram may be delayed. Therefore, for preventing such a delay, when the guidance route includes a high load branch point (step B5: YES), the delivery control unit 41 determines a special schedule, and transmits the special schedule as the delivery schedule to the navigation apparatus 11 (step B6). When the guidance route does not include a high load branch point (step B5: NO), the delivery control unit 41 determines the general schedule, and transmits the general schedule as the delivery schedule to the navigation apparatus 11 (step B7).

In addition to transmitting the delivery schedule to the navigation apparatus 11, the delivery control unit 41 stores the delivery schedule in the delivery server 12. In such manner, the navigation apparatus 11 and the delivery server 12 are configured to have the same delivery schedule, which may be a special schedule or a general schedule. When the delivery control unit 41 transmits the delivery schedule and when the navigation control unit 13 receives the delivery schedule (step A3: YES), the delivery control unit 41 provides and the navigation apparatus 11 receives the branch road parts according to the delivery schedule.

Figure 9:
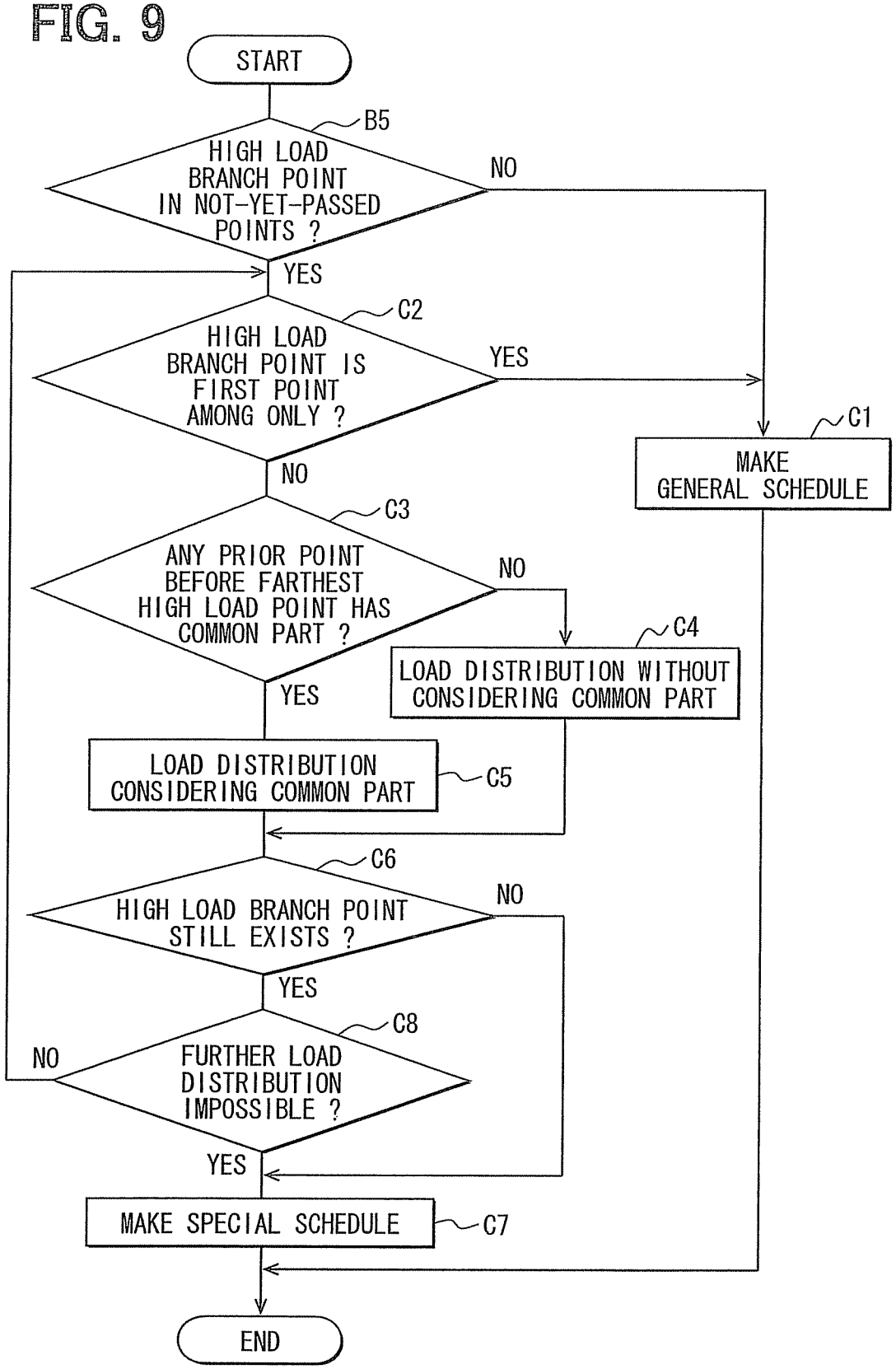
FIG. 9 is a flowchart of a process for generating a delivery schedule of the present disclosure.

With reference to FIG. 9, the process of generating the special schedule and the general schedule are described. When the delivery control unit 41 determines the guidance route does not have a high load branch point (i.e. there are no high load branch point in the branch point not yet passed) (step B5: NO), the delivery control unit 41 generates general schedule (step C1). For instance, in FIG. 8, the general schedule acquires the parts A, B for the branch point 1 before the vehicle arrives at the branch point 1, which is provided as the data acquisition timing R1 (i.e. 9:01:48), and erases the parts A,B after the vehicle passes the branch point 1, which is provided as the data erase timing E1 (i.e. 9:02:48). When the general schedule is used, the branch road parts for each the branch point is acquired and erased, such that a stock part(s), which are branch road parts that are stored (i.e. stocked) in the navigation apparatus 11 without being erased after the branch road part was acquired, are "N.A." for each of the branch points 1 to 6. The stock part(s) is described later with reference to the special schedule.

When the delivery control unit 41 determines the guidance route does have a high load branch point (step B5: YES), the delivery control unit 41 determines whether the high load branch point is the branch point that the vehicle is approaching and if it is the only high load branch point (i.e., a branch point immediately-next on the guidance route or the first on the guidance route relative to the position of the vehicle) (step C2). If the high load branch point is not the branch point that the vehicle is approaching (step C2: NO), the delivery control unit 41 determines the position of the high load branch point that is furthest along the guidance route (i.e. the last high load branch point on the guidance route that the vehicle will pass).

Next, the delivery control unit 41 determines if any of the branch points located before the last high load branch point on the guidance have a common branch road part with the last high load branch point (step C3). If the guidance route does not include a branch point with a common branch road part (step C3: NO), the delivery control unit 41 performs a load distribution process without a common part (step C4). If there is at least one branch point with a common branch road part (step C3: YES), the delivery control unit 41 performs the load distribution process with a common part (step C5).

In the load distribution process without a common part (step C4), the delivery control unit 41 refers to the branch road parts for the last high load branch point on the guidance route, and transfers the branch road part with the lowest data size to a branch point that is positioned immediately before the last high load branch point on the guidance route. For instance, with reference to FIG. 8, the branch point 5 is a high load branch point farthest along the guidance route (i.e. the branch point 5 is the last high load branch point). In addition, none of the branch points before the branch point 5 have a common branch road part with the branch point 5 (C3: NO). Accordingly, the delivery control unit 41 performs the load distribution without a common part (step C4), and transfers the part G, which has the smallest data size of 10 KB among the parts F, G, H, I for the branch point 5, from the branch point 5 to the branch point 4 (i.e. the branch point before the branch point 5). The part G is stored as a branch road part for the branch point 4 (i.e., a delivery part on the server side, or an acquired part on the vehicle side).

After the transfer of the branch road part with the lowest data size, the delivery control unit 41 performs the delivery load calculation process to recalculate the delivery load. If the last high load branch point is no longer provided as a high load branch point, the delivery control unit 41 concludes the load distribution process of step C4. As a result, if the last high load branch point from the vehicle is not calculated as the high load branch point any more, the delivery control unit 41 concludes the load distribution process (step C4), even if the branch point that received the branch road parts is now a high load branch point. For instance, after transferring the part G to the branch point 4, if the branch point 5 is no longer a high load branch point and even if the branch point 4 is now a high load branch point, the load distribution process (step C4) is concluded.

Additionally, if the last high load branch point is still calculated as a high load branch point, the delivery control unit 41 returns the branch road part to the last high load branch point from the branch point positioned before the last high load branch point. The delivery control unit 41 then transfers a branch road part for the last high load branch point with the second smallest data size to the branch point positioned before the last high load branch point, and recalculates the delivery load via the delivery load calculation process. For example, if the branch point 5 is still a high load branch point, the delivery control unit 41 returns the part G from the branch point 4 to the branch point 5. Next, the delivery control unit 41 transfers the part I, which has the second smallest data size of 20 KB among the parts F, G, H, I for the branch point 5, from the branch point 5 to the branch point 4, and performs the delivery load calculation process.

As a result, if the last high load branch point is no longer a high load branch point, the control unit 41 concludes the load distribution process (step C4) even if the branch point that received the branch road part(s) is now a high load branch point.

Further, if the last high load branch point is still a high load branch point, the delivery control unit 41 performs the same steps as provided above. Specifically, the delivery control unit 41 returns the second smallest branch road part to the last high load branch point, and transfers the branch road part with the third lowest data size to the branch point before the last high load branch point. For example, the delivery control unit 41 returns the part I to the branch point 5 from the branch point 4, and transfers the part H, which has the third lowest data size of 30 KB from among the parts F, G, H, I, from the branch point 5 to the branch point 4, and performs the delivery load calculation process. In this case, the combination of the part G and the part I among the parts F, G, H, I is also equal to a data size of 30 KB. Therefore, instead of moving the part H, the delivery control unit 41 may transfer the parts G and I to the branch point 4, which is the branch point positioned before the branch point 5 (i.e. the last high load branch point).

As described above, by performing the load distribution process without common part (step C4), the delivery control unit 41 transfers a branch road part or a combination of multiple branch road parts for the last high load branch point (i.e. a high load branch point positioned farthest along the guidance route) to a branch point that is before the last high load branch point. The branch road part(s) are transferred in order of smallest to largest data size or data amount (i.e., data amount of each part or data amount of a combination of multiple parts). The provided distribution is repeated until the high load state of the last high load branch point is resolved. In an extreme case of repeated move (i.e., re-allocation), every single branch road part or all combination of multiple branch road parts may be moved to the branch point before the last high load branch point. After moving all parts, the delivery load becomes zero according to the equation (1), thereby resolving the high load state and concluding the load distribution process (step C4).

In the load distribution process with a common part (step C5), the delivery control unit 41 refers to the last high load branch point and the branch point that are before the last high load branch point to determine the common branch road parts. The delivery control unit 41 then transfers the branch road parts, which have been identified as common branch road part(s), from the last high load branch point to the branch point positioned immediately before the last high load branch point. The delivery control unit 41 may transfer all of the branch road parts that were identified as a common branch road parts or the delivery control unit 41 may transfer one branch road part (i.e. a common branch road part) at a time in a prioritized manner. After such transfer, the delivery control unit 41 performs the delivery load calculation process to recalculate the delivery load.

With reference to FIG. 8, for the purpose of explanation, it is assumed that the branch point 3 is the last high load branch point. The branch point 3 has the parts A, B, and the branch point 1, which is before the branch point 3 on the guidance route, also has the parts A, B. Thus, the parts A, B are identified as common branch road parts. The delivery control unit 31 transfers, in a prioritized manner, the parts A, B for the branch point 3 from the branch point 3 to the branch point 2. The delivery control unit 41 performs the delivery load calculation process again. Further, the parts A, B may be moved one by one from the branch road part with the smallest data size, which is the part A in this example, or multiple branch road parts that are identified as the common branch road parts may be transferred in a bundle as a group.

After the transfer of the branch road part(s) that were identified as the common branch road part(s), the delivery control unit 41 performs the delivery load calculate process to recalculate the delivery load. If the last high load branch point is no longer a high load branch point the delivery control unit 41 concludes the load distribution process with common part (step C5), even if the branch point that received the branch road part(s) (i.e. the common branch road part(s)) is now a high load branch point. For instance, if the branch point 3 is no longer a high load branch point, the delivery control unit 41 concludes the load distribution process (step C5) even when the branch point 2 is a high load branch point.

When the last high load branch point is still a high load branch point, the delivery control unit 41, transfers one by one, branch road parts that were not identified as common branch road parts (i.e. non-common branch road parts), to the branch point before the last high load branch point. The delivery control unit 41 performs the transfer of the non-common branch road parts without returning the common branch road parts that were transferred to the branch point positioned before the last high load branch point. For instance, if the branch point 3 is still calculated as the high load branch point, and if the branch point 3 had another branch road part, which was not a common branch road part, the delivery control unit 41 will transfer, one by one, the non-common branch road parts to the branch point 2, without returning the parts A, B. The non-common branch road parts are transferred in a similar as described above in regards to the load distribution process without a common part.

Such transfer is repeated until the high load state of the branch point 3 is resolved. Then, similarly to the step C4 mentioned above, the delivery control unit 41 concludes the load distribution process with common part (step C5) when the last high load branch point is no longer a high load branch point.

When the delivery control unit 41 concludes the above-described load distribution process without a common part (step C4) or load distribution process a common part (step C5), the delivery control unit 41 thereafter determines whether there is a high load branch point on the guidance route in the load distribution process (step C6). When there is no high load branch point (step C6: NO), the delivery control unit 41 determines a delivery schedule for the branch road parts distribution state of the current load distribution, and the delivery schedule is provided as the special schedule (step C7).

On the other hand, when there is a high load branch point (step C6: YES), the delivery control unit 41 determines whether the load distribution process to further distribute the load from the current state is impossible (i.e. not permissible) (step C8). Specifically, if only one high load branch point exists on the guidance route, and if the one high load branch point is the branch point that the vehicle is approaching (i.e., a branch point immediately-next on the guidance route relative to the position of the vehicle), then the load distribution process is not permissible or is impossible (C8: YES). If the one high load branch point is not the branch point that the vehicle is approaching or if there are more than one high load branch point, further load distribution is possible (C8: NO), and the load distribution process returns to step S2. The load distribution process may also return to step C3, instead of returning to step S2.

When the delivery control unit 41 determines that further load distribution is impossible (step C8: YES), the delivery control unit 41 generates a special schedule that reflects the branch road parts distribution state of the current load distribution (step C7).

A detailed explanation of the load distribution of FIG. 9, will now be described with reference to FIGS. 4-8. With reference to FIG. 8, the branch points 3 and 5 are provided as the high load branch points of the guidance route (step B5: YES), and the branch point 1, which is the branch point immediately-next on the guidance route, is not a high load branch point (step C2: NO). Further, the branch point 5 is a high load branch point that is located farthest along the guidance route, and among all the branch points 1 to 4 before the branch point 5 there is no other branch point that has the parts F, G, H, I. In other words, none of the branch points 1-4 have a common branch road part with the branch point 5 (step C3: NO). Therefore, the delivery control unit 41 performs the load distribution process without a common part (step C4).

In the load distribution process (step C4), the delivery control unit 41 first transfers, from the branch point 5 to the branch point 4, the part G, which has the smallest data size of 10 KB among the parts F, G, H, I for the branch point 5, and the delivery control unit 41 performs the delivery load calculation process.

As a result, the high load state of the branch point 5 is not resolved (i.e. the L/S ratio is still greater than 1), and, thus, the delivery control unit 41 transfers the part I having the second smallest data amount of 20 KB to the branch point 4 after returning the part G to the branch point 5, and performs the delivery load calculation process.

As a result, the high load state of the branch point 5 is not resolved, and, the delivery control unit 41 transfers the part H of 30 KB, which is third from the smallest in terms of the data amount, to the branch point 4 after returning the part I to the branch point 5, and performs the delivery load calculation process.

As a result, the high load state of the branch point 5 is not resolved, and, thus, the delivery control unit 41 transfers the parts G and I, as a set, of 30 KB, which is the same amount as the part H, to the branch point 4 after returning the part H to the branch point 5, and performs the delivery load calculation process.

As a result, the high load state of the branch point 5 is not resolved, and, thus, the delivery control unit 41 transfers the parts G and H, as a set, of 40 KB, which is fourth from the smallest in terms of the data size as a set, to the branch point 4 after returning a set of the parts G and I to the branch point 5, and performs the delivery load calculation process.

As a result, the high load state of the branch point 5 is not resolved, and, thus, the delivery control unit 41 transfers the parts H and I, as a set, of 50 KB, which is fifth from the smallest in terms of the data size as a set, to the branch point 4 after returning a set of the parts G and H to the branch point 5, and performs the delivery load calculation process.

As a result, the high load state of the branch point 5 is not resolved, and, thus, the delivery control unit 41 transfers the parts G, H, I, as a set, of 60 KB, which is sixth from the smallest in terms of the data amount as a set, to the branch point 4 after returning a set of the parts H and I to the branch point 5, and, performs the delivery load calculation process.

As a result, the high load state of the branch point 5 is not resolved, and, thus, the delivery control unit 41 transfers the part F of 80 KB, which is seventh from the smallest in terms of the data amount, to the branch point 4 after returning a set of the parts G, H, I to the branch point 5, and performs the delivery load calculation process.

As a result, the high load state of the branch point 5 is not resolved, and, thus, the delivery control unit 41 transfers the parts F and G, as a set, of 90 KB, which is eighth from the smallest in terms of the data amount, to the branch point 4 after returning the part F to the branch point 5, and performs the delivery load calculation process.

As a result, the high load state of the branch point 5 is not resolved, and, thus, the delivery control unit 41 transfers the parts F and I of 100 KB, which is ninth from the smallest in terms of the data amount, to the branch point 4 after returning a set of the parts F and G to the branch point 5, and performs the delivery load calculation process.

As a result, the high load state of the branch point 5 is resolved, that is, the branch point 5 is no longer a high load branch point, and the load distribution process without common part (step C4) is concluded. By moving from the branch point 5 to the branch point 4 the parts F and I among the parts F, G, H, I for the branch point 5, the high load state of the branch point 5 is resolved. With the branch point 4 now including the parts F and I, the branch point 4 is now a high load branch point.

FIG. 10 illustrates a branch road part state after the above load distribution process. The total data size of the branch point 4, $D_4$, is 120 KB as a total of the part E of 20 KB, the part F of 80 KB, and the part I of 20 KB, and the total data size of the branch point 5, $D_5$, is 40 KB as a total of the part G of 10 KB and the part H of 30 KB.

Based on FIG. 10, the branch points 3 and 4 are the high load branch points among the branch points 1 to 6 on the guidance route (step C6: YES). Further, the branch point 1 is not a high load branch point, therefore, further load distribution from the branch road distribution state is possible (step C8: NO, then step C2: NO).

Since the branch point 4 is the high load branch point furthest along the guidance route, the delivery control unit 41 determines there is no other branch point before the branch point 4 that has the parts E, F, I. In other words, none of the branch points 1-3 have a common branch road part with the branch point 4 (step C3: NO). Therefore, the control unit 41 performs the load distribution process without a common part (step C4).

The delivery control unit 4, as described above, transfers the branch road parts for the branch point 4 (i.e., each branch road part, or a combination of multiple branch road parts) to the branch point 3, in an order of smallest to largest in terms of the data size (i.e., data size of each branch road part or data amount of the combination of multiple branch road parts), until the high load state of the branch point 4 is resolved. In such case, the high load state of the branch point 4 is resolved by moving the part F to the branch point 3.

FIG. 11 a branch road part state after the above load distribution process Due to the move of the part F from the branch point 4 to the branch point 3, $D_3$ is 190 KB as a total of the part A of 50 KB, the part B of 60 KB, and the part F of 80 KB, and $D_4$ is 40 KB as a total of the part E of 20 KB and the part I of 20 KB. Further, FIG. 11 shows that the acquired part(s) corresponding to the branch point 4 are the parts E, I, and the erase part is the part E. Therefore, the parts F, I are the stock parts for the branch point 4, which are the branch road parts that are left stocked in the navigation apparatus 11 without being erased after the acquisition, because the parts F, I are to be retained for the branch point 5.

With the above load distribution, the branch point 3 is provided as the high load branch point amount among the branch points 1 to 6 on the guidance route (step C6: YES). Further, the branch point 1 is not a high load branch point, therefore, further load distribution from the branch road parts state is possible (step C8: NO, then step C2: NO).

The delivery control unit 41 performs the load distribution process for resolving the high load state of the branch point 3, which is the only high load branch point along the guidance route, therefore the farthest high load branch point along the guidance route. Among the branch points 1, 2 before the branch point 3, the branch point 1 has the branch road parts A, B in common with the branch point 3. Therefore, the control unit 41 performs the load distribution process with a common part (step C5).

The delivery control unit 41 first transfers the common parts A, B (i.e., common with the branch point 1) among the parts A, B, F for the branch point 3 from the branch point 3 to the branch point 2 in a prioritized manner. Specifically, the delivery control unit 41 transfers the part A, which has the smallest data size among the parts A, B, to the branch point 2, and performs the delivery load calculation process.

As a result, the high load state of the branch point 3 is not resolved, and, thus, the delivery control unit 41 transfers the part B, which has second smallest data size among the parts A, B, to the branch point 2, and performs the delivery load calculation process. The delivery control unit 41 does not perform an operation to return the part A to the branch point 3. Therefore, the branch point 2 has the parts A, B.

As a result, the high load state of the branch point 3 is not resolved. In other words, because the high load state of the branch point 3 is not resolved by transferring all of the common parts A, B to the branch point 2, the delivery control unit 41 transfers the non-common part F to the branch point 2, and performs the delivery load calculation process. The delivery control unit 41 does not perform an operation to return the parts A, B to the branch point 3 from the branch point 2. Therefore, the branch point 2 has the parts A, B, F.

As a result the high load state of the branch point 3 is resolved. Further, there is no branch road part for the branch point 3, since the parts A, B, F have been transferred to the branch point 2.

FIG. 12 shows a branch road part state after the above load distribution process. The parts A, B are common branch road parts between the branch point 1 and the branch point 2. Therefore, $C_{1 \to 2}$ is 2. Further, $D_2$ becomes 300 KB as a total of the part A of 50 KB, the part B of 60 KB, the part C of 40 KB, the part D of 70 KB, the part F of 80 KB. Also, $D_3$ is 0 KB, since it has no branch road parts.

Based on FIG. 12, the parts A, B, C, D, F are acquired for the branch point 2. The parts C, D are erased after vehicle passes the branch point 2, and the parts A, B, F are stock parts that are not to be erased after the vehicle passes the branch point 3. In addition, there are no acquired parts (i.e., the delivery part from the viewpoint of the delivery server 12) for the branch point 3, and the erase parts after the vehicle passes the branch point 3 are the parts A, B. Therefore, the part F is left as a stock part 3. Further, the acquired part for the branch point 4 is the parts E, I, and the erase part is the part E. Therefore, the parts I, F are left as the stock parts for the branch point 4.

Based on FIG. 12, the branch point 2 is a high load branch point among the branch points 1 to 6 on the guidance route (step C6: YES). Further, the first branch point 1 is not a high load branch point, therefore the delivery control unit 41 determines that further load distribution from the current load distribution state is possible (step C8: NO, then step C2: NO).

The delivery control unit 41 performs the load distribution process for resolving the high load state of the branch point 2, which is the farthest high load branch point along the guidance route. The delivery control unit 41 determines that the branch point 1, which is before the branch point 2, has common branch road parts A, B with the branch point 2. Therefore, the delivery control unit 41 performs the load distribution process with common part (step C5). The delivery control unit 41, first transfers the part A, which has the smallest data size among the common branch road parts A,B, from the branch point 2 to the branch point, and performs the delivery load calculation process.

As a result, the high load state of the branch point 2 is not resolved, and, thus, the delivery control unit 41 transfers the part B, which is second from the smallest in terms of the data size among the common branch road parts A, B, and performs the delivery load calculation process. Further, as described earlier, the delivery control unit 41 does not perform an operation to return the part A to the branch point 2, therefore, the branch point 1 has the parts A, B.

FIG. 13 shows a branch road part state, after the parts A, B are transferred to the branch point 1. As a result of the delivery load calculation process, the branch point 2 is still calculated as the high load branch point, and the high load state is not resolved. In other words, even after the transfer of all of the common branch road parts A, B to the branch point 1, the high load state of the branch point 2 is not resolved. Therefore, the delivery control unit 41 transfers the part C, which is has smallest data size among the parts C, D, F to the branch point 1, and performs the delivery load calculation process. Further, the delivery control unit 41 does not perform an operation to return the parts A, B to the branch point 2, therefore, the branch point 1 includes the common branch road parts A, B and the non-common branch road part C.

As a result of the delivery load calculation process, the high load state of the branch point 2 is not resolved, and, thus, the delivery control unit 41 transfers the part D, which has the second-smallest data size among the branch road parts C, D, F, to the branch point 1 after returning the part C to the branch point 2, and performs the delivery load calculation process.

As a result, the high load state of the branch point 2 is not resolved, and thus, the delivery control unit 41 transfers the part F, which has third-smallest data size among the branch road parts C, D, F, after returning the part D to the branch point 2, and performs the delivery load calculation process.

With reference to FIG. 14, the high load state of the branch point 2 is resolved. In other words, by moving the parts A, B, F among the branch road parts C, D, A, B, F for the branch point 2 to the branch point 1, the high load state of the branch point 2 is resolved. Additionally, there are no high load branch point among the branch points 1 to 6 on the guidance route (step C6: NO). Therefore, the delivery control unit 41 generates the special schedule (step C7). Further, in the special schedule the acquired parts for the branch point 1 are the parts A, B, F, and, the parts A, B, which were originally in the erase parts (see FIG. 8, are now not to be erased after the vehicle passes the branch point 1. Therefore, the parts A, B, F are left as stock parts for the branch point 1.

In summary, before the vehicle begins traveling, the delivery server 12 generates the general schedule for defining the delivery and erasure of the branch road parts for each of the branch points. Then, if a high load branch point exists on the guidance route, the general schedule is changed for resolving the high load state.

The load distribution process described above, transfers branch road parts of a branch point with a high load state to a branch point that is immediately before the branch point with the high load state, thereby changing the acquired parts of the delivery schedule for the branch point with the high load state and the branch point before the high load branch point. In addition, the erase parts, which provide the branch road parts that are to be deleted after the vehicle has passed the branch point, is also changed. Specifically, the branch road parts, which were transferred to a branch point before the high load branch point, are not erased when they are first acquired, and are instead stored in the stock parts.

In such manner, the branch road parts for the branch point with a high load state, are distributed to the branch point(s) before the high load branch point, thereby enabling a more efficient delivery of the branch road parts from the delivery server 12 to the navigation apparatus 11. As a result, the delay of display of the simple branch point diagram for the branch point is prevented.

Further, among the branch road parts for the high load branch point, the branch road parts in common with a branch point that is positioned before the high load branch point are designated as the common branch road parts, and are included in the branch road parts to be acquired for the branch point before the high load branch point.

In such manner, the delivery of the branch road part from the delivery server 12 to the navigation apparatus 11 is performed in a more efficient manner, and, as a result, the delay of displaying the simple branch point diagram due to the increase of the communication time is prevented.

Further, in the present embodiment, the delivery load of the farthest branch point from the vehicle is distributed toward the branch points that are positioned before the high load branch point step by step. Therefore, the distribution of the delivery load is optimized even when there are two or more high load branch points.

(2) Making and Displaying of Simple Branch Point Diagram

In the following, a simple branch point diagram making and displaying process is described with reference to FIG. 15. Making and displaying of the simple branch point diagram is performed based on a general schedule or a special schedule transmitted to the navigation apparatus 11. Further, the navigation apparatus 11 acquires the branch road parts from the delivery server 12 during the travel of the vehicle at any time, and the simple branch point diagram making and displaying process makes a simple branch point diagram by using the branch road parts acquired, and displays the simple branch point diagram.

Figure 16:
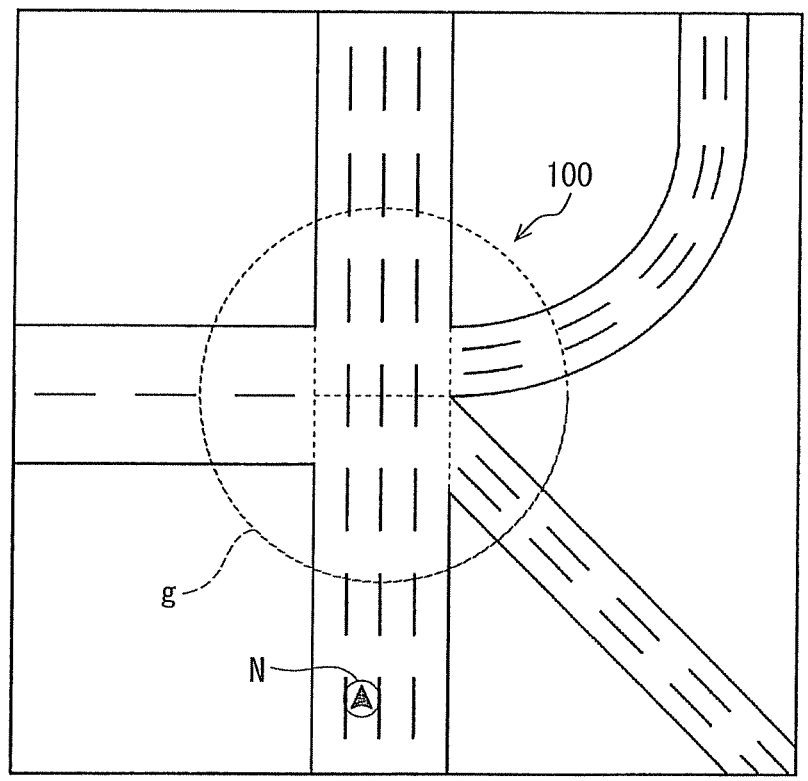
FIG. 16 is an illustration of a display screen of a display unit before the display of the simple branch point diagram of the present disclosure.

With reference to FIG. 16, when the vehicle starts travel or is traveling, the navigation control unit 13 displays a current position N of the vehicle on a map display by the display unit 18 (step D1). The navigation control unit 13 determines whether the position N has entered a guidance area g that includes a branch point the vehicle is approaching (step D2). The size of the guidance area may be fixed to a value of 300 meters around the branch point that the vehicle is approaching (i.e., an immediately-next branch point from the vehicle). The size of guidance area g may take a different value or maybe a variable, for instance, the variation of the area g may be based on the speed of the vehicle, such that when the vehicle speed increased the area g also increases.

When the navigation control unit 13 determines that the position N has entered the guidance area g (step D2: YES), it transmits, to the delivery server 12, the branch point identification information (i.e. a branch point number) to identify the branch point (step D3), based on an assumption that the position N neared the branch point. The transmission process of the branch point identification information is performed according to the acquisition timing in the delivery schedule that the navigation apparatus 11 acquired from the delivery server 12 in advance. Therefore, the navigation control unit 13 transmits, to the delivery server 12, the branch point identification information to identify a branch point whenever it nears each of the branch points.

When the delivery control unit 41 receives the branch point identification information (step E1), it extracts the branch road parts required to make a simple branch point diagram corresponding to the branch point identified by the branch point identification information from the branch road part store unit 43 (step E2). The delivery control unit 41 refers to the branch point shape information associated with the branch point identification information, and recognizes the shape of the branch point. For instance, assuming that the vehicle is approaching a branch point 100 in FIG. 16, the branch point is provided as a four lane road extending straight upward in the illustration with three branches, (i.e., a straight two lane road extending leftward, a straight three lane road extending diagonally right-rearward), and a curved three lane road extending diagonally right-forward. In other words, the branch point shape information includes road information such as a road classification (i.e., the number of the traffic lanes) and a connection direction, which direction the branch road extends to from the center of the branch point, regarding the branch road connected to the branch point. Further, the delivery control unit 41 recognizes, with reference to the branch road part store unit 43, the branch road parts required for making the simple branch point diagram. For instance, with reference to FIG. 2, the simple branch point diagram needs a straight four lane branch road part V, a straight two lane branch road part W, a straight three lane branch road part X, and a curved three lane branch road part Y, which are respectively corresponding to the shape of the branch point 100. In other words, in this case, the delivery control unit 41 extracts the branch road parts V, W, X, Y from the branch road part store unit 43 based on the branch point number.

To make the simple branch point diagram (step E3), the delivery control unit 41 generates positioning data specifying positioning state of the branch road parts required in the simple branch point diagram based on the branch point shape information that the database holds in association with the branch point number. The delivery control unit 41 includes, in the positioning data, information to specify the positioning state of the branch road parts V, W, X, Y (i.e., a positioning and a positioning direction). For instance, with reference to FIG. 17, position direction may include a position [1], [5] a forward direction; a position [3] a leftward direction; a position [7] a rightward direction; a position [2] a left-rearward direction; a position [6] a right-forward direction; a position [4] a left-forward direction; and a position [8] a right-rearward direction. In addition, the position data may provide:

make two copies of the part V and place, in the simple branch point diagram, one of the part V at the position [1] in a forward direction and the other part V at the position [5] in a forward direction, place the branch road part W, in the simple branch point diagram, at the position [3] in a leftward direction, place the branch road part X, in the simple branch point diagram, at the position [8] in a diagonally right-rearward direction, place the branch road part Y, in the simple branch point diagram, at the position [6] in the right-forward direction.

Further, the delivery control unit 41 may include, in the positioning data, information regarding names of the places and/or facilities existing in the direction of each of the branch road parts V, W, X, Y as well as required travel time to reach those places and/or facilities. The delivery control unit 41 then delivers, to the navigation apparatus 11 through the communication unit 42, the branch road parts that the branch road part extraction unit 44 has extracted and the positioning data that the positioning data making unit has made (step E4).

Figure 17:
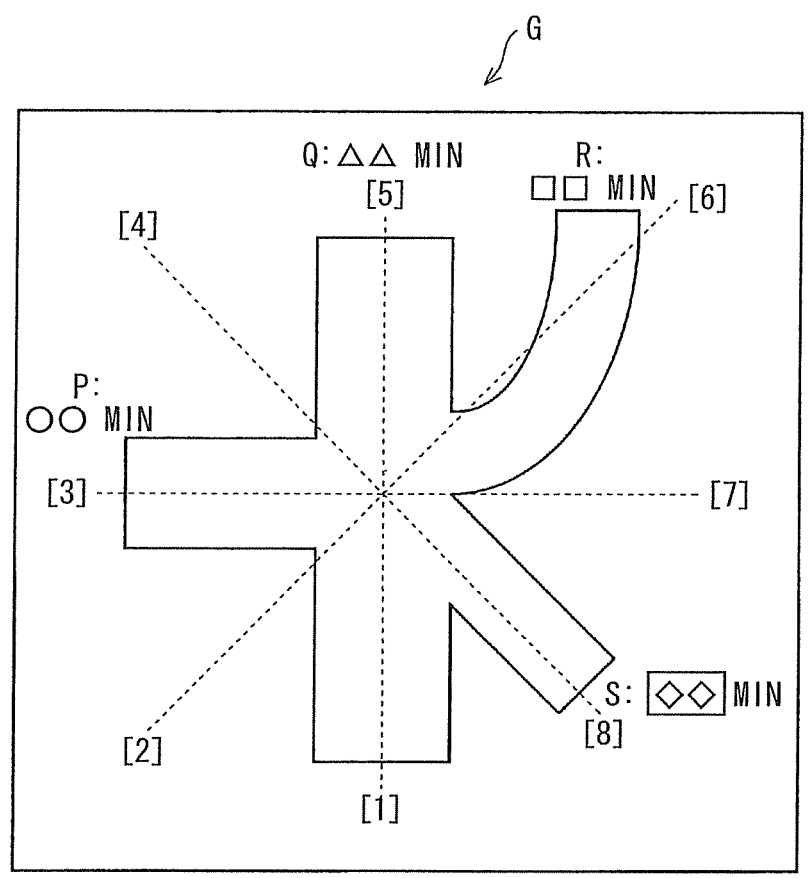
FIG. 17 is an illustration of the simple branch point diagram of the present disclosure.

When the navigation control unit 13 of the navigation apparatus 11 receives the branch road parts and the positioning data, which are delivered from the delivery server 12 (step D4). Based on the branch road parts and positioning data received, the navigation control unit 13 constructs the simple branch point diagram (step D5). For instance, the navigation control unit 13 constructs the simple branch point diagram G as shown in FIG. 17 based on the positioning data recited above. Specifically, the navigation control unit 13 makes:

make two copies of the part V and place, in the simple branch point diagram, one of the part V at the position [1] in a forward direction and the other part V at the position [5] in a forward direction, place the branch road part W, in the simple branch point diagram, at the position [3] in a leftward direction, place the branch road part X, in the simple branch point diagram, at the position [8] in a diagonally right-rearward direction, place the branch road part Y, in the simple branch point diagram, at the position [6] in the right-forward direction.

Further, the navigation control unit 13 arranges the names of the places and the required travel time to the place, if such information is included in the positioning data, besides each of the branch road parts positioned at the respective positions (e.g., as shown in FIG. 17, "place P:O O min," "place Q:ΔΔ min," "place R:☐☐ min," and "place S: ◇ ◇ min").

Figure 18:
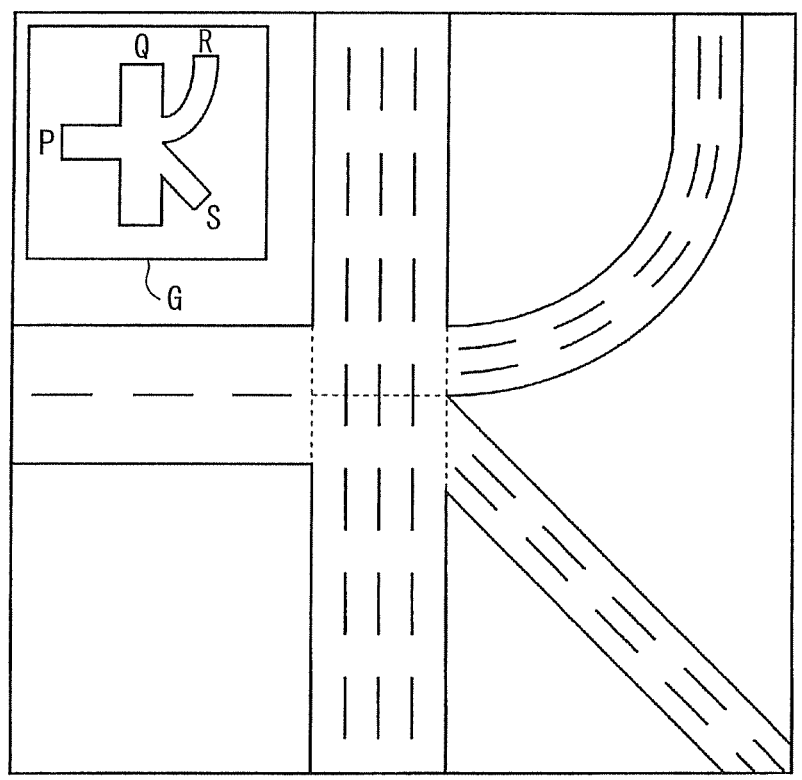
FIG. 18 is an illustration of a display screen of a display unit after the display of the simple branch point diagram of the present disclosure.

The navigation control unit 13 then determines whether the time is equal to a scheduled display timing (step D6). The scheduled display timing is set to display the simple branch point diagram when the vehicle approaches the target branch point at a certain distance, such as 150 meters from the center point of the branch point. Further, the distance of step D6 (i.e., the distance for defining the display timing) is defined as a shorter distance than the distance of step D2 (i.e., the distance for defining the guidance area g). In other words, the distance of step D6 is made shorter than the distance of step D2, so that the navigation apparatus 11 receives the delivery data from the delivery server 12, while traveling from the distance of step D2 to the distance of step D6, and makes and displays the simple branch point diagram The navigation control unit 13 then displays the simple branch point diagram G on top of a map on the display unit 18, as shown in FIG. 18 (step D7), at the scheduled display timing (step D6: YES). Further, though it is not illustrated, the simple branch point diagram G is displayed on at least a part of the display unit 18 in an inserting manner, even when other map elements are displayed on the display unit 18, as shown in FIG. 18.

When the navigation control unit 13 displays the simple branch point diagram G, it erases, according to the erase timing in the delivery schedule, the branch road parts that are no longer needed (i.e., the branch road parts specified in an erase part column) (step D8). Further, the erase timing in the delivery schedule is calculated on an assumption basis. Therefore, the condition for actually erasing the branch road parts requires the vehicle to completely pass a center of the branch point, in addition to the above. In other words, the branch road parts will not be erased until the vehicle does not completely pass a center of the branch point even when the erase timing arrives.

The navigation control unit 13 determines whether the vehicle arrived at the destination of the guidance route after it erases the unnecessary branch road parts (step D9). If the navigation control unit 13 determines that the vehicle has not yet arrived at the destination of the guidance route (step D9: NO), it returns to step D2, and determines whether the vehicle has entered the guidance area g including a next branch point.

According to the present embodiment, data delivered to the navigation apparatus 11 from the delivery server 12 for displaying a simple branch point diagram at each of the branch points includes branch road parts required for making a simple branch point diagram for the branch point and the positioning data that specifies how the branch road parts are arranged in the simple branch point diagram. Therefore, the data size of the delivery data delivered to the navigation apparatus 11 from the delivery server 12, for the purpose of displaying a simple branch point diagram is reduced, and time and cost of the communication is minimized.

Further, the delivery of the branch road parts is performed according to the delivery load calculated for each of the branch roads at respective branch points. As provided above the delivery load may be provided as the communication load to deliver the branch road parts from the delivery server 12 to the navigation apparatus 11 for generating a simple branch point diagram. In such manner, the delivery operation of the branch road parts to the navigation apparatus 11 from the delivery server 12 is performed more efficiently.

In the first embodiment, described above, the delivery load L at each of the branch points and the threshold S (i.e., a standard for determining the high load branch point) are calculated before the start of travel of the vehicle (i.e., a movable body). Such calculation of the delivery load L and the threshold S may change time to time after the start of travel of the vehicle, depending on the traffic condition and other factors. In other words, there may be a situation where the calculated delivery load L, threshold S, and delivery schedule are no longer conducive or relevant to the actual driving situation. In addition, when the user changes the guidance route, or chooses another route, or when the movable body strays away from the guidance route, the delivery schedule according to the old route is no longer relevant or no longer matches the intended guidance route.

Figure 19:
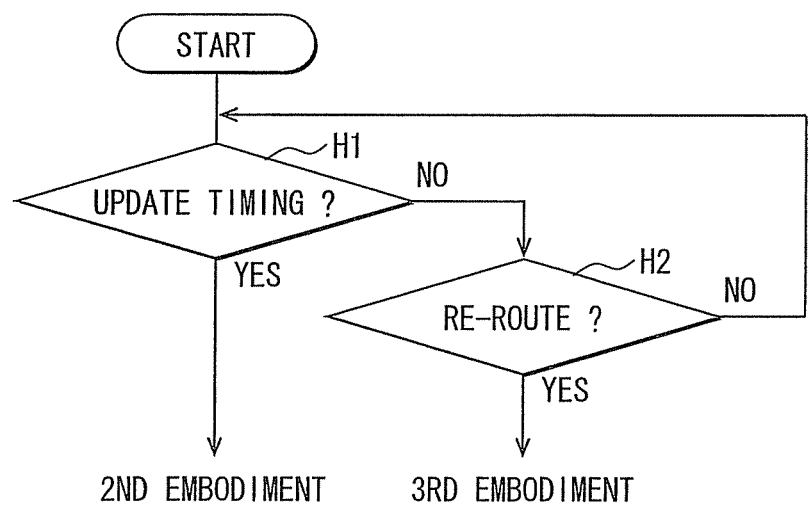
FIG. 19 is a flowchart of control contents after start of a travel of the vehicle of the present disclosure.

Therefore, it is necessary to update those schedules according to the situation after the vehicle starts to travel. The second embodiment and the third embodiment, described below, are in regards to updating the delivery schedule after the vehicle begins to travel With reference to FIG. 19 illustrates an assumption, or a prerequisite of such updates after the start of the travel. FIG. 19 is a flowchart of a basic operation of the terminal and the delivery server for the update.

The navigation control unit 13 determines whether it is a scheduled update timing after the start of travel of the vehicle (step H1). The scheduled update timing may be set, for example, as a time when vehicle approaches a branch point on the guidance route at a certain distance. Further, if the travel time from one branch point to the other (i.e., time to travel of the vehicle between two branch points) is long, the scheduled timing may be set as a timing of arriving at a certain point between the two branch points.

When the navigation control unit 13 determines it is the scheduled update timing (step H1: YES), the navigation control unit 13 performs a control that is described later in regards to the second embodiment. On the other hand, when the navigation control unit 13 determines that it is not the scheduled update timing (step H1: NO), the navigation control unit 13 determines whether a change of the guidance route (i.e., a re-route) is performed (step H2).

When, the navigation control unit 13 determines, a re-route is performed (step H2: YES), it performs a control that is described later in regards to the third embodiment. On the other hand, when the navigation control unit 13 determines, a re-route is not performed (step H2: NO), it returns to step H1. In such manner, after the start of travel of the vehicle, the navigation control unit 13 repeatedly determines whether a schedule update condition is fulfilled (in this case, whether it is a scheduled update timing or whether a re-route is performed). Further, the first cycle of such determination by the navigation control unit 13 may not necessarily be a determination whether it is the scheduled update timing (step H1) but may be a determination whether a re-route is performed not a thing limited to determination (step H2).

When it is the scheduled update timing or if a re-route is detected, the navigation apparatus 11 transmits a request for the update of the schedule to the delivery server 12, and, then, on the delivery server 12 side, the delivery server 12 updates the schedule upon receiving such a request. Then, based on the update of the schedule, the delivery (i.e., the acquisition on the terminal side) and the erase of the branch road parts are performed. In such manner, even if the traffic conditions are changed or the original guidance route is discarded by the user after the start of the travel of the vehicle, the delivery of the branch road parts to the navigation apparatus 11 from the delivery server 12 is performed accurately and efficiently.

Second Embodiment

The second embodiment shows an example of updating the delivery schedule according to a change of the traffic conditions or the like, and transmitting an updated delivery schedule to the navigation apparatus 11 after the vehicle started travel. In other words, the present embodiment is in regards to updating the delivery schedule that was transmitted to the navigation apparatus 11 before the change of the traffic conditions or the like.

Figure 20:
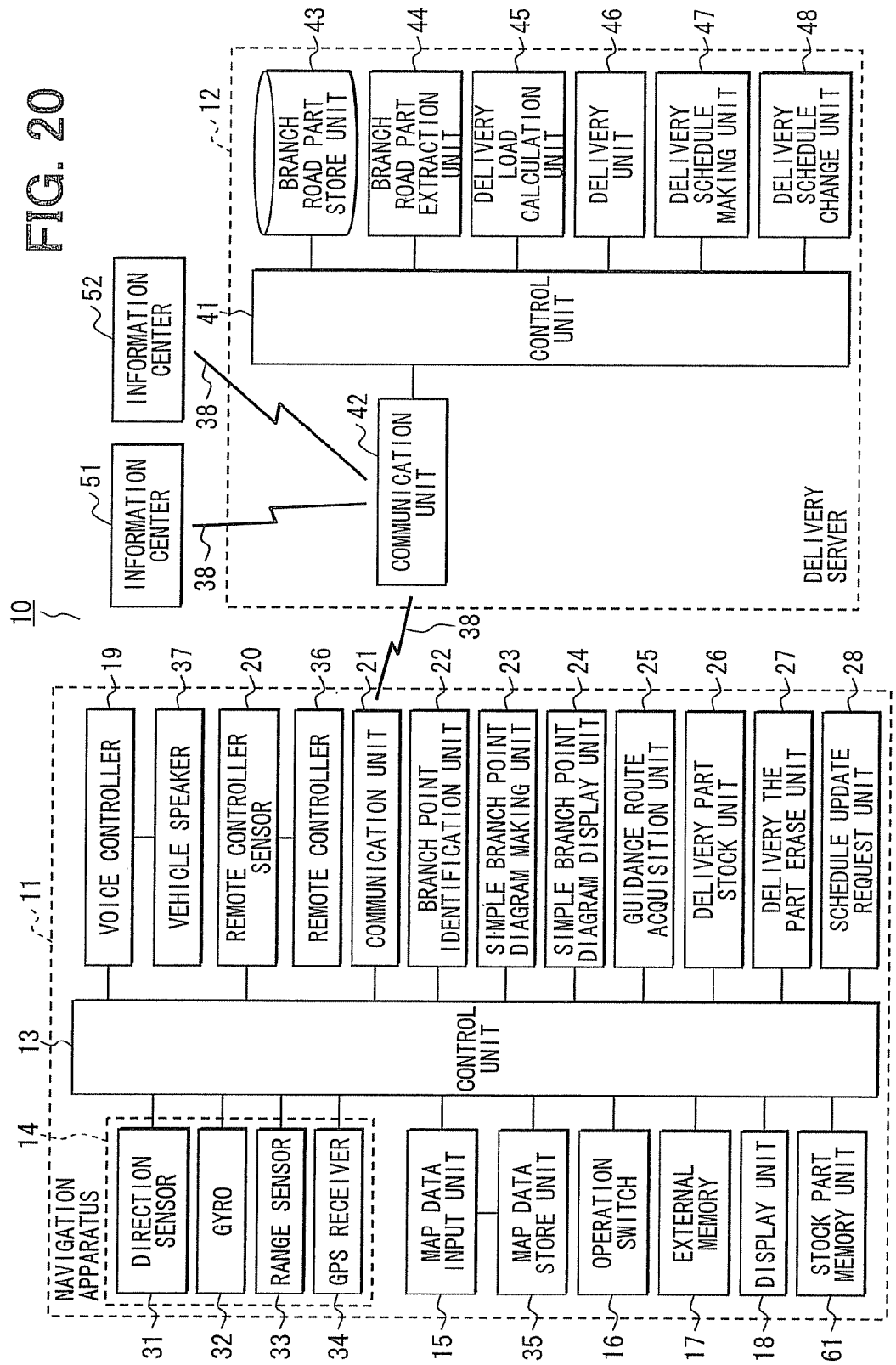
FIG. 20 is a block diagram of a navigation system in a second embodiment of the present disclosure.
Figure 21:
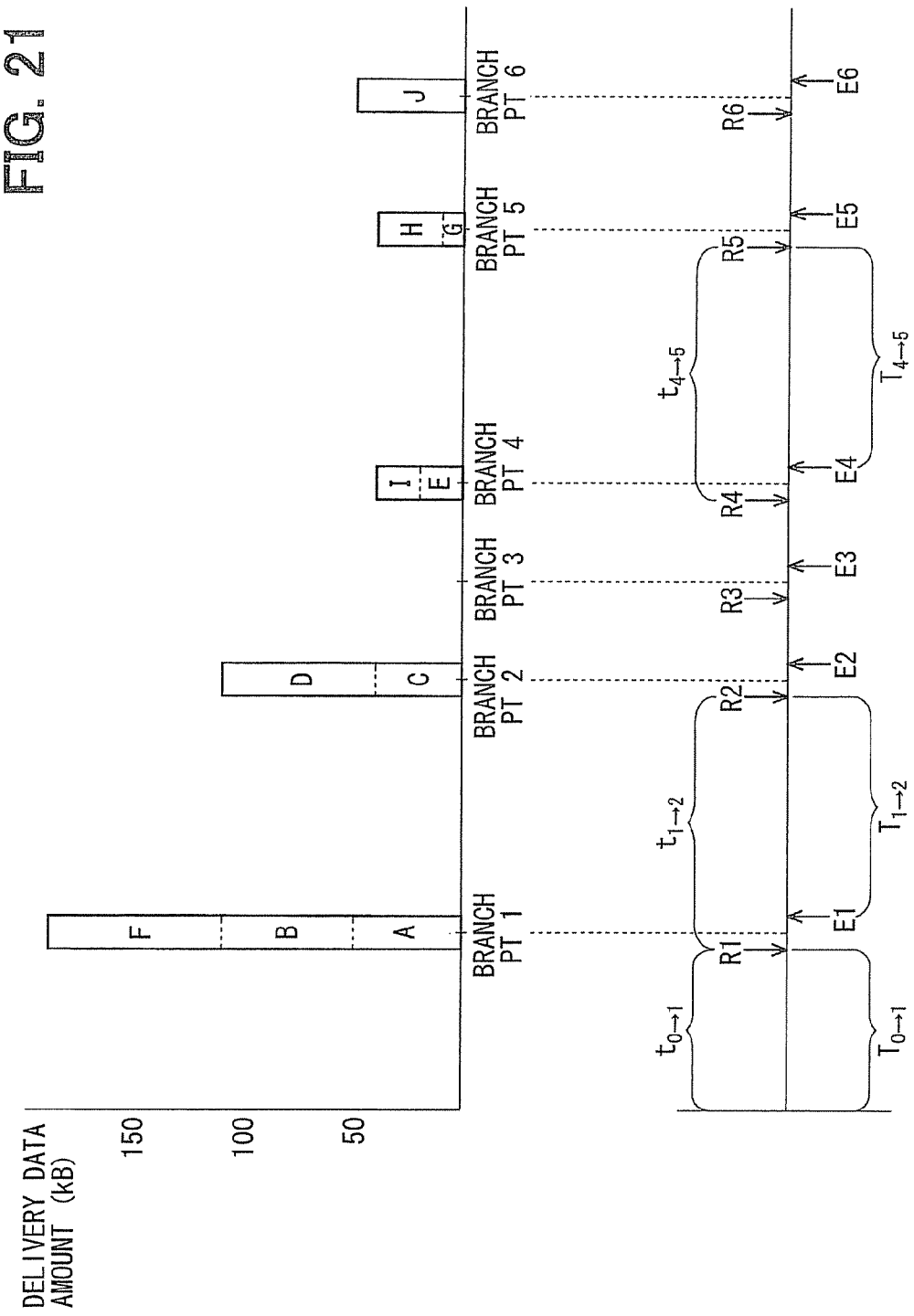
FIG. 21 is an illustration of a concept of acquisition and erasure of branch road parts of the present disclosure.
Figure 22:
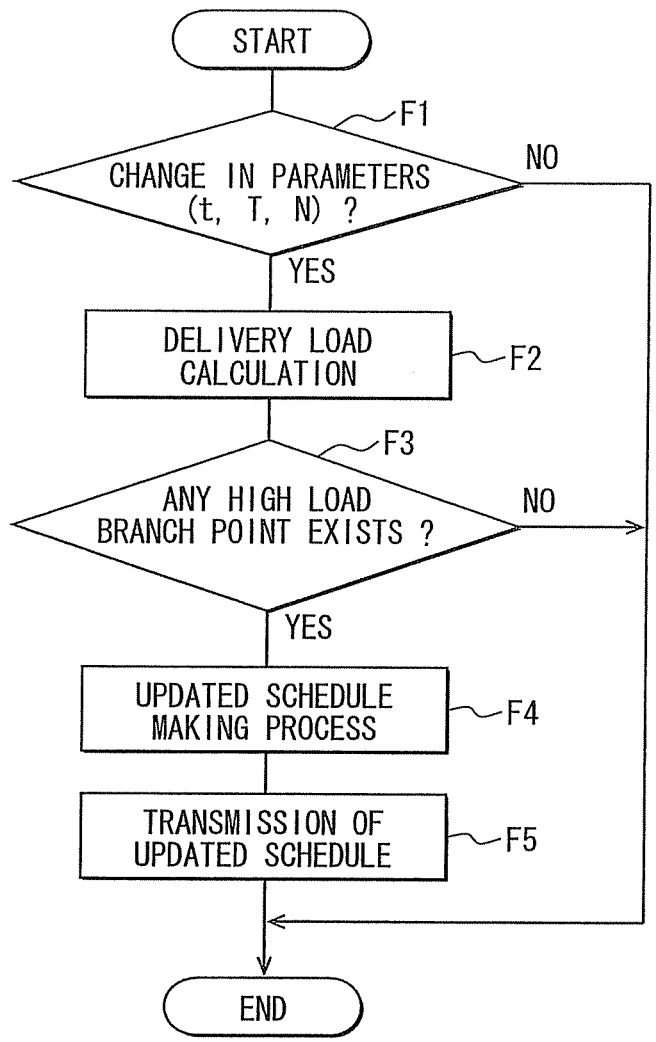
FIG. 22 is a flowchart of control contents performed by a control unit of the delivery server of the present disclosure.

In the present embodiment, with reference to FIG. 20-22, the navigation control unit 13 includes a stock part memory unit 61 (i.e., an example of the delivery part stock unit). The stock part memory unit 61 is a storage medium to memorize the branch road parts as a stock part stored in the navigation apparatus 11, that is, to keep or retain the branch road parts that have been received from the delivery server 12 by the navigation apparatus 11 and have not been erased. Further, the navigation apparatus 11 virtually realizes a notice unit by using software, that is, by executing a control program in a CPU of the navigation control unit 13. The notice unit notifies the delivery server 12 of information to identify the branch road parts (i.e., a stock part) memorized in the stock part memory unit 61 through the communication unit 21.

In the present embodiment, the delivery control unit 41 performs the update process of schedule, by considering the stock part notified from the navigation apparatus 11. The update process of the delivery schedule is described in the following. In the present embodiment, it is assumed that the change (i.e., a re-route) of the originally-set guidance route has not been performed.

When, for example, a special schedule (FIG. 14) is delivered to the navigation apparatus 11, as described in the first embodiment, before the start of the vehicle's travel, the parts acquisition operation and the parts erase operation in the traveling vehicle are performed according to an illustration of FIG. 21, which conceptually describes such operation. When the vehicle actually starts traveling, (FIG. 22) (step F1), the delivery control unit 41 determines whether there is a change in the parameters of equation (1), that is, $t_{k-1 \to k}$ and $T_{k-1 \to k}$, and the parameter in equation (2), that is, $N_k$. Further, the delivery control unit 41 determines whether the vehicle started traveling based on the position information of the vehicle, which the navigation control unit 13 transmits after the start of travel of the vehicle. Further, the delivery control unit 41 determines whether a change has occurred in the traffic condition (i.e., in the parameters $t_{k-1 \to k}$, $T_{k-1 \to k}$, $N_k$) based on various information provided from the information centers 51, 52 or from the other vehicles. For example, a change occurs in each of those parameters $t_{k-1 \to k}$, $T_{k-1 \to k}$, $N_k$ when a traffic congestion occurs.

When the delivery control unit 41 determines no change has occurred in the parameter (step F1: NO), it concludes the process, so that the delivery schedule is unchanged (i.e., the delivery schedule delivered/acquired before the start of the travel of the vehicle remains the same). On the other hand, when a change occurs to at least one of those parameters (step F1: YES), the delivery control unit 41 performs the delivery load calculation process by using calculated changed parameters (step F2). The delivery control unit 41 then determines whether there is a high load branch point on the guidance route as a result of the delivery load calculation process (step F3). When, the delivery control unit 41 determines there is no high load branch point on the guidance route (step F3: NO), it concludes the present process so that the delivery schedule is kept unchanged. On the other hand, when, the delivery control unit 41 determines, there is a high load branch point on the guidance route (step F3: YES), it performs an update schedule making process (step F4), and generates and delivers an updated delivery schedule to the navigation apparatus 11 (step F5).

The update schedule making process (step F4) is described in more detail. The update schedule making process is performed at a predetermined update timing. For example, the update timing may be set according to the acquisition timing of branch road part for a branch point. For instance, if the acquisition timing of the branch road parts for the branch point 1 is 9:01:48, the update timing may be set to a time before the acquisition timing. Further, if the time between the erase timing of the branch road part for a first branch point to the acquisition timing of the branch road part for a second branch point, where the first branch point positioned before the second branch point, is longer than a certain value (e.g., two minutes) in the delivery schedule (i.e., a pre-update schedule), the update timing may be set at a time that is predetermined period after the erase timing. For instance, if the erase timing of the branch road parts for the branch point 1 is 9:03:00 and the acquisition timing of the branch road parts for the branch point 2 is at 9:05:30, the update timing may be set to 9:04:15, which is in the middle of the above two timings.

With reference to FIGS. 23 and 24, by way of explanation it is assumed that an actual acquisition timing of the branch road parts for the branch point 1 by the navigation apparatus 11 is performed according to the acquisition timing defined in the delivery schedule (i.e., the delivery schedule acquired before the vehicle started traveling, cf. FIG. 14) at 9:01:48. Further, it is assumed that an actual erase timing of the branch road parts for the branch point 1 by the navigation apparatus 11 is 12 seconds behind the erase timing defined in the delivery schedule at 9:03:00 (FIG. 24). In such case, the delivery control unit 41 delays or moves back the acquisition timings and erase timings for the branch points positioned after the branch point 1 (i.e., an acquisition timing and an erase timing corresponding to each of the branch points 2 to 6).

Additionally, it is further assumed that a traffic condition has changed further along the guidance route at the branch points subsequent to the branch point 2. For example, a traffic congestion occurs in the vicinity of the branch point 3, and another traffic congestion is resolved in the vicinity of the branch point 4, which now allows a shorter travel time from the branch point 4 to the branch point 5. Subsequently, a shown in FIG. 25, each of the parameters $t_{k-1 \to k}$, $T_{k-1 \to k}$, $N_k$ change from the original condition in FIG. 14 (step F1: YES). Therefore, the delivery control unit 41 applies the changed parameters for calculating the delivery load by performing the delivery load calculation process (step F2). As a result, the branch point 5 is identified as a high load branch point (i.e., a high load state) (step F3: YES). Therefore, the delivery control unit 41 now performs the update schedule making process (step F4).

With reference to FIG. 26, the delivery control unit 41 resets the delivery schedule for the branch points not yet passed on the guidance route (i.e., the branch point 2-6) to a condition of the general schedule. Such reset is performed so that the "non-feasible" present schedule is discarded. "Non-feasible" schedule means that the delivery schedule is not matching the status-quo or the current traffic condition or the like. Further, in this case, the branch road parts A, B, F are left in the navigation apparatus 11 as stock parts, which have been acquired at the branch point 1. Therefore, after resetting to the general schedule, the branch road parts A, B, F will be included in the erase data corresponding to the branch point 2.

The delivery control unit 41 then regenerates a delivery schedule for the branch points not-yet-passed (e.g. the branch point 2-6) in a manner similar to the above-described first embodiment. For instance, with reference to FIG. 27, which is substantially similar to the process shown in FIG. 9, when the delivery control unit 41 determines that there is no high load branch point among the branch points not yet passed on the guidance route (step B5: NO), the delivery control unit 41 generates a general schedule (step G1). In the following description, "the branch points" along the guidance route is mainly in reference to the branch points that have not yet been passed.

On the other hand, when it is determined that there is a high load branch point among the branch points on the guidance route (step B5: YES), the delivery control unit 41 determines whether only the branch point that the vehicle is approaching (i.e., the branch point immediately-next from the vehicle) is the high load branch point (step G2). When the branch point that the vehicle is approaching is not the only high load branch point among the branch points on the guidance route (step G2: NO), the delivery control unit 41 determines (a) whether the high load branch point positioned farthest along the guidance route has a branch road part in common with one of the branch points positioned before the high load branch point or (b) whether navigation apparatus 11 currently holds a stock part that is in common with the branch road parts for the high load branch point farthest along the guidance route (e.g. the branch road parts that were not erased after the vehicle passed the branch point 1) (step G3). When there is no common branch road part with one of the branch points or when there is no common branch road part with the stock parts of the navigation apparatus (G3: NO), the delivery control unit 41 performs the load distribution process without a common part (step G4). On the other hand, when there is a common branch road part (step G3: YES), the delivery control unit 41 performs the load distribution process with a common part (step G5). In this case, the contents of the load distribution process without a common part (step G4) and the contents of the load distribution process with a common part (step G5) are similar to the ones in the first embodiment.

After concluding the load distribution process without a common part (step G4) or load distribution process with a common part (step G5), the delivery control unit 41 determines whether there is, in a post load distribution process state, a high load branch point among the branch points not yet passed on the guidance route (step G6). When there is no high load branch point (step G6: NO), the delivery control unit 41 generates the delivery schedule that reflects the branch road parts distribution state (i.e., a state after having moved the parts by above-described load distribution process) at the moment as a special schedule (step G7). On the other hand, when there is a high load branch point (step G6: YES), the delivery control unit 41 determines whether performing the load distribution process is impossible (step G8).

When the delivery control unit 41 determines that further load distribution is not permissible or impossible, or, that conversion of the branch road parts to the stock parts is not permissible (step G8: YES), the delivery control unit 41 generates the schedule that reflects the branch road parts distribution state at that moment as a special schedule (step G7). On the other hand, when the delivery control unit 41 determines that further load distribution is permissible or possible, or that conversion of the branch road parts to the stock parts is permissible (step G8: NO), it returns process to step G2 described above.

In the present embodiment, when further load distribution is impossible (G8: YES) (i.e., the branch point that is immediately next is the high load branch point), the delivery control unit 41 determines whether the branch road parts for such high load branch point can be converted to be stored as the stock parts. Such conversion may be made for resolving the high load state of the high load branch point, so that the expected erasure process of the branch road parts is saved for load reduction. When the delivery control unit 41 determines that such conversion is possible, it makes the special schedule after such conversion of the parts. If it is determined as impossible, the special schedule is made without such conversion (step G7).

Figure 27:
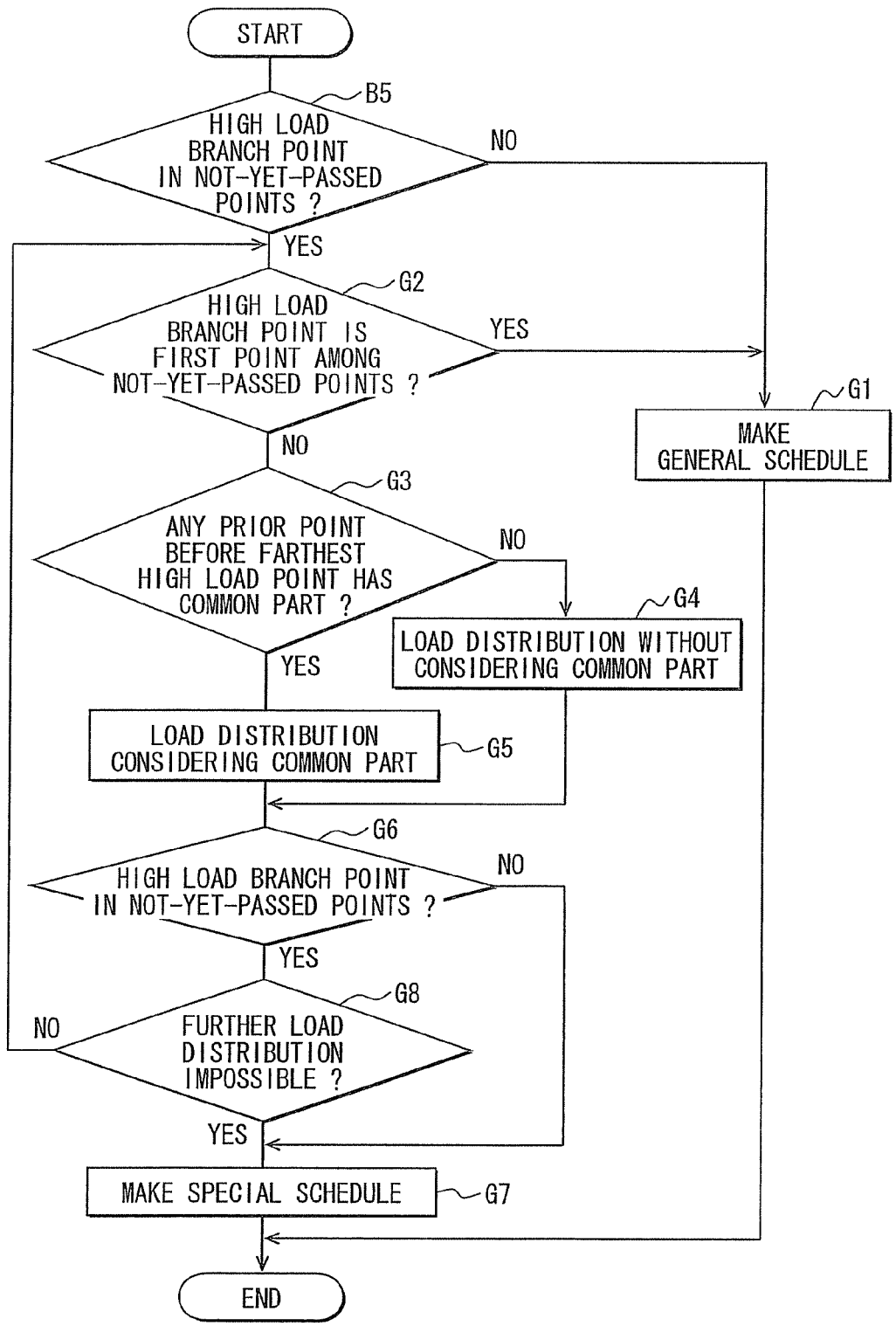
FIG. 27 is a flowchart of a process for generating the delivery schedule of the present disclosure.

The operation according to the process of FIG. 27 is described in more detail. In a state shown in FIG. 25, the high load branch point 5 exists. Therefore, the delivery schedule is reset to the general schedule (FIG. 26), and calculation of the delivery load for each of the branch points is performed again. The branch points 3, 5, which have not yet been passed, are identified as the high load branch points as shown in FIG. 28 (step B5: YES). Further, the branch point 2, which is the branch point that the vehicle is approaching, is not high load branch point (step G2: NO).

The branch point 5, which is the high load branch point farthest along the guidance route, does not have a common branch road part(s) with any one of the branch points 2-4, which are before the branch point 5. Among the stock parts A, B, F in the navigation apparatus 11, the part F is in common with the branch road parts for the branch point 5 (step G3: YES). Therefore, the delivery control unit 41 performs the load distribution process with a common part (step G5).

In the load distribution process (step G5), the delivery control unit 41 gives priority to the part F among the branch road parts F, G, H, I for the branch point 5, which is the high load branch point farthest along the guidance route, for the purpose of moving the part F from the branch point 5 to the branch point 4, which is positioned immediately before the branch point 5, and the delivery control unit 41 performs the delivery load calculation process.

As a result, the high load state of the branch point 5 is not resolved. In other words, moving the common branch road part F in a prioritized manner to the branch point 4 does not resolve the high load state of the branch point 5. The delivery control unit 41 then moves the part G of 10 KB, which is the smallest among the non-common branch road parts, to the branch point 4, and, in such state, performs the delivery load calculation process. In this case, the delivery control unit 41 does not perform an operation to return the part F back to the branch point 5, therefore, the branch point 4 includes the parts F, G.

As a result, the high load state of the branch point 5 is not resolved. Thus, after returning the part G to the branch point 5, the delivery control unit 41 moves the part I of 20 KB, which is the second-smallest among the non-common branch road parts, to the branch point 4, and performs the delivery load calculation process.

As a result, the high load state of the branch point 5 is not resolved. Thus, after returning the part I to the branch point 5, the delivery control unit 41 moves a set of the part G and the part I of 30 KB in total, to the branch point 4, and performs the delivery load calculation process again.

As a result, the high load state of the branch point 5 is resolved. That is, the high load state of the branch point 5 is resolved by moving, to the branch point 4, the common part F and the non-common parts G, I from among the parts F, G, H, I for the branch point 5.

FIG. 29 shows a branch road parts state after the above-described load distribution process. In such state, branch point 3 is a high load branch point among the branch points 2 to 6 (step G6: YES). Further, the branch point 2 among the branch points not yet passed is not a high load branch point. Therefore, performing the load distribution process for resolving the high load state of the branch point 3 is possible (step G8: NO, and step G2: NO).

The branch point 3, which is the high load branch point farthest along the guidance route, does not have a common branch road part(s) with the branch points 2, which is the only branch point before the branch point 3. That is, the branch point 2 exists before the branch point 3, but does not have the parts A, B. Among the stock parts A, B, F in the navigation apparatus 11, the parts A, B is in common with the branch road parts for the branch point 3 (step G3: YES). Therefore, the delivery control unit 41 performs the load distribution process with a common part (step G5).

In the load distribution process (step G5), the delivery control unit 41 gives priority to the part A, which has the smallest data size among the common branch road parts A, B for branch point 3, for moving the part A from the branch point 3 to the branch point 2, which is positioned immediately before the branch point 3, and the delivery control unit 41 performs the delivery load calculation process.

As a result, the high load state is not resolved. Thus, the delivery control unit 41 moves the part B, which has the second smallest data size among the common branch road parts A, B for branch point 3, and performs the delivery load calculation process. In this case, the delivery control unit 41 does not perform an operation to return the part A back to the branch point 3. Therefore, at the moment, the branch point 2 includes the parts A, B.

As a result, a high load state of the branch point 3 is resolved. In other words, the high load state of the branch point 3 is resolved by moving all the branch road parts corresponding to the branch point 3, that is, the branch road parts A, B, to the branch point 2.

FIG. 30 shows a branch road parts state after the above-described load distribution process. In such state, the branch point 2 is a high load branch point among the branch points 2 to 6, which have not been yet passed, on the guidance route (step G6: YES). Further, the branch 2, which is the branch point that the vehicle is approaching, is a high load branch point and is the only high load branch point on the guidance route. Therefore, further load distribution is impossible (step G8: YES).

As provided earlier, when further load distribution is impossible (G8: YES), the delivery control unit 41 determines whether the branch road parts for such high load branch point can be converted to be stored as the stock parts. Therefore, among the branch road parts A, B, C, D for the branch point 2, the branch road parts A, B are already acquired at the branch point 1 and are left un-erased as the stock parts (i.e., stock data). Thus, the delivery control unit 41 converts the parts A, B corresponding to the branch point 2 to the stock parts, or, stores as the stock data. In other words, the delivery control unit 41 deletes, from the branch road parts to be acquired for the branch point 2 the parts A, B. Therefore, the delivery control unit 41 does not deliver the branch road parts A, B at the branch point 2 (it does not let the navigation apparatus 11 acquire the branch road parts A, B newly at the branch point 2), and makes a schedule for using the parts A, B remaining in the navigation apparatus 11 as stock parts at present. In such manner, the parts A, B among the stock parts A, B, F at the moment are deleted from the erase data corresponding to the branch point 2. Thus, the stock parts A, B are now excluded from the erase parts that is deleted from after the vehicle passes the branch point 2. On the other hand, the part F among the current stock parts A, B, F will be deleted from the erase data corresponding to the branch point 2. That is, the stock part F is deleted after the vehicle passes the branch point 2 (i.e., stock of the part F is not determined).

In such manner, the branch road parts expected to be erased in the pre-update erase schedule will not be erased according to the post-update erase schedule. Therefore, the branch road parts otherwise erased will not be erased, and thus will be kept as stock parts. That is, if the branch road parts, which should not be erased, are erased, such parts have to be delivered again. However, the present disclosure prevents such a wasteful erasure of the branch road parts. Therefore, the delivery of the branch road parts to the navigation apparatus 11 from the delivery server 12 is performed more efficiently, and the delay of the display of the branch point diagram due to the increase of the communication time is prevented among other things.

FIG. 31 shows a state after the above-described process. In such state, there is absolutely no high load branch point among the branch points 2 to 6, which are the branch point have not yet been passed on the guidance route.

According to the embodiment described above, the delivery of the branch road parts to the navigation apparatus 11 from the delivery server 12 is performed in a flexible manner while responding to the changes of traffic conditions or the congestion situation, thereby facilitating the making and display of the simple branch point diagram in the navigation apparatus 11. In other words, the navigation apparatus 11 is, by distributing the delivery load according to the traffic conditions or the like, capable of preventing delay of the communication and/or delay of processing, thereby enabling the display of the simple branch point diagram corresponding to the branch point ahead in the guidance route for the user at a right timing, and facilitating a safe and comfortable driving.

Further, in the present embodiment, the original schedule is reset and then the delivery load is re-calculated. Therefore, without sticking to the original schedule, the update of the delivery schedule is flexibly performed depending on the traffic conditions or the like. Such delivery schedule update scheme is especially advantageous when the change of the traffic conditions or the like is drastic.

Further, as modification of the present embodiment, the resetting of the delivery schedule for the not-yet-passed branch points to the general schedule may not be performed in the update schedule making process (step F4). Such change of non-resetting is advantageous for the situation when the change of the traffic conditions or the like is not so drastic, thereby allowing a partial re-use of the original schedule.

Third Embodiment

The third embodiment of disclosure is described in the following. In the present embodiment, when the guidance route is changed (i.e., re-routed) after the start of travel of the vehicle, a delivery schedule is made (i.e., updated) according to the re-routed guidance route, and the delivery schedule is transmitted to the navigation apparatus 11. The following example is used to illustrate the update and re-transmission of the delivery schedule according to a change in the guidance route. In the following description the guidance route that has been re-routed may be referred to as the re-routed guidance route.

Figures 32, 33:
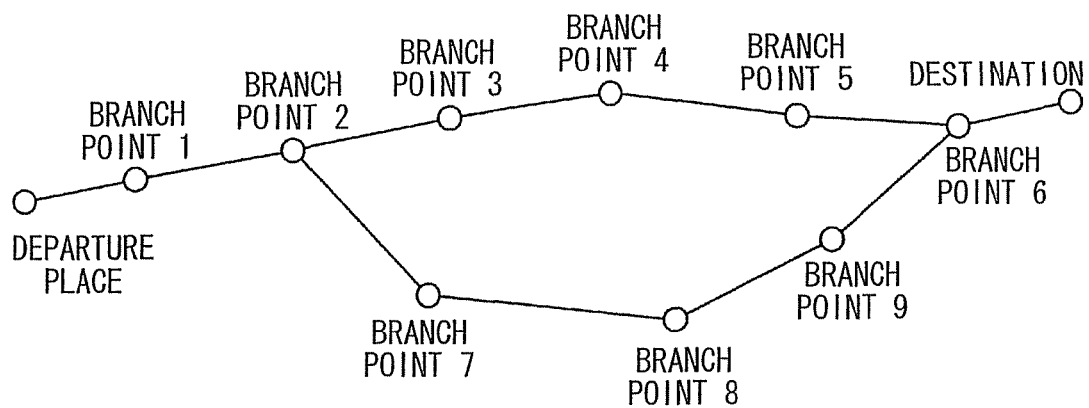
FIG. 32 is an illustration of the branch points on a guidance route in a third embodiment of the present disclosure.
FIG. 33 is a table of the branch points on the guidance route of FIG. 32, and branch road part corresponding to such branch points.

With reference to FIG. 32, the original guidance route (c.f. FIG. 4) provides that the vehicle travels from the departure place→the branch point 1→the branch point 2→the branch point 3→the branch point 4→the branch point 5→the branch point 6→the destination. The original guidance route is now re-routed routed, such that the vehicle travels from the departure place→the branch point 1→the branch point 2→the branch point 7→the branch point 8→the branch point 9→the branch point 6→the destination.

With referent to FIG. 33, the branch road parts required for making the simple branch point diagram for the branch points 7, 8, 9 is provided. The parts H, J are required for the simple branch point diagram for the branch point 7, the parts A, C, D are required for the simple branch point diagram for the branch point 8, and the parts H, I are required for the simple branch point diagram for the branch point 9.

Further, the following conditions are assumed in the present embodiment. That is, when the vehicle travels while acquiring the branch road parts according to the special schedule of FIG. 14, the vehicle is assumed to travel toward a different road (i.e., a road from the branch point 2 to the branch point 7) that is different from an originally-planned road (i.e., a road from the branch point 2 to the branch point 3) according to the original delivery schedule (c.f. FIG. 14). Then, it is further assumed that the guidance route in the navigation apparatus 11 is re-routed. At such point, the navigation control unit 13 does not perform the erase operation of the branch road parts after passing the branch point 2, and transmits to the delivery server 12: the re-routed guidance route, the schedule update request, the current position of the vehicle, information regarding to what point the delivery schedule (i.e. original delivery schedule) was performed, current information or data regarding the stock parts currently stored, together with other information.

The delivery control unit 41 performs a process that is same as the transmission and reception process of the schedule of the first embodiment about the re-routed guidance route. FIG. 34 shows the branch road parts respectively corresponding to the branch points 1, 2, 7, 8, 9, 6 in the re-routed guidance route. In such case, if the stock parts are taken into consideration (i.e., the parts A, B, F acquired at the acquisition timing corresponding to the branch point 1 and the parts C, D acquired at the acquisition timing corresponding to the branch point 2), the branch road parts A, C, D corresponding to the branch point 8 may be identified as the common parts in a process for identifying the common parts (i.e., the process of step B3 of FIG. 3). However, here, in the process for identifying the common parts, the stock parts are not taken into consideration (i.e., in this case, the part A, B, C, D, F are not considered). Therefore, the common branch road parts are the part H which is common to the branch points 7, 9 and the part J which is common to the branch points 7, 6.

The delivery control unit 41 then performs the delivery load calculation process for each of the branch points not yet passed (i.e., the branch point 7,8,9,6). In such case, the delivery control unit 41 takes the latest traffic condition (i.e., the latest parameters) into consideration, and calculates the delivery load. For example, by considering the congestion situation of each of the branch points 7, 8, 9, 6 and the change of the predicted number of vehicles ($N_k$) for each of the branch points 7, 8, 9, 6, and the delivery load of each of the branch points are calculated.

Further, in the calculation of the delivery load of the branch points not yet passed in the re-routed guidance routes, the delivery control unit 41 resets the contents of the delivery schedule to the general schedule before performing such calculation. For example, though not illustrated, the guidance route after the re-route passes the departure place→the branch point 1→the branch point 2→the branch point 7→the branch point 8→the branch point 4→the branch point 5→the branch point 6→the destination, the contents of the schedule of the branch points 4, 5, 6 included in the original guidance route are also reset to the general schedule. Further, in the present embodiment, the example shows the resetting of the contents of the delivery schedule to the general schedule about the branch points that are common to a new route (i.e., a guidance route after the re-route) and the former route (i.e., a guidance route before the re-route) among the branch points not yet passed. However, the contents of the delivery schedule may be left unchanged, that is, may be configured not to be reset to the general schedule.

FIG. 34 shows a state that reflects the latest traffic condition to the original schedule and that has the contents of the delivery schedule of the branch points 7, 8, 9 not yet passed being reset to the general schedule. In other words, a general schedule is set for the branch points 7, 8, 9.

Then, the updated delivery schedule is made by a process similar to the process shown in the flowchart in FIG. 27. The process is described step by step in the following. The delivery control unit 41, first determines that the branch points 8 and 6 are high load branch points among the branch points that have not yet been passed on the new guidance route. Further, the branch point 7, which is the branch point that the vehicle is approaching, is not a high load branch point among the branch points not yet passed. Therefore, the delivery control unit 41 performs the load distribution process for resolving the high load state of the branch point 6, which is the high load branch point farthest along the new guidance route. Further, from among the branch points 7, 8, 9, which are before the branch point 6, the branch point 7 has the part J, which is a common branch roads part with the branch point 6. Therefore, the delivery control unit 41 performs the load distribution process with a common part.

As described earlier, the delivery control unit 41, first gives priority to the common branch road parts, which in this case is the part J, and transfer the part j from the branch point 6 to the branch point 9, which is immediately before the branch point 6, and the delivery control unit 41 performs the delivery load calculation process. Further, in this case, the branch road part for the branch point 6 is only the part J. Therefore, if the common branch road part is the only part, there may be no need to consider the distinction between the common branch road part and the non-common branch road part. Further, prioritization of the common branch road part may not be considered.

As a result, the high load state of the branch point 6 is resolved. That is, the high load state of the branch point 6 is resolved by moving the part J to the branch point 9. Further, the branch point 9 newly becomes a high load branch point.

FIG. 35 shows a branch road parts distribution state after the above-described load distribution process. In such state, the branch points 8 and 9 are a high load branch points 8, 9 on the new guidance route, and, therefore, the branch point 7, which is the branch point that the vehicle is approaching, is not a high load branch point. Therefore, the delivery control unit 41 determines that a load distribution is possible.

The branch point 9 is the high load branch point that is farthest along the new guidance route, so the delivery control unit 41 performs the load distribution process for resolving the high load state of the branch point 9. The branch point 7, which is before the branch point 9, has the parts H,J that are common branch road parts with the branch point 9. Therefore, the delivery control unit 41 performs the load distribution process with a common part.

The common branch road part H of 30 KB, which has the smallest data size among the common branch road parts H, J, is moved to the branch point 8, and the delivery control unit 41 performs the delivery load calculation process again. As a result, the high load state of the branch point 9 is resolved. Here, the high load state of the branch point 9 is resolved, by moving, the part H to the branch point 8.

FIG. 36 shows a branch road parts distribution state after the above-described load distribution process. In such state, the branch point 8 is a high load branch point among the branch points 7, 8, 9, 6, which have not yet been passed on the new guidance route. Further, the branch point 7 is not a high load branch point. Therefore, the delivery control unit 41 determines that a load distribution process is possible. Thus, the delivery control unit 41 performs the load distribution process for resolving the high load state of the branch point 8. The branch point 7, which is before the branch point 8, has the part H, which is a common branch road part with the branch point 8. Therefore, the delivery control unit 41 performs the load distribution process with a common part.

The common branch road part H is first moved from among the parts A, C, D, H for the branch point 8 to the branch point 7, and the delivery control unit 41 performs the delivery load calculation process again.

With reference to FIG. 37, the high load state of the branch point 8 is not resolved. Therefore, the delivery control unit 41 further tries a process to move a branch road part to the branch point 7. Here, the part H, which is considered as the common branch road part, is already moved to the branch point 7.

Therefore, the delivery control unit 41 now considers the stock part as a common part, and determines a branch road part to move to the branch point 7. That is, if the stock parts currently stored are the parts A, B, C, D, F, the parts A, C, D for the branch point 8 are in common with (i.e., among) the stock parts. Then, the delivery control unit 41 determines, from among the common branch road parts A, C, D, the part C of 40 KB that is smallest, as the part to be moved next to the branch point 7.

The delivery control unit 41 moves the part C determined in the above-described manner to the branch point 7, and, in such state, performs the delivery load calculation process again.

FIG. 38 shows a state that the part C has been moved to the branch point 7. In such state, even when the part C is moved to the branch point 7, the high load state of the branch point 8 is not resolved, and the branch point 7 newly becomes the high load branch point. Therefore, the delivery control unit 41 moves the part A of 50 KB that is second-smallest among the branch road parts A, C, D next to the branch point 7, and performs the delivery load calculation process in such state again. Further, the delivery control unit 41 does not perform an operation to return the branch road part C, which once moved to the branch point 7, back to the branch point 8. Therefore, at the moment, the branch point 7 has the parts H, A, C moved thereto.

As a result, the high load state of the branch point 8 is resolved. That is, the high load state of the branch point 8 is resolved by moving the branch road parts H, A, C corresponding to the branch point 8 to the branch point 7.

In other words, for resolving the high load state of the high load delivery point, a part that is in common with both of the delivery parts of the high load branch point and the parts scheduled to be delivered (i.e., acquired) at the branch point before the high load branch point (i.e., a common delivery part) is changed (i.e., moved, or, re-distributed) in a prioritized manner to the branch point previous to the high load branch point. Here, if there is no common delivery part any more in the high load branch point during the process, a common part that is in common with the stock parts (i.e., a common stock part) is moved in a prioritized manner.

As described above, since a process is performed that the common parts among the delivery parts of the high load branch point are moved as much as possible, the delivery of the branch road parts from the delivery server to the terminal is performed more efficiently, thereby preventing the delay of the display of the branch point diagram due to the increase of the communication time or the like.

FIG. 39 shows a branch road parts state after the above-described load distribution process. In such state, there is the branch point 7 is a high load branch point among the branch points 7, 8, 9, 6 not yet passed on the guidance route. Further, the branch point 7 is the branch point that the vehicle is approaching. Therefore, the delivery control unit 41 determines that the load distribution process is impossible.

As provided earlier, when further load distribution is impossible, the delivery control unit 41 determines whether the branch road parts for such high load branch point can be converted to be stored as the stock parts. The parts A, C are already acquired among branch road parts A, C, H, J for the branch point 7 from the branch points 1, 2, and are still remaining as the stock parts (i.e., stock data). Therefore, the delivery control unit 41 moves the part C that has the smallest data amount among the parts corresponding to the branch point 7 to the stock part. In other words, the delivery control unit 41 deletes the part C from among the parts A, B, C, D, F, because the part C is found in common for both of the parts for the branch point 7 and the stock parts, and is smallest among the parts for the branch point 7. That is, the delivery control unit 41 makes a delivery schedule that does not acquire the branch road part C at the branch point 7, and uses the part C in the stock parts. In such manner, the part C among the stock parts A, B, C, D, F, which are currently to be erased after the vehicle passes the branch point 2, is removed from the parts to be erased. That is, the stock part C is excluded from the parts that are deleted after the vehicle passes the branch point 2 (i.e., stock of the part C is determined).

FIG. 40 shows a state after the above-described process. In such state, the high load state of the branch point 7 is not resolved yet. Therefore, the delivery control unit 41 moves, to the stock parts, the second-smallest part A among the branch road parts A, C corresponding to the branch point 7 at the moment (i.e., among the parts common to the stock parts). In other words, among the branch road parts A, C, H, J corresponding to the branch point 7, the second-smallest part A, which is in common with the stock parts, is deleted from the parts for the branch point 7. That is, the control unit 41 makes a delivery schedule that does not acquire the part A at the branch point 7, and uses the part A as the stock part at the branch point 7. In such manner, the part A among the stock parts A, B, C, D, F at the moment is deleted from the erase data corresponding to the branch point 2. In other words, the stock part A is excluded from the parts which are going to be deleted after the vehicle passes the branch point 2 (i.e., stock of the part A is determined).

FIG. 41 shows a state after the above-described process. In such state, there is no high load branch point at all among the branch points 7, 8, 9, 6 not yet passed on the guidance route. Further, from among the stock parts A, B, C, D, F, the parts B, D, F will not be deleted from the erase data corresponding to the branch point 2. In other words, the stock parts B, D, F are deleted after the vehicle passes the branch point 2 (i.e., the parts B, D, F are not determined as stock parts).

According to the present embodiment, even when the original guidance route is changed (i.e., re-routed), the branch road parts are delivered to the navigation apparatus 11 from the delivery server 12 according to the latest traffic condition of the changed route or the like, and the simple branch point diagram is thus smoothly made and displayed in the navigation apparatus 11.

Further, in the example of the present embodiment, the part D among the stock part A, B, C, D, F at the time of the re-route is required for the branch point 8. Therefore, it may be an option to keep the part D left un-erased. However, if the time after the re-route to the arrival of the vehicle at the branch point 8 (i.e., the travel time of the vehicle) is long, it may be better for the navigation apparatus 11 to erase the part D once and to re-acquire the part D prior to arriving at the branch point 8, in terms of efficient use of the limited memory area in the navigation apparatus 11 (i.e., the vehicle). In such manner, from among the many common branch road parts, a certain common part may be once erased and re-acquired as required, while the other common part may be left un-erased for keeping it. Such a dual-control is enabled in the present embodiment.

In other words, if the common branch road parts are configured to be uniformly kept un-erased in the navigation apparatus 11, it may lead to the inefficient use of the limited memory area by occupying the memory area due to the un-erased common parts. However, in the present embodiment, such an inefficient use of the memory area is prevented.

Further, for example, the scheme of the present embodiment is applicable to the case in the second example (i.e., the second embodiment) that the guidance route is changed (i.e., re-routed) after the update of the schedule. In other words, the second embodiment and the third embodiment are usable at the same time.

Fourth Embodiment

The fourth embodiment of the present disclosure is described next. In each of the above-described embodiments, the branch road parts are delivered from the delivery server 12, corresponding to each of the all branch points on the guidance route set by the navigation apparatus 11.

In contrast, the present embodiment shows an example which delivers, to the navigation apparatus 11 from the delivery server 12, the branch road parts commonly used at the branch points non-immediately-next branch points relative to the vehicle. The non-immediately-next branch points are the branch points other than the immediately-next branch point.

More practically, the branch point identification unit 22 of the navigation apparatus 11 identifies immediately-next branch point relative to the vehicle, and also identifies multiple non-immediately-next branch points in the travel direction of the navigation apparatus 11 (i.e., the vehicle), which exist within a predetermined distance from the vehicle. The predetermined distance for defining such a scope may be variably changed. Further, the predetermined distance may have a fixed value, or variably changed according to, for example, the speed of the vehicle.

On the other hand, the branch road part extraction unit 44 in the delivery server 12 extracts, as a common branch road part(s), a branch road part(s) that are commonly used in the simple branch point diagrams at multiple non-immediately-next branch points, from among the branch road parts that are required for making the simple branch point diagram at each of the all branch points.

Further, the delivery unit 46 of the delivery server 12 delivers the extracted common branch road parts extracted by the branch road part extraction unit 44 (i.e., the parts commonly required at the multiple non-immediately-next branch points) to the navigation apparatus 11 before the vehicle arrives at the immediately-next branch point.

For example, in an example shown in FIG. 42, the immediately-next branch point is the branch point $\alpha$, and the non-immediately-next branch point are branch points $\beta$, $\gamma$. The branch road part extraction unit 44 extracts the branch road part E as a common branch road part, which is used commonly at the two non-immediately-next branch points $\beta$, $\gamma$. Then, the delivery unit 46 delivers the common branch road part E to the navigation apparatus 11 before the vehicle arrives at the immediately-next branch point $\alpha$. Further, the part A is a branch road part that is used commonly at the two non-immediately-next branch points $\beta$, $\gamma$, but it is also used commonly at the immediately-next branch point $\alpha$. Therefore, the branch road part A is excluded from the target of extraction of common branch road parts by the branch road part extraction unit 44.

In the present embodiment, as in other embodiments, the navigation apparatus 11 delivers the branch road part E in advance at the immediately-next branch point $\alpha$, the part E to be used in the future. Therefore, the delivery operation of the branch road parts to the navigation apparatus 11 from the delivery server 12 is performed efficiently. Further, the configuration in the present embodiment is particularly advantageous because it is applicable to a case that does not acquire a guidance route.

Other Embodiments

Other embodiments such as modifications of the above embodiments are described in the following.

For example, when there are two vehicles M and N, which are expected to reach a branch point at the same time, there may be a case that, for the vehicle M, the branch point is the immediately-next branch point, but not for the vehicle N (i.e., the branch point is the second, or farther, branch point for the vehicle N: the branch point is not the immediately-next branch point for the vehicle N). In such a case, the safety coefficient may be set to a higher value for the vehicle M than for the vehicle N, for example (i.e., the safety coefficient for the vehicle that has the branch point as first branch point in the guidance route is raised than the coefficient for the other vehicle), for the purpose of assigning a wider band with to the vehicle M. In such manner, the concentration of the delivery load at the closer branch points relative to the vehicle is prevented.

In other words, as described in the above embodiments, by performing the load distribution process to distribute the delivery load to the previous branch point among the adjacent branch points, the delivery load of the branch point closer to the movable body (i.e., the terminal or the navigation apparatus 11) typically increases.

Therefore, when two or more terminals are expected to receive the parts delivery at the same time for a certain branch point, the threshold of the vehicle which has the certain branch point as the immediately-next branch point is favored. In other words, the threshold of a target terminal to which the certain branch point serves as the immediately-next branch point is increased than the threshold of the other terminals, for the purpose of making it difficult for the certain branch point to become the high load branch point of the target terminal. In such manner, the delivery of the branch road parts to the terminal from the delivery server 12 is performed more efficiently, thereby preventing the delay of the display of the branch point diagram or the like, for example.

When multiple branch points are in a small area, the multiple branch points may be treated as a single branch point group. For example, in the example of FIG. 7, if the branch points 2, 3, 4 are located in a small area, the branch road parts C, D for the branch point 2 and the branch road parts A, B for the branch point 3 and the branch road part E for the branch point 4 may be treated as one group. In other words, the branch road parts A, B, C, D, E may be treated in bundle for one group of branch points.

Even in such configuration, the delivery of the branch road parts from the delivery server to the terminal is performed more efficiently due to the reduction of the communication frequency (i.e., the reduction of the amount of communication), thereby preventing the delay of the display of the branch point diagram due to the increase of the communication time or the like.

Further, in the embodiment described above, the branch point shape information is stored in the branch road part store unit 43 in advance. However, for example, the branch point shape information of each of the branch points may be stored in the map data store unit 35 of the navigation apparatus 11, and such information may be notified together with the branch point number from the navigation apparatus 11 to the delivery server 12.

Further, in the embodiment described above, the navigation apparatus 11 installed in the vehicle is described as a terminal. However, the terminal may be a portable device which may be carried by human beings, for example, such as a cellular phone. In such a case, the terminal may at least include the control unit 13, the map data input unit 15, the GPS receiver 34, the map data store unit 35, the operation switch 16, the external memory 17, the display unit 18, the speaker 17, the communication unit 21, the branch point identification unit 22, the simple branch point diagram making unit 23, the simple branch point diagram display unit 24, the guidance route acquisition unit 25, the delivery part stock unit 26, the delivery part erase unit 27, the schedule update request unit 28.

Further, when the terminal is a portable device such as a cellular phone, the size of the display unit 18 may have some limitation, and such limitation may be avoided by transmitting the contents of the display unit 18 to a larger display screen of the vehicular device. Such a transmission of the display data may be realized through an interface, that is, a wireless connection or a wired connection, between the terminal and the vehicle. More practically, a wireless connection through Bluetooth, Wi-Fi (i.e., Wireless-Fidelity) (both are registered trademarks), or a wired connection such as USB (i.e., Universal Serial Bus) may be used for transmission of the display data.

Further, in the embodiment described above, the branch point identification unit 22 is disposed in the terminal (i.e., the navigation apparatus 11). However, such a unit may be disposed in the delivery server 12 as well. In such case, by notifying a travel direction or guidance route information from the terminal side to the delivery server through communication (i.e., a travel direction notification unit and a guidance route notification unit: such units may be realized mainly by the control units 13, 41 and the communication units 21, 43), the branch points in the travel direction or on the guidance route may be identified on the server side in the delivery server 12.

Further, the guidance route may be calculated on the server side in the delivery server 12. In such case, the map data store unit 35 may be disposed in the delivery server 12, and may acquire position information and destination information from the terminal side, for the calculation of the guidance route. The calculated guidance route may be notified to the terminal through communication. Further, in this case, the delivery server 12 may have the map data and may refer to the map data as required.

The branch point diagram of the present disclosure may not only be the simple branch point diagram for showing a shape of the branch point in a simple manner, but also be a detailed branch point diagram for showing a shape of the branch point in detail, for example.

What is claimed is:

1. A branch point diagram display system comprising:
   a terminal disposed on a movable body for displaying a branch point diagram of a branch point of a road;
   a delivery server for delivering data to the terminal at a position before the branch point;
   a branch point identification unit for identifying a plurality of branch points for which a corresponding branch point diagram is displayed;
   a branch road part store unit disposed in the delivery server for storing a plurality of branch road parts for generating the branch point diagram, wherein a branch road part fully represents a branch point;
   a delivery schedule making unit disposed in the delivery server for generating a delivery schedule that defines a delivery part as the branch road part delivered to the terminal at a position before the branch point and for generating an erase schedule that defines the delivery part to be erased at an erase time;
   a delivery load calculation unit disposed in the delivery server for calculating a delivery load of the delivery part to the terminal according to the delivery schedule;
   a change unit disposed in the delivery server for changing the delivery schedule according to the delivery load calculated by the delivery load calculation unit;
   a delivery unit disposed in the delivery server for acquiring and delivering the delivery part from the branch road part store unit to the terminal according to the delivery schedule;
   a branch point diagram making unit for generating the branch point diagram for each of the branch points identified by the branch point identification unit based on the branch road part delivered by the delivery unit for the branch point; and
   a branch point diagram display unit for displaying the branch point diagram generated by the branch point diagram making unit.

2. The branch point diagram display system of claim 1, wherein the branch point identification unit identifies, as the plurality of branch points, the branch points in a travel direction of the movable body.

3. The branch point diagram display system of claim 1 further comprising:
   a guidance route acquisition unit for acquiring a guidance route of the movable body, wherein
   the branch point identification unit identifies, as the plurality of branch points, the branch points on the guidance route of the movable body.

4. The branch point diagram display system of claim 1, wherein
   the delivery load calculation unit calculates the delivery load for each of the branch points identified by the branch point identification unit,
   the change unit compares the delivery load with a threshold specifically determined for each of the branch points to determine if the branch is a high load branch point, and the change unit generates a special delivery schedule when the branch point is a high load branch point, the delivery unit delivers the delivery part to the terminal according to the special delivery schedule.

5. The branch point diagram display system of claim 1 further comprising:
a delivery part stock unit for storing the delivery part that have been delivered; and
a delivery part erase unit to erase the delivery part stored in the delivery part stock unit at the erase time after the display of the branch point diagram at the branch point, wherein
the change unit modifies the erase schedule according to the delivery load,
the delivery unit delivers the erase schedule to the terminal, and
the delivery part erase unit erases the delivery part that are stocked in the delivery part stock unit according to the erase schedule.

6. The branch point diagram display system of claim 4, wherein
the delivery load of a branch point increases according to a total amount of data to be delivered to the branch point, and
the change unit changes the delivery schedule to reduce the delivery load of the branch point that is a high load branch point.

7. The branch point diagram display system of claim 4, wherein the change unit changes the delivery schedule to distribute the delivery load of the high load branch point by including, in the delivery part of a prior branch point that is positioned before the high load branch point, at least one of the delivery part of the high load branch point.

8. The branch point diagram display system of claim 7, wherein the change unit changes the erase schedule so as not to erase the branch road part that is to be used for the display of the branch point diagram at the high load branch point at the erase time of the prior branch point.

9. The branch point diagram display system of claim 4, wherein the change unit changes the delivery schedule to deliver, at a branch point positioned before the high load branch point, a common part that is a branch road part commonly found in the delivery part of the branch point positioned before the high load branch point and the delivery part of the high load branch point, by including the common part in the delivery part of the prior branch point.

10. The branch point diagram display system of claim 5, wherein
the delivery schedule making unit generates a general delivery schedule that defines, as the delivery part for each of the branch points, only the branch road part required to generate the branch point diagram for each of the branch points identified by the branch point identification unit,
the delivery schedule making unit generates a general erase schedule that defines, as an erase part for each of the branch points, the branch road part required to generate the branch point diagram for the branch point,
the delivery load calculation unit calculates the delivery load of each of the branch points according to the general delivery schedule,
the change unit compares the delivery load with a threshold specifically determined for each of the branch points, and changes the general delivery schedule and the general erase schedule to a special delivery schedule and a special erase schedule, respectively, if a branch point is a high load branch point having a delivery load greater than the threshold exists,
the delivery unit delivers to the terminal the delivery part according to the special delivery schedule, and
the delivery part erase unit erases the delivery part stored in the delivery part stock unit based on the special erase schedule.

11. The branch point diagram display system of claim 10, wherein
when the high load branch point exists and the high load branch point is a branch point other than an immediately-next branch point relative to the movable body,
the change unit changes the general delivery schedule and the general erase schedule, to reduce the delivery load of the high load branch point to have a delivery load lower than the threshold by delivering at least one of the delivery part of the high load branch point located farthest from the movable body to the branch point positioned before the high load branch point instead of delivering to the high load branch point,
the delivery load calculation unit re-calculates the delivery load of each of the branch points according to the revised distribution of the delivery part, and
the change unit updates the special delivery schedule and the special erase schedule based on the delivery load re-calculated by the delivery load calculation unit.

12. The branch point diagram display system of claim 11, wherein
when the branch point positioned before the high load branch point that becomes a new high load branch point and is a branch point other than the immediately-next branch point,
the change unit updates the special delivery schedule and the special erase schedule to reduce the delivery load of the new high load branch point to have a delivery load lower than the threshold, by delivering at least one of the delivery part of the new high load branch point to a branch point positioned before the new high load branch point instead of delivering to the new high load branch point,
the delivery load calculation unit re-calculates the delivery load of each of the branch points according to the revised distribution of the delivery part, and
the change unit changes the special delivery schedule and the special erase schedule based on the delivery load re-calculated by the delivery load calculation unit.

13. The branch point diagram display system of claim 12, wherein when the branch point positioned before the new high load branch point becomes a high load branch point and the high load branch point is the immediately-next branch point, the change unit does not change the special delivery schedule and the special erase schedule.

14. The branch point diagram display system of claim 1, wherein the delivery load of each of the branch points identified by the branch point identification unit has a value that is reversely proportional to a time between the delivery at a branch point positioned before a subject branch point and the delivery to the subject branch point.

15. The branch point diagram display system of claim 9, wherein the delivery load of each of the identified branch points has a value that is reversely proportional to a time between the erasure of the delivery part at a branch point positioned before a subject branch point and the delivery to the subject branch point, and is proportional to a number of the common parts that are common for the branch point positioned before the subject branch and the subject branch.

16. The branch point diagram display system of claim 4, wherein the threshold of the delivery load at the branch point is proportional to a data delivery capacity of the delivery server and reversely proportional to a number of terminals that simultaneously receive delivery from the delivery server at a position before the branch point.

17. The branch point diagram display system of claim 4, wherein when there are multiple terminals that simultaneously receive the delivery part from the delivery server at a position before the branch point, the threshold of a terminal that is identified as approaching the immediately-next branch point is raised to have a larger value than other terminals.

18. The branch point diagram display system of claim 1 further comprising:
   a schedule update request unit for transmitting a schedule update request to the delivery server at a regular interval or when the terminal passes each of the branch points, wherein
   the delivery server, upon receiving such request, updates the delivery schedule by way of the change unit.

19. The branch point diagram display system of claim 18, wherein
   when the movable body departs from the guidance route, the guidance route acquisition unit acquires a new guidance route,
   the schedule update request unit sends a schedule update request to the delivery server, and
   the change unit in the delivery server updates the delivery schedule upon receiving the schedule update request.

20. The branch point diagram display system of claim 18, wherein when the schedule update request unit transmits the schedule update request to the delivery server, the schedule update request unit notifies the delivery server of the branch road part stored as a stock part, and the change unit updates the delivery schedule based on the stock part.

21. The branch point diagram display system of claim 18, further comprising:
   a delivery part erase unit to erase the delivery part stored in a delivery part stock unit at an erase time after the display of the branch point diagram at the branch point, wherein
   the change unit of the delivery server updates the erase schedule,
   the delivery unit delivers the delivery part according to the updated delivery schedule, and
   when the schedule update request is issued, the delivery part erase unit performs the erasure of the delivery parts according to the erase schedule updated by the change unit.

22. The branch point diagram display system of claim 1, wherein the branch point diagram is a simple branch point diagram that displays a simplified shape of the branch point.

23. The branch point diagram display system of claim 2, wherein
   the delivery schedule making unit generates the delivery schedule for the delivery of the delivery part of a next branch point that is a branch point that the movable body is immediately approaching among the plurality of branch points in the travel direction of the movable body,
   the delivery load calculation unit calculates the delivery load of the delivery part for the next branch point and a branch point positioned after the next branch point, and
   when a common part that is a branch road part commonly found in the delivery part of the next branch point and the branch point positioned after the next branch point, the change unit changes the delivery schedule to include the common part in the delivery part of the next branch point.

24. A terminal of a branch point diagram display system that receives data from a delivery server and the terminal disposed on a movable body, the terminal comprising:
   a branch point identification unit for identifying a plurality of branch points for which a corresponding branch point diagram is displayed;
   a branch point diagram making unit for generating the branch point diagram for each of the branch points identified by the branch point identification unit based on a branch road part received from the delivery server; and
   a branch point diagram display unit for displaying the branch point diagram generated by the branch point diagram making unit.

25. The terminal of claim 24, wherein a portable device including a cellular phone or a navigation apparatus for use in a vehicle is used as the terminal.

26. A delivery server of a branch point diagram display system, the delivery server delivering data to a terminal for displaying a branch point diagram, the delivery server comprising:
   a branch point identification unit for identifying a plurality of branch points for which a corresponding branch point diagram is displayed;
   a branch road part store unit for storing a plurality of branch road parts for generating the branch point diagram, wherein a branch road part fully represents a branch point;
   a delivery schedule making unit for generating a delivery schedule that defines a delivery part as the branch road part delivered to the terminal at a position before the branch point and for generating an erase schedule that defines the delivery part to be erased at an erase time;
   a delivery load calculation unit disposed for calculating a delivery load of the delivery part according to the delivery schedule;
   a change unit for changing the delivery schedule according to the delivery load calculated by the delivery load calculation unit; and
   a delivery unit for acquiring and delivering the delivery part from the branch road part store unit to the terminal according to the delivery schedule.

27. A method of displaying a branch point diagram at a vicinity of a branch point of a road, the method comprising:
   displaying a branch point diagram of a branch point of a road on a terminal;
   delivering data to the terminal at a position before the branch point;
   identifying a plurality of branch points for which a corresponding branch point diagram is displayed;
   storing a plurality of branch road parts for generating the branch point diagram;
   generating a delivery schedule for defining a delivery part as the branch road part delivered to the terminal at a position before the branch point and for generating an erase schedule that defines the delivery part to be erased at an erase time;
   calculating a delivery load of the delivery part to the terminal according to the delivery schedule;
   modifying the delivery schedule according to the delivery load calculated;
   acquiring and delivering the delivery part to the terminal according to the delivery schedule; and
   generating and displaying the branch point diagram for each of the branch points identified according to the branch road part delivered for the branch point.

28. A computer readable storage medium for storing a program for displaying a branch point diagram at a vicinity of a branch point of a road on a terminal, the program controlling a computer to serve as units comprising:

a branch point identification unit for identifying a plurality of branch points for which a corresponding branch point diagram is displayed;

a branch road part store unit for storing a plurality of branch road parts for generating the branch point diagram, wherein a branch road part fully represents a branch point;

a delivery schedule making unit for generating a delivery schedule that defines a delivery part as the branch road part delivered to the terminal at a position before the branch point and for generating an erase schedule that defines the delivery part to be erased at an erase time;

a delivery load calculation unit for calculating a delivery load of the delivery part according to the delivery schedule;

a change unit for changing the delivery schedule according to the delivery load calculated by the delivery load calculation unit;

a delivery unit for acquiring and delivering the delivery part from the branch road part store unit to the terminal according to the delivery schedule;

a branch point diagram making unit for generating the branch point diagram for each of the branch points identified by the branch point identification unit based on the branch road part delivered by the delivery unit for the branch point; and a branch point diagram display unit for displaying the branch point diagram generated by the branch point diagram making unit.

29. The branch point diagram display system of claim 1, wherein the branch point identification unit is disposed in either the terminal or the delivery server.

30. The branch point diagram display system of claim 1, wherein the branch point diagram making unit is disposed in either the terminal or the movable body.

31. The branch point diagram display system of claim 1, wherein the branch point diagram display unit is disposed in either the terminal or the movable body.

32. The branch point diagram display system of claim 5, wherein the delivery part stock unit is disposed in either the terminal or the delivery server, and the delivery part erase unit is disposed in either the terminal or the delivery server.

* * * * *